(12) United States Patent
Mott et al.

(10) Patent No.: US 8,594,982 B2
(45) Date of Patent: Nov. 26, 2013

(54) SYSTEMS AND METHODS FOR DISTRIBUTED CALCULATION OF FATIGUE-RISK PREDICTION AND OPTIMIZATION

(75) Inventors: Christopher Grey Mott, Seattle, WA (US); Daniel Joseph Mollicone, Philadelphia, PA (US); Damian Marcus Biondo, Abington, PA (US); Sean Michael Thomas, Philadelphia, PA (US)

(73) Assignee: Pulsar Informatics, Inc., Philadelphia, PA (US)

( * ) Notice: Subject to any disclaimer, the term of this patent is extended or adjusted under 35 U.S.C. 154(b) by 0 days.

(21) Appl. No.: 13/157,292

(22) Filed: Jun. 9, 2011

(65) Prior Publication Data
US 2012/0316845 A1 Dec. 13, 2012

(51) Int. Cl.
*G06F 17/50* (2006.01)
*G06F 11/00* (2006.01)

(52) U.S. Cl.
USPC ......... 703/2; 703/5; 702/95; 702/96; 434/255

(58) Field of Classification Search
USPC ........................ 703/2, 5; 702/95, 96; 434/255
See application file for complete search history.

(56) References Cited

U.S. PATENT DOCUMENTS

| 8,075,484 B2 * | 12/2011 | Moore-Ede | 600/300 |
| 2006/0200008 A1 * | 9/2006 | Moore-Ede | 600/300 |
| 2008/0015827 A1 * | 1/2008 | Tryon et al. | 703/2 |
| 2012/0191425 A1 * | 7/2012 | Mott et al. | 703/2 |
| 2012/0196257 A1 * | 8/2012 | Verghese et al. | 434/255 |

* cited by examiner

*Primary Examiner* — Thai Phan
(74) *Attorney, Agent, or Firm* — Damian M. Biondo, Esq.

(57) ABSTRACT

Distributed computing methods and systems are disclosed, wherein intensive fatigue-risk calculations are partitioned according to available computing resources, parameters of the fatigue-risk calculation, time-sensitive user demands, and the like. Methods are disclosed wherein execution-cost functions are used to allocate accessible computing resources. Additional methods include partitioning calculation tasks by user-prioritized needs and by general mathematical features of the calculations themselves. Included herein are methods to calculate only prediction-maximum likelihoods instead of full probability distributions, to calculate prediction likelihoods using Bayesian prediction techniques (instead of full re-tabulation of all data), to collate interim results of fatigue-risk calculations where serial results can be appropriately collated (e.g., serial time-slice independence of the cumulative task involved), to use simplified (e.g., linear, first-order) approximations of richer models of fatigue prediction, to assign user-identified priorities to each computational task within a plurality of such requests, and the like.

24 Claims, 21 Drawing Sheets

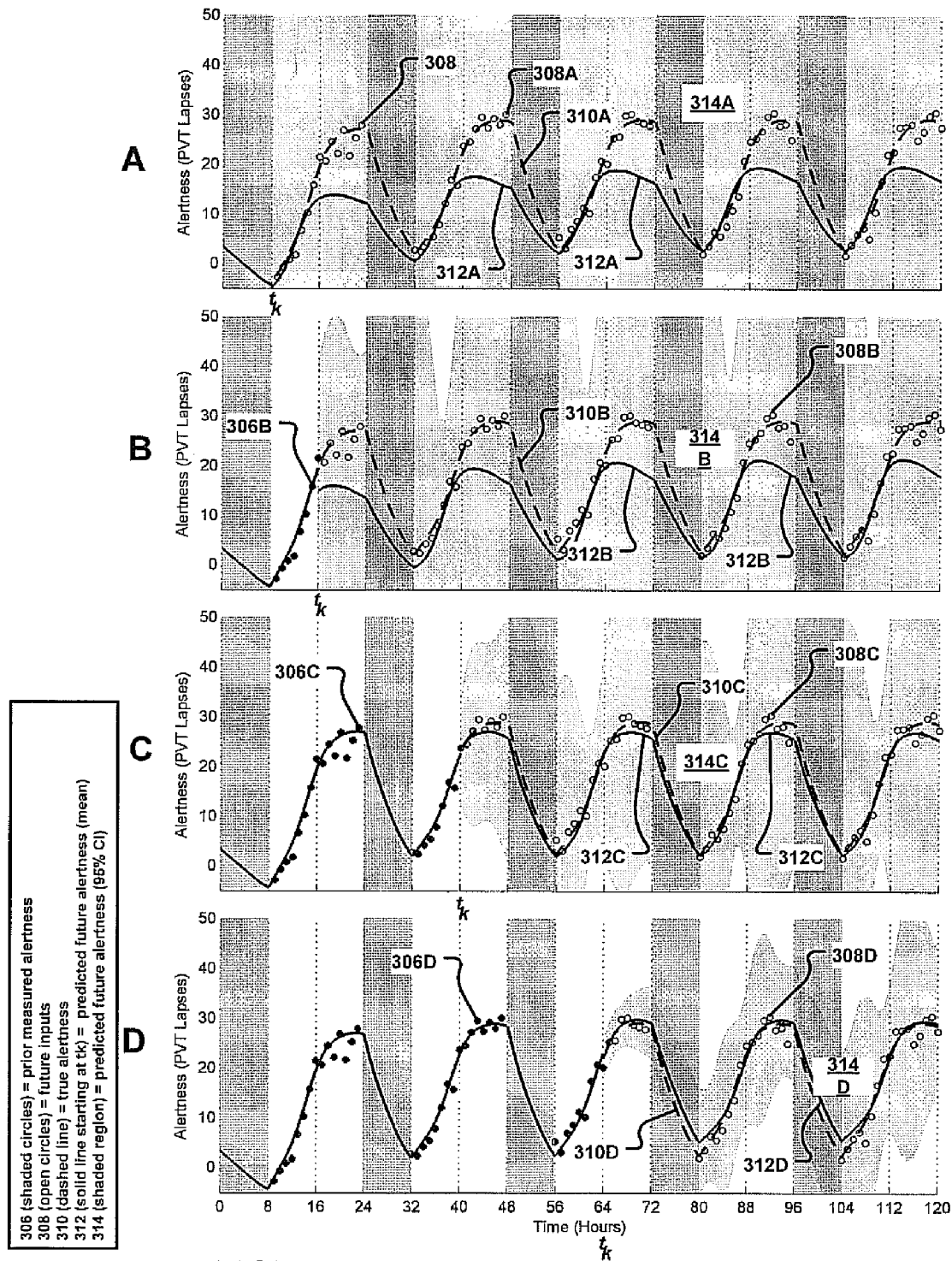
FIGURE 5 — PRIOR ART

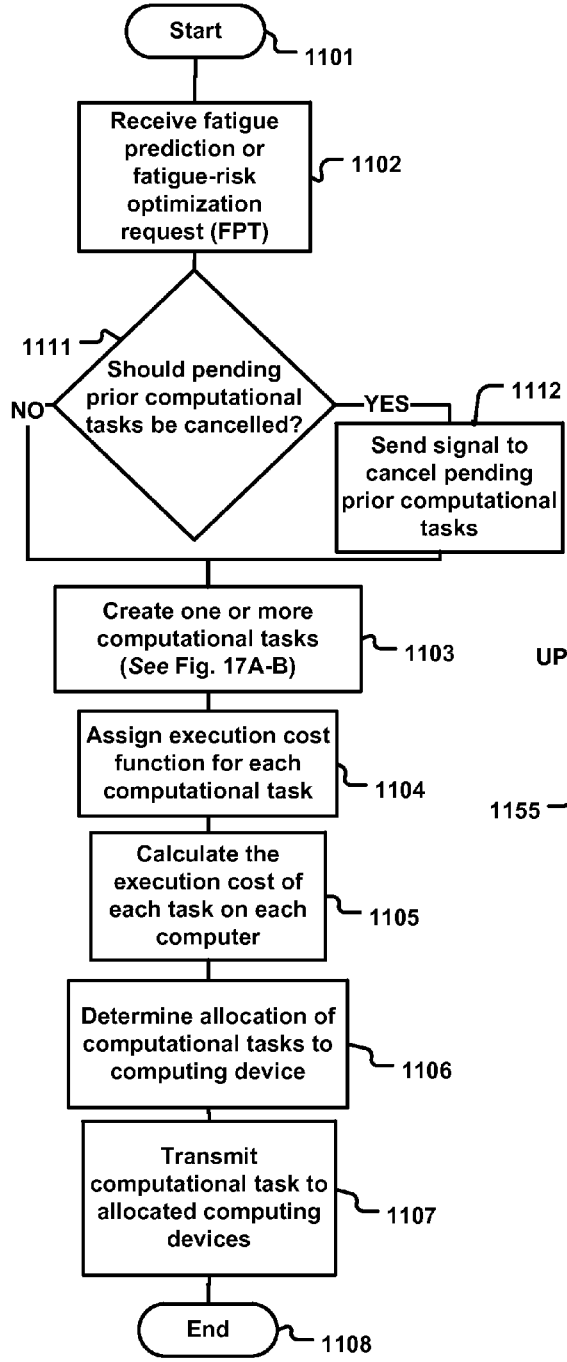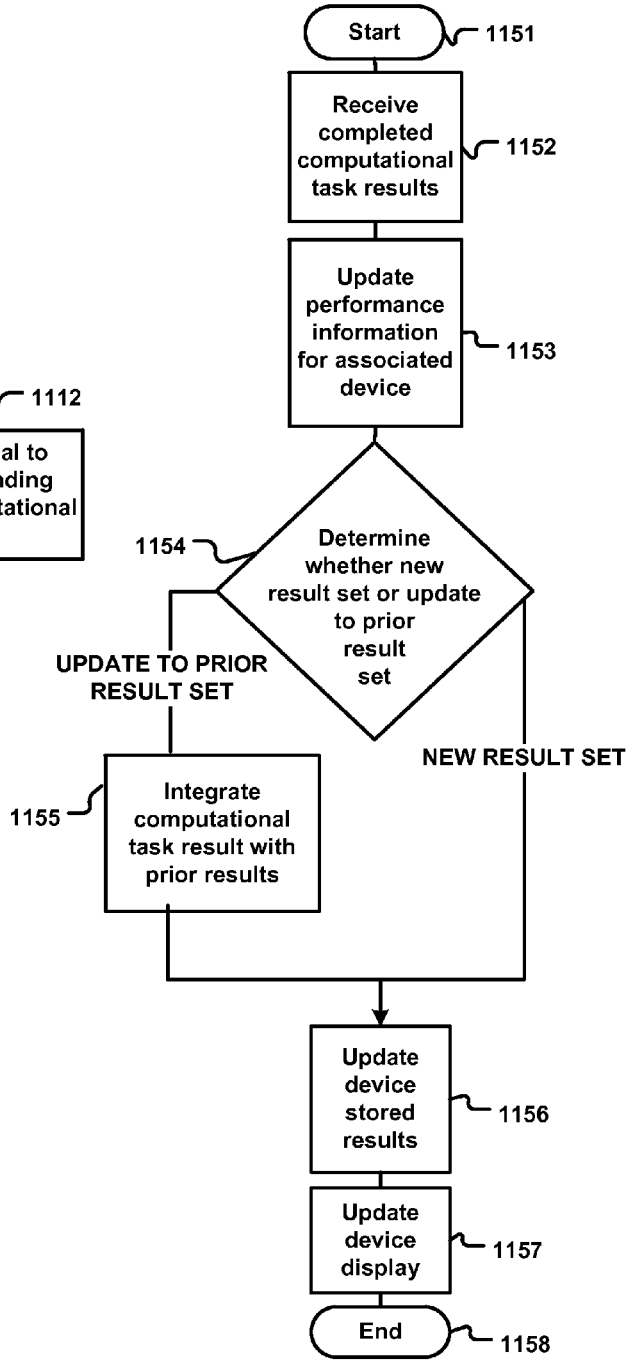

FIGURE 13A

Device Parameters

| | | Tx Data (MB) | Rx Data (MB) | Computational Complexity (G-operations) |
|---|---|---|---|---|
| Tx Power (W) | 10 | Case 1 | 10 | 7 | 500 |
| Rx Power (W) | 2 | Case 2 | 6 | 4 | 150 |
| Process Power (W) | 5 | Case 3 | 0.1 | 0.03 | 1500 |
| | | Case 4 | 1 | 0.1 | 5 |

Processing Speed (G-operations/s)

| | |
|---|---|
| Local | 1 |
| Remote 1 | 20 |
| Remote 2 | 35 |

| | From Device (KB/s) | To Device (KB/s) |
|---|---|---|
| Remote 1 | 60 | 350 |
| Remote 2 | 50 | 140 |

FIGURE 13B

Case 1 - High Data Transfer, Extreme Computational Complexity

| | Tx/Rx Power (W*s) | Computation Power | Tx Time (s) | Rx Time (s) | Computation Time (s) | Cost: Speed | Cost: Power | Cost: Speed * Power | Cost: Power w/ Max Time | Cost: Security |
|---|---|---|---|---|---|---|---|---|---|---|
| Local | 0.0 | 0.0 | 2500 | 0.0 | 500.0 | 500.0 | 2500.0 | 1.00000 | 2.0000 | 0.0 |
| Remote 1 | 1459.2 | N/A | 128.0 | 89.6 | 25.0 | 242.6 | 1459.2 | 0.3 | 0.6 | 1 |
| Remote 2 | 2334.7 | N/A | 204.8 | 143.4 | 14.3 | 362.4 | 2334.7 | 0.67697 | 0.9939 | 1 |

Case 2 - High Data Transfer, Low Computational Complexity

| | Tx/Rx Power (W*s) | Computation Power | Tx Time (s) | Rx Time (s) | Computation Time (s) | Cost: Speed | Cost: Power | Cost: Speed * Power | Cost: Power w/ Max Time | Cost: Security |
|---|---|---|---|---|---|---|---|---|---|---|
| Local | 0.0 | 750 | N/A | 0.0 | 150.0 | 150.0 | 750.0 | 0.2 | 1.4161 | 0.0 |
| Remote 1 | 1126.4 | N/A | 102.4 | 51.2 | 7.5 | 161.1 | 1126.4 | 0.40265 | 0.6 | 1 |
| Remote 2 | 1802.2 | N/A | 163.8 | 81.9 | 4.3 | 250.0 | 1802.2 | 1.00000 | 1.5263 | 1 |

Case 3 - Low Data Transfer, High Computational Complexity

| | Tx/Rx Power (W*s) | Computation Power | Tx Time (s) | Rx Time (s) | Computation Time (s) | Cost: Speed | Cost: Power | Cost: Speed * Power | Cost: Power w/ Max Time | Cost: Security |
|---|---|---|---|---|---|---|---|---|---|---|
| Local | 0.0 | 7500 | N/A | 0.0 | 1500.0 | 1500.0 | 7500.0 | 1.00000 | 2.0000 | 0.0 |
| Remote 1 | 13.6 | N/A | 1.3 | 0.4 | 75.0 | 76.7 | 13.6 | 0.00009 | 1.0018 | 1 |
| Remote 2 | 21.7 | N/A | 2.0 | 0.6 | 42.9 | 45.5 | 21.7 | 1.00000 | 0.0 | 1 |

Case 4 - Medium Data Transfer, Trivial Computational Complexity

| | Tx/Rx Power (W*s) | Computation Power | Tx Time (s) | Rx Time (s) | Computation Time (s) | Cost: Speed | Cost: Power | Cost: Speed * Power | Cost: Power w/ Max Time | Cost: Security |
|---|---|---|---|---|---|---|---|---|---|---|
| Local | 0.0 | 25 | N/A | 0.0 | 5.0 | 5.0 | 25.0 | 0.0 | 0.1 | 0.0 |
| Remote 1 | 130.6 | N/A | 12.8 | 1.3 | 0.3 | 14.3 | 130.6 | 0.39506 | 0.6250 | 1 |
| Remote 2 | 208.9 | N/A | 20.5 | 2.0 | 0.1 | 22.7 | 208.9 | 1.00000 | 1.0000 | 1 |

PP = performance parameters
CCP = communication-channel parameters

SYSTEMS AND METHODS FOR DISTRIBUTED CALCULATION OF FATIGUE-RISK PREDICTION AND OPTIMIZATION

TECHNICAL FIELD

The invention relates generally to systems and methods of using distributed or parallel computing techniques in the field of human fatigue detection, measurement, and management.

BACKGROUND

Human fatigue models tend to be probabilistic in nature and require several parameters in order to create realistic results. Uncertainties often must be associated with each of these parameters and with the model system as a whole. Prediction tasks therefore tend to be rather demanding computationally. Unfortunately, not all fatigue-calculation scenarios lend themselves to the presence of a computing device capable of intensive computation. Certain work and testing environments require mobility, have a shortage of physical space for computing equipment, or otherwise make access to powerful computing equipment unfeasible. There is a general desire to provide tools for assessing and/or otherwise predicting the alertness of individuals.

SUMMARY

To address these demands, principles from the field of distributed computing (also called "parallel computing") are introduced so as to take advantage of the computational power of remote devices while still delivering useful results in timely fashion.

Aspects of the present invention provide systems and methods for generating individualized predictions of alertness or performance for human subjects using multiple interconnected computing devices. Alertness or performance predictions may be individualized to incorporate a subject's individual traits and/or individual states, and because distributed-computing techniques are used, results of such individualization attempts can be had in a more timely fashion and with greater precision and accuracy. These individual traits and/or individual states (or parameters which represent these individual traits and/or individual states) may be random variables in a mathematical model of human alertness. The mathematical model and/or prediction techniques may incorporate effects of the subject's sleep timing, the subject's intake of biologically active agents (e.g. caffeine) and/or the subject's circadian rhythms. The mathematical model and/or prediction techniques may incorporate feedback from the subject's measured alertness and/or performance. Each of these individual traits carries with it probabilistic measurements with attendance uncertainty, thereby increasing the computational workload for accurate prediction.

Over time, probability distributions of the model variables may be updated using recursive statistical estimation to combine new alertness or performance measurements and the previous estimates about the probability distributions of the model variables. Probability distributions for present and/or future alertness or performance may be predicted for an individual based on the estimates of the updated model variables. The individualized predictions and estimates may be predicted across one or more sleep/wake transitions.

Recursive estimation of the model variables may allow iterative updates that utilize only recent alertness or performance measurements, and therefore does not require keeping track of all past measurements for each update. The use of only recent measurements provides computational efficiency for extended duration time sequences. Statistical estimation of the model variables also allows the use of dynamic models and the estimation of prediction uncertainty (e.g. 95% confidence interval).

Initialization information for model variables and/or the parameters used to represent the state-space variables may be obtained from a variety of sources. One particular embodiment involves the use of population distributions that are determined from alertness or performance data measured or otherwise obtained from a sample of the population. Another embodiment involves the use of general probability distributions. By way of non-limiting example, such general probability distributions may comprise uniform distributions which constrain parameters to a range representative of humanly possible values and/or normal distributions corresponding to a range representative of humanly possible values. Yet another embodiment involves initializing model variables and/or the parameters used to represent model variables based on historical predictions for that subject. By way of non-limiting example, the subject may have already been a subject for a previous application of the alertness prediction system and, as such, predictions for various model variables may have been made previously. In this case, the predictions for various trait variables may be used as initial distributions for those trait variables. One result of making the distinction between states and trait variables is that it allows efficient initialization of individualized models by providing means for using both individual-specific and context-specific information.

The method for predicting alertness or performance may comprise distinguishing some model variables as persistent individual traits, and others as variable individual states. The model variables corresponding to individual traits may be considered to be relatively constant random variables, which are unique to an individual but remain substantially unchanged over time. The model variables corresponding to individual states may be considered to be random variables based on current or prior conditions (e.g. sleep or activity history, or light exposure).

BRIEF DESCRIPTION OF THE DRAWINGS

In drawings which depict non-limiting embodiments of the invention:

FIGS. 5A-5D represent schematic plots of alertness measurements and corresponding future alertness predictions predicted by the prior-art FIG. 2 method applied to a particular exemplary subject;

FIGS. 6A and 6B provide flowchart diagrams for processes used to process interim results after an initial fatigue-related risk calculation request is partitioned into separate computational tasks in accordance with an embodiment of the present invention;

FIGS. 13A and 13B provide sample values of various computing-device performance parameters and various communication-channel parameters used in the optimization of computation distribution techniques in accordance with an embodiment of the present invention.

DETAILED DESCRIPTION

Figure 1:
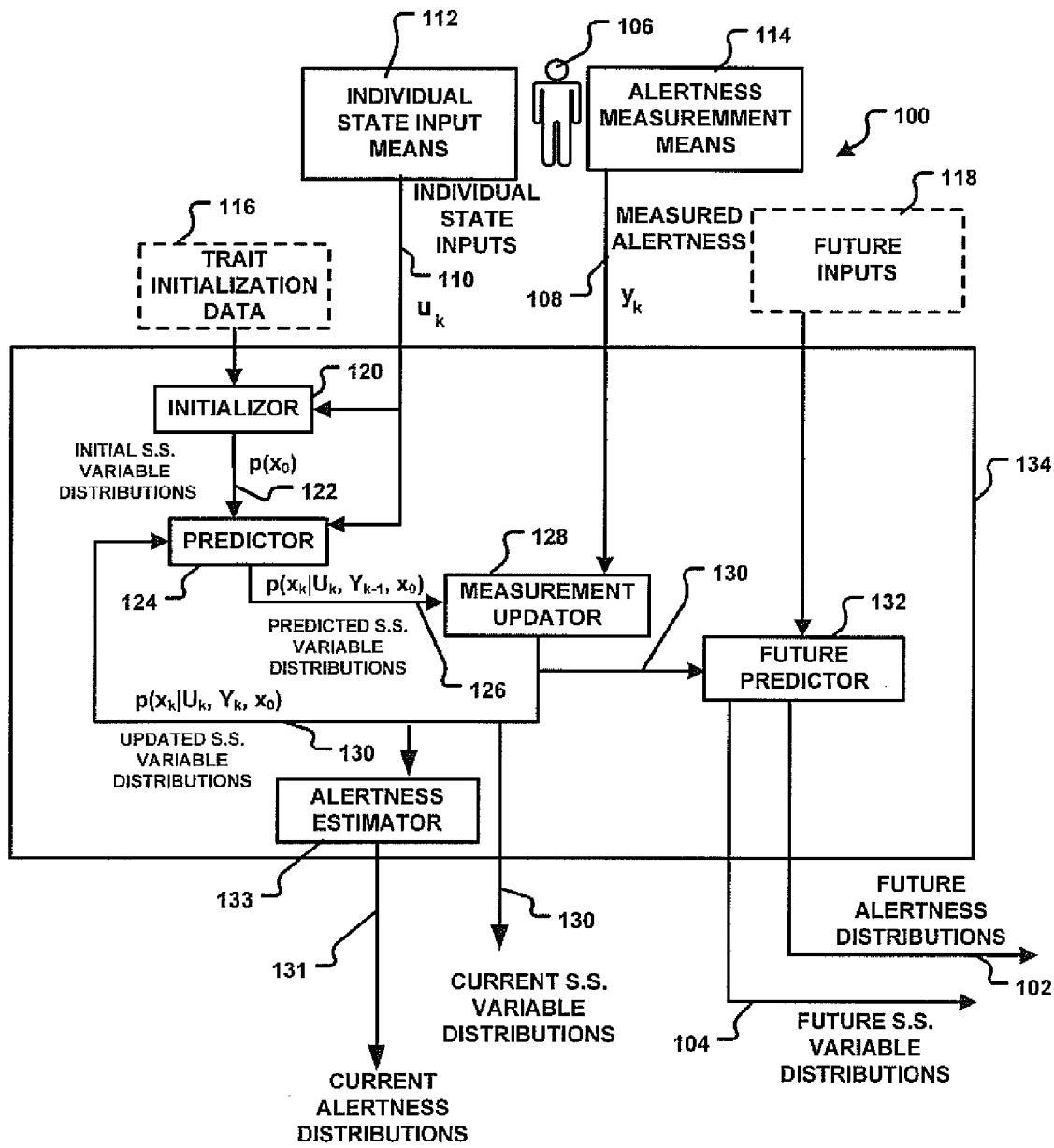
FIG. 1 is a schematic illustration of a prior-art system for individualized alertness prediction.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

To aid in comprehension and understanding of the presently disclosed invention, the following discussion is organized into three parts. In Part I, an overview is provided of the methods used to conduct fatigue-risk calculations through a distributed computer network. Part II explores a specific model of human fatigue in depth, thereby providing insight into the types of mathematical and computational problems that are associated with fatigue-risk calculations. And Part III returns to the distributed computing model by disclosing a particular system embodiment used for distributing fatigue-risk calculations across multiple computing devices and by describing further the logic of how to partition a fatigue-related risk calculation into a set of one or more distinct computational tasks ready for distribution according to a particular embodiment.

I. An Overview of Distributed Techniques or Fatigue-Risk Calculations.

Aspects of the invention provide systems and methods for performing fatigue prediction or fatigue-risk optimization tasks (FPTs) distributed between a primary device and a plurality of computers connected over a communication network. A fatigue prediction task may comprise solving equations involving mathematical models of fatigue that predict the risk of fatigue for one or more individuals given inputs such as sleep times and time of day. A fatigue-risk optimization task may involve selecting a recommended set of sleep times or other fatigue countermeasures that optimize the fatigue risk for one or more individuals subject to constraints and an objective function specifying user-desired distributed-computing parameters. An FPT may be performed by a computational task that may have one or more configuration parameters that could affect aspects of the results, including but not limited to, the precision of the results, the time-resolution of the results, and the amount of statistical information included in the results (e.g. expected value, a 90% confidence interval, or a probability distribution). Additionally, an FPT may be segmented into a computational task that calculates a portion of the overall FPT result, including, but not limited to, calculating results for a time window that is a subsection of the time window of the overall FPT and calculating results for individuals that are a subset of the total individuals included in the FPT. The computational resources, power consumption, and time to completion for each computational task may vary based, at least, in part on the size and configuration parameters of the task.

Additionally, an FPT may comprise predicting the risk of fatigue, and selecting a recommended set of sleep times or other fatigue countermeasures for an individual based at least in part on a mathematical model that is tailored to that particular individual. The mathematical model may comprise one or more parameters that describe traits and states of the particular individual. Representations of the values of one or more of the traits and states for an individual may be stored as profile parameters in an individual profile. The profile parameters may comprise probability distribution functions that represent a statistical likelihood of the individual's state or trait parameter values. An individual's profile may be tailored to represent their individual performance characteristics by performing a computation to update one or more of the parameters in their profile based on measured fatigue-related data. Fatigue-related information may include, but is not limited to, performance measurements, sleep history, or caffeine intake. Updating of the individual profile may be performed using Bayesian statistical estimation techniques. In some embodiments of the systems and methods, when new information is received that may be used to update an individual's fatigue profile a new FPT is created to update the profile.

In various embodiments there may be both profile updating FPT and a performance prediction FPT. By way of example, the partitioning of tasks may involve computing the profile update on a distributed second device, then computing the performance prediction on the primary device using the update profile as an input. In additional embodiments, the primary device may store a copy of the individual's profile, and compute a first performance prediction based on the current profile, then when the updated profile is received from the secondary device, compute a second performance prediction based on the updated profile.

Particular embodiments of the systems and methods described herein may be generally used to perform FPTs by creating a set of computational tasks, distributing the computational tasks between a primary device and one or more secondary computers connected over a communication network, then integrating the results of each of the computational tasks as they are received. In some embodiments, the primary device may initiate an FPT and desire to meet one or more functional objectives, including but not limited to, delivering results in a minimum time, providing high precision results, providing a portion of the results in a minimum time and the remainder of the results at a subsequent time. The set of computational tasks may be created and distributed among available computing resource in order to best meet the desired functional objectives.

Figure 9:
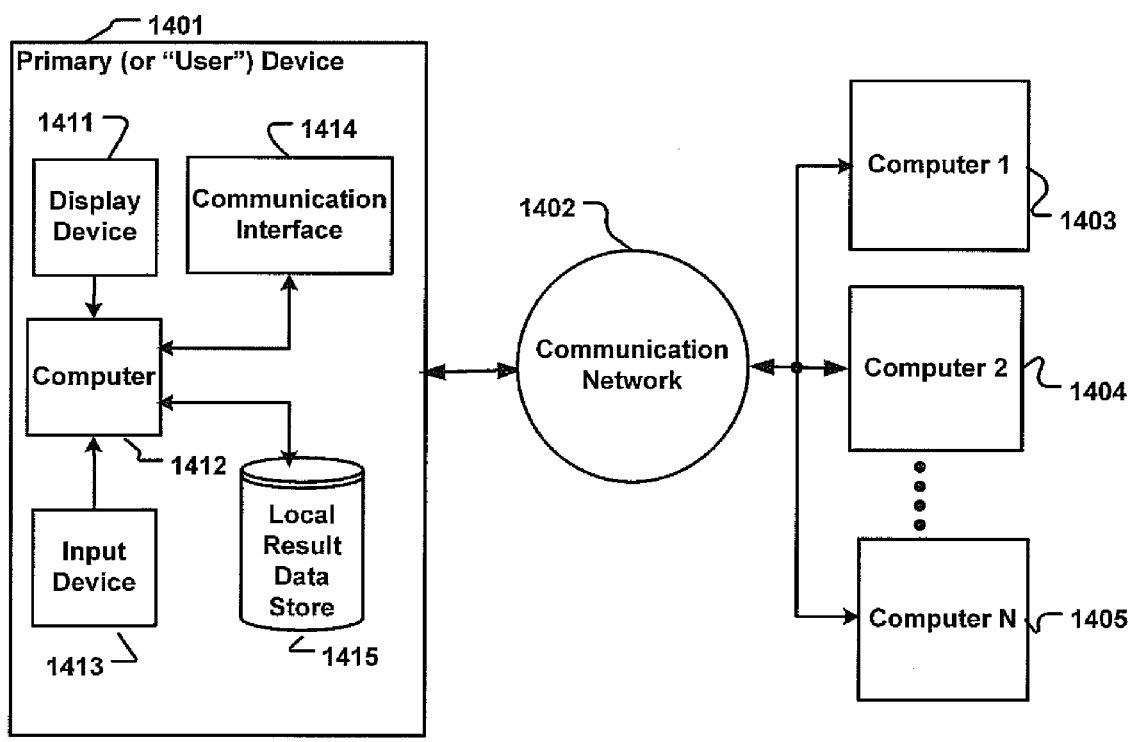
FIG. 9 provides a network diagram of a system used for carrying out distributed calculations for human fatigue risk problem in accordance with an embodiment of the present invention.

For illustrative purposes, FIG. 9 shows a distributed system for performing fatigue prediction or optimization tasks on a primary device and one or more computers connected via a communication network. The system comprises: a primary device 1401, a communication network 1402, and one or more computers 1403, 1404, 1405. The primary device 1401 comprises: a display device 1411, a computer 1412, an input device 1413, a communication interface 1414, and a local result data store 1415. The primary device can be embodied in a personal computer, a mobile device, such as a smart phone, or any other device or combination of devices capable of carrying out computations, receiving user input, displaying information to a user, storing information, and transmitting information over a communication network. The communication network 1402 can be a LAN, the Internet, a wireless transmission system, or any other system for communicating between two or more computing devices. The computers 1403, 1404, 1405 can be any device capable of receiving and transmitting data and carrying out computations. Non-limiting examples of computers 1403, 1404, 1405 include a desktop computer, a server, a virtual computer, a cloud computing server, a mobile computer, and/or the like. The computational speed, power usage, and/or data transmission capabilities of all components in the system may be known, measured, or estimated in order to determine optimal selection and distribution of computational tasks. As a non-limiting example, the primary device 1401 maybe a battery-operated device connected over a wireless network 1402 to a dedicated server 1403. The battery-operated device 1401 may have a relatively slower computational speed than the dedicated server 1403, and the battery-operated device 1401 may experience a relatively higher ratio of cost to power consumption than the dedicated server 1403. In this example the wireless communications network 1402 may have a transmission speed determined by maximum throughput rates set by the protocol, signal interference, and signal strength. Each computational task could be performed by the primary device 1401 and/or could be transmitted to the dedicated server 1403, which would then perform the task and transmit the results back to the primary device 1401. One manner in which an FPT may be requested is if a user interacts with the primary device 1401 through an input device 1413, requesting that the device performs a prediction or optimization task. The computer 1412 may then create, distribute, and receive results of computational tasks related to this FPT, presenting results back to the user on the display device 1411.

The foregoing discussion references several method embodiments of the presently disclosed invention. In some embodiments, the user device 1401 is considered the primary computing device that partitions incoming fatigue-related calculation requests into one or more distinct computational tasks. In other embodiments, user device may not be sufficiently powerful to perform such operations, in which case the partitioning takes place at another computing device after the calculation request is sent there via a communications channel. In such embodiments, the primary computing device is the device where the calculation request is sent for such purposes. The foregoing discussion will describe several process associated with the partitioning of the calculation request into distinct computational tasks and the integration of results from these tasks back into a final result for the calculation request as a whole. Unless otherwise stated, it is assumed that these processes are being run on the primary computing device—whether or not that primary computing device is the same device as the user device. It some embodiments the calculation request may travel across several devices before reaching the "primary computing device," as that term is used herein.

For illustrative purposes, FIG. 6A depicts a method for creating one or more computational tasks from an FPT and allocating computational tasks to computing devices according to particular embodiments. The first step of the method is receiving an FPT 1102. An example of a fatigue prediction task would be to calculate a fatigue score for a given individual at 15 minute time points over a three week time horizon. An example of a fatigue-risk optimization might be to determine the optimal sleep schedule in the next three weeks to minimize the user's fatigue-risk during scheduled work shifts. Next, it could be checked whether any pending computational tasks should be canceled 1111. The primary device 1401 could contain a list of computational tasks for which the results are still pending from the assigned computer 1403, 1404, 1405. If the new FPT is for the same person or set of persons as a pending task and covers the same time horizon, it may be desirable to stop any pending prior computational tasks and instead just wait for any computational tasks from the current FPT to complete. If it is determined in block 1111 that there are prior computational tasks that should be canceled, the next step is to send a signal to the computer assigned to calculate the obsolete computational task instructing that computer to halt calculation of that task 1112. The next step is to create one or more computational tasks 1103 that will return results related to some or all of the overall FPT 1102. There are many ways in which a fatigue prediction task might be split into smaller tasks. By way of non-limiting example, taking a fatigue prediction task of calculating fatigue every 15 minutes for a 3-week horizon, it might be beneficial to quickly calculate a lower time-scale resolution version of the prediction task—predicting a value once every three hours instead of once every fifteen minutes. Or, a simple mathematical model could be used, one that is less accurate but that isn't as computationally intensive. Alternatively, it may be beneficial to break the larger task up into a series of increasing time increments, one computational task making predictions out to twenty-four hours, another to one week, and a third out to the total requested length. In yet another example, if the request is for a probability distribution of the fatigue prediction for every point, it could be broken into two computational tasks—one providing the full probability distribution at each point, the other providing only the expected value at each point. Performing these simpler computational tasks could allow the system to display intermediate results to the user while the overall task, which may be relatively more computationally intensive and take a longer time to perform, is calculated. Computational tasks can be created that start relatively simple (and are therefore faster to perform) and progress with increasing complexity until the most complicated computational task matches the initial scope of the FPT. It should be understood to those skilled in the art that there are many permutations of computational tasks created from an FPT, and the examples listed above are illustrative only. After the computational tasks have been created 1103, the next step is to assign an objective function to each computational task 1104. The objective function serves as a rule for determining on which device a computational task should be performed in order to satisfy a certain system objective. As some non-limiting examples, the objective function may seek to optimize the speed at which results are calculated and returned, or it may seek to minimize the power consumption of the primary device during the calculation of a specific computational task. More examples of potential objective functions are listed below in the description of FIG. 7. The next step is to calculate the cost functions for each computational task 1105. The cost function might be a numerical and/or computable representation and/or metric of how well each potential computer satisfies the goal of the objective function for each task. After the cost functions have been calculated 1105, computational tasks are allocated to specific computing devices 1106. The allocated device for each computational task can either be the computer that is part of the primary device 1401 or a remote computer 1403, 1404, 1405 that is connected to the primary device 1401 via a communication network 1402. The device chosen is that which is associated with the minimum value of the cost functions calculated for the specific computational task. Finally, the computational tasks are transmitted to the computing device allocated for each task 1107.

As an example, FIG. 6B depicts a method for receiving the results from computational tasks and integrating them with results received in the past according to a particular embodiment. The first step is to receive completed task results 1152. Since each dispatched computational task may take a different amount of time to complete, this method may be performed asynchronously with the original allocation of the computational tasks. This method may be performed whenever a computational task result is received by the prima computational device 1401, or another similar user device. The computational task result may have been performed by a remote computer and transmitted back to the primary device over a communication network, or it may have been performed locally by a computer comprising part of the user device. After the task is received, resource capability information for the device that performed the computation is updated 1153. Non-limiting examples of resource capability information that might be updated are: computational load, computational speed, transmission speed, power usage, and/or the like. The next step is then to determine whether the incoming results are part of a new result set or an update to a prior result set 1154. Each FPT has a result set associated with it. If the received result is the first result from an FPT then no result integration needs to occur at this point. If the received result belongs to an FPT for which results have already been received (i.e., it is a second or subsequent iteration of the FIG. 6B method), then the received result may be integrated with the prior results 1155. The integration step may use the received result to fill in missing data, add new information to existing data, replace existing data, or retain the existing data unchanged. Results from computational tasks may contain one or more information tags that are used to determine the appropriate integration action. Non-limiting examples of information tags include the precision of the calculations, identification of the mathematical model used to calculate the results, identification of a prediction algorithm used, and identification of an optimization algorithm used and/or the like.

Figure 10A:
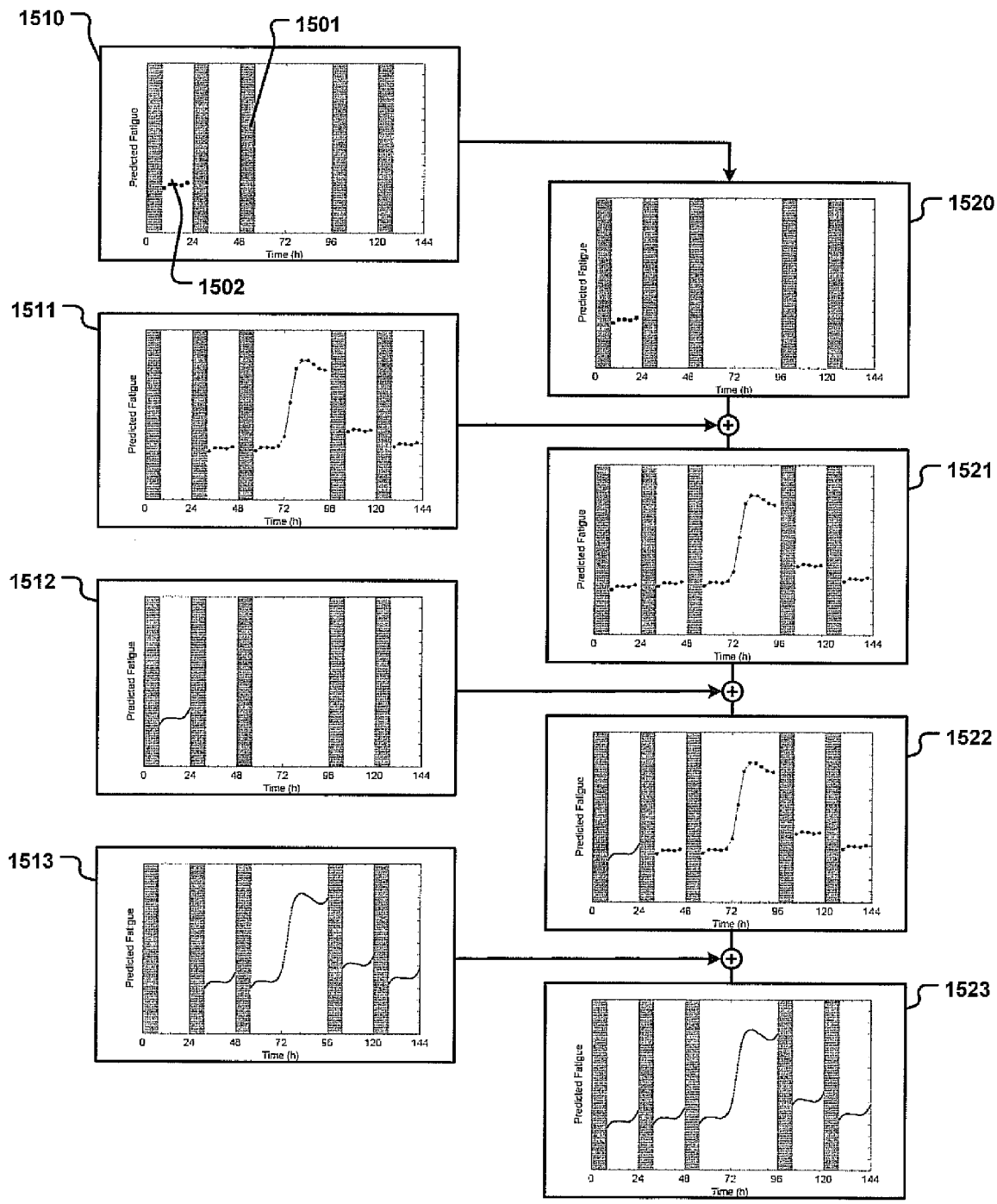
FIGS. 10A and 10B provide illustrations of processes for integrating several interim results after an initial fatigue-related risk calculation request is partitioned into separate computational tasks in accordance with an embodiment of the present invention.
Figure 10B:
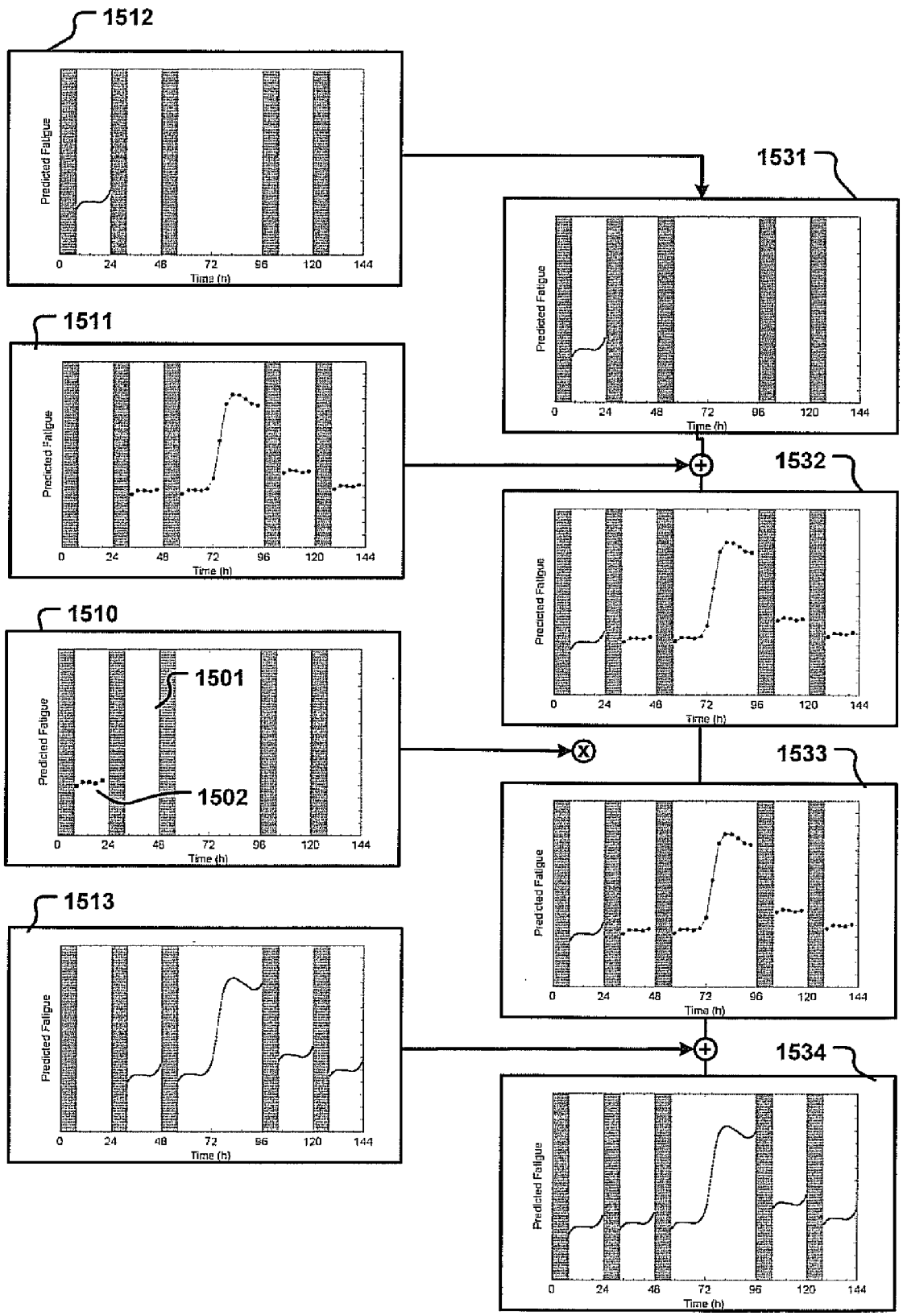

Illustrative examples of receiving and integrating results for a fatigue prediction task according to particular embodiments are shown in FIGS. 10A and 10B. Assume that the initial task was to make fatigue predictions (represented as a single number) every fifteen minutes for the next one week given a specified sleep schedule. Four computational tasks might be created from this: CT1) fatigue score every three hours for the first twenty-four hours; CT2) fatigue score every fifteen minutes for the first twenty-four hours; CT3) fatigue score every three hours for the next one week after the first twenty-four hour period; and CT4) fatigue score every fifteen minutes for the next one week after the first twenty-four hour period.

In a non-limiting example scenario, shown in FIG. 10A, the first result to be received from this set is that of CT1 1510. The fatigue prediction data points 1502 in this example represent an increasing risk of fatigue on the vertical axis (i.e. higher is worse). Periods of sleep provided as inputs to the prediction calculations are shown as dark bars 1501. This represents the first result for the fatigue prediction task; it could be added to the stored results on the device 1156 and the device display could be updated 1157 (see FIG. 6B). At this point, the stored results would just include the results from CT1 1520. If the next received result is that of CT3 1511, the results from CT1 1510 and from CT3 1511 would then be integrated. Since there is no overlap of data points in the time dimension, the results could be combined by adding the data together 1521. The next result to be received might then be the results of CT2 1512. CT2 covers the same time period as CT1, but improves the time-scale resolution. Since CT2 provides a higher resolution version of data already present in the stored results, it could be integrated by replacing the data in the system that spans the same time period as CT1 but at a lower time-scale resolution 1522—in this example, the stored data for the first twenty-four hours. Finally, the results from CT4 1513 might be the last to arrive. Since CT4 provides a higher time-scale resolution over the same time period as CT3, it could be integrated by replacing the results currently corresponding to the time period from twenty-four hours to one week 1523. In the above scenario, after the result of each of CT2, CT3, and CT4 was received by the device, the stored results could be updated 1156 and the device display could be updated 157 (see FIG. 6B).

In another example scenario, depicted in FIG. 10B, suppose that the first result to be received from a set is that of CT2 1512. Since this is the first result for the fatigue prediction task; it could be added to the stored results on the device 1156 and the device display could be updated 1157. If the next received result is that of CT3 1511, the results from CT2 1512 and CT3 1511 would then be integrated. Since there is no overlap of data points in the time dimension, the results could be combined by adding the data together 1532. The next result received might then be from the completion of CT1 1510. Results from CT1 would not improve on the results that are already part of the stored results. The current result set 1532 already has more complete information for the first twenty-four hours, and the results from CT1 1510 would be discarded. Finally, the results from CT4 1513 might be the last to arrive. Since CT4 provides a higher time-scale resolution over the same time period as CT3, it could be integrated by replacing the results currently corresponding to the time period from twenty-four hours to one week 1523. In the above scenario, after the result of each of CT1, CT3, and CT4 was received by the device, the stored results could be updated 1156 and the device display could be updated 1157 (see FIG. 6B).

Figure 11:
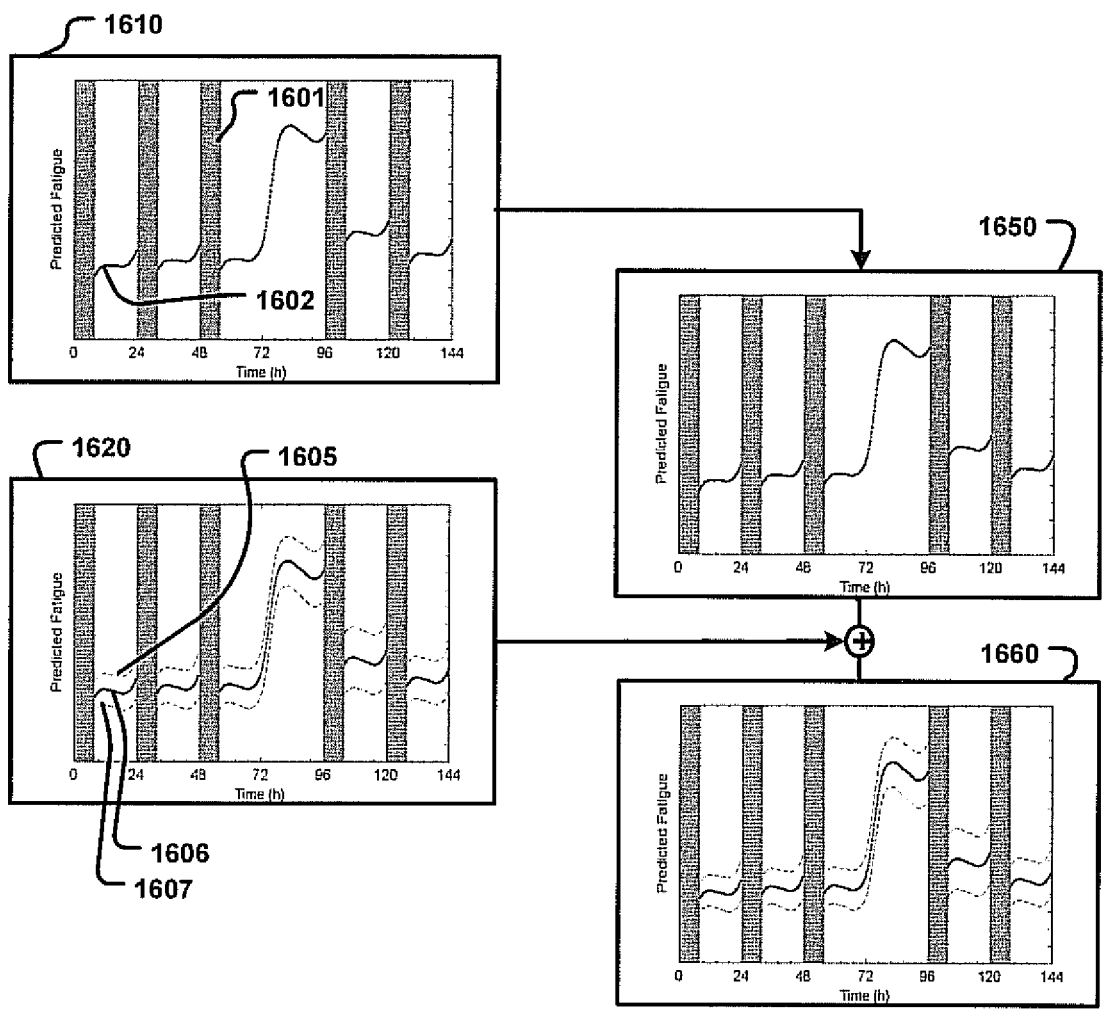
FIG. 11 provides another illustration of a process for integrating several interim results in accordance with an embodiment of the present invention.

Yet another illustrative example of receiving and integrating results for a fatigue prediction task is shown in FIG. 11. Assume that the initial task was to make fatigue probability distribution predictions every fifteen minutes for the next one week. Two computational tasks might be created from this: CT4) the expected value of fatigue predictions every 15 minutes; and CT5) the probability distribution of fatigue predictions every 15 minutes. If the first result to arrive is from CT4 1610, then the expected value result will be added to the result set for the fatigue prediction task 1650. When the result from CT5 arrives 1620, the probability distribution information may be added to the expected value information in the stored data 1660, and the results display may be updated to present the probability information. Non-limiting examples of presenting probability distribution information include confidence interval lines, probability density maps, and contour plots.

Returning to FIG. 6B, the incoming data has been integrated with prior results 1155 or after it has been determined that the incoming data is part of a new result set 1154, the results stored on the device can be updated 1156. Lastly, the display on the device may be updated 1157. If the user is currently viewing an interface capable of displaying the newly returned results, then the interface may be updated accordingly. If, however, the user is on a different user interface element, there may be a notification that new results have been obtained and are ready to be viewed. The user interface may also indicate when computational tasks for an FPT are still expected to be received, and when all computational tasks for an FPT are complete and have been received.

Figure 7:
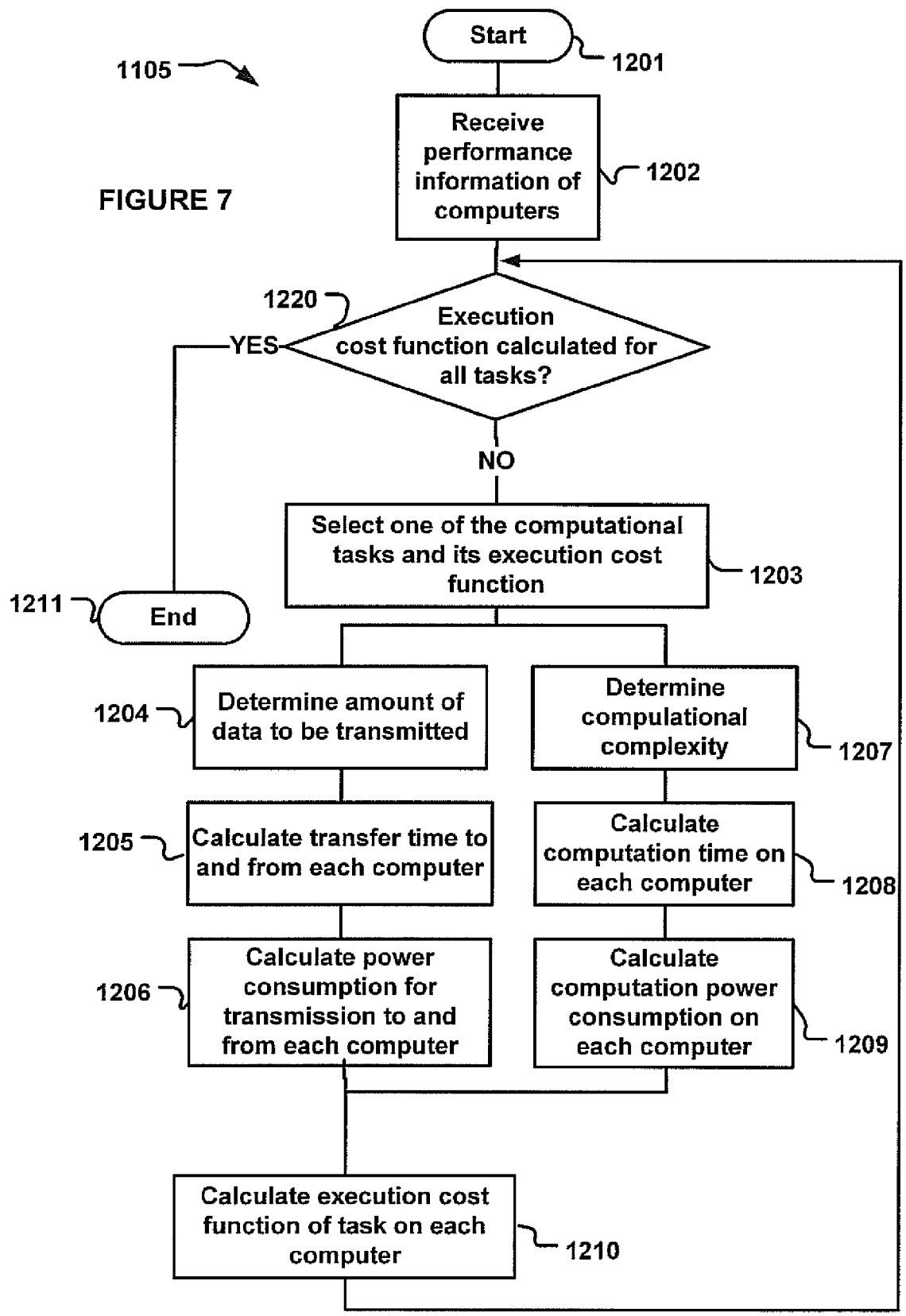
FIG. 7 provides a flowchart diagram of a process for calculating the execution-cost function for performing a given computational task on a specific computing device in accordance with an embodiment of the present invention.

For illustrative purposes, FIG. 7 shows a method 1105 for calculating the cost function for each device on which a computational task might be run according to a particular embodiment. The first step is to receive resource capability information for each potential computer that might carry out a computational task of an FPT 1202. Performance information might include: the power used by the local device to operate in transmit mode, the power used by the local device to operate in receive mode, the power needed to run a calculation on the local device, the processing power of the local device, the processing power of each remote device, the downstream data rate of each remote device, the upstream data rate of each remote device, the transmission error rate for each remote device, and/or the like. Note that the transmission and receiving power requirements may be different between the local device and each remote device depending on the communication means used. The next step is to determine whether the cost function has been calculated for each computational task that is part of the FPT 1220. If not, one computational task and its associated execution cost function can be selected from the pool of computational tasks for which the value of the cost functions have not been calculated 1203. The method then branches into two parallel processes.

On the first of these processes, the first step is to determine the amount of data to be transmitted 1204. This amount could be calculated separately for data transmitted to the device and data transmitted from the device because the available bandwidth and power consumption may differ depending on the direction of the data streams. The next step is to calculate the transfer time to and from each system 1205. Simple equations for making this calculation might be:

$$\text{Transfer Time} = \frac{(\text{Amount of Data} * \text{Data Transfer Rate})}{\text{Transmission Error Rate}} \quad (0.1)$$

Total Transfer Time =

Receive Transfer Time + Transmit Transfer Time

Afterwards, the power consumption associated with transferring data between each system is calculated 1206. A simple equation for making this determination could be:

Power Consumption during Transfer=Transfer time=Transmit|Receive Power Rate  (0.2)

The correct power rate may be chosen based on whether the device is transmitting or receiving.

On the second parallel process of the FIG. 7 method, the first step is to determine the computational complexity 1207. One way this might be quantified is in the expected number of operations needed to complete the computational task. The next step is to calculate the computation time if the process were run on the local device and each potential remote computer 1208. A simple way this might be calculated is:

Computation Time=Number of Operations−Operations per Second  (0.3)

The next step is to calculate the power consumption on each system 1209. This might be simply calculated as:

Power Consumption during Calculation=Computation Time−Power used per second while computing  (0.4)

The two parallel branches then recombine into the next step, which is calculating the cost function for each system depending on the computational objective 1210. The cost function is a mathematical and logical formula that calculates a value of the cost of choosing a specific system based on the objective criteria. Several non-limiting examples of cost functions follow:

Cost: Speed
$C_s$=Computation Time+Total Transfer Time
Cost: Power
For local device: $C_p$=Power Consumption during Calculation
For remote device: $C_p$=Power Consumtion during Transfer
Cost: Normalized Power*Normalized Speed $$C_{npns} = \frac{C_p}{\max(C_p)} * \frac{C_s}{\max(C_s)}$$

Cost: Normalized Power limited by Max Time $$C_{npmt} = \text{if } C_s < \text{maxtime } \left[\frac{C_p}{\max(C_p)}\right], \text{else } \left[1 + \frac{C_p}{\max(C_p)}\right]$$

Cost: Security

For local device: $C_{sec}$=0

For remote device: $C_{sec}$=1  (0.5)

Examples of potential resource capability information and examples of the amount of data and calculation complexity of arbitrary computational tasks are shown in FIGS. 13A and 13B. FIG. 13B shows how the various cost functions described above might be calculated using the arbitrary values established in FIG. 13A. The outlined boxes with bold text under the cost headings correspond to the device that would be chosen to perform a computational task 1107 (see FIG. 6A) in view of the various objective functions and computational tasks. Returning to FIG. 7, after the values of the cost function have seen calculated 1210, the next step is to determine whether the values of the cost function have been calculated for each computational task that is part of an FPT 1220. If not, then the process is repeated 1203-1210. After all the values for the cost function of each computational task have been calculated, this part of the process is completed 1211.

Figure 8:
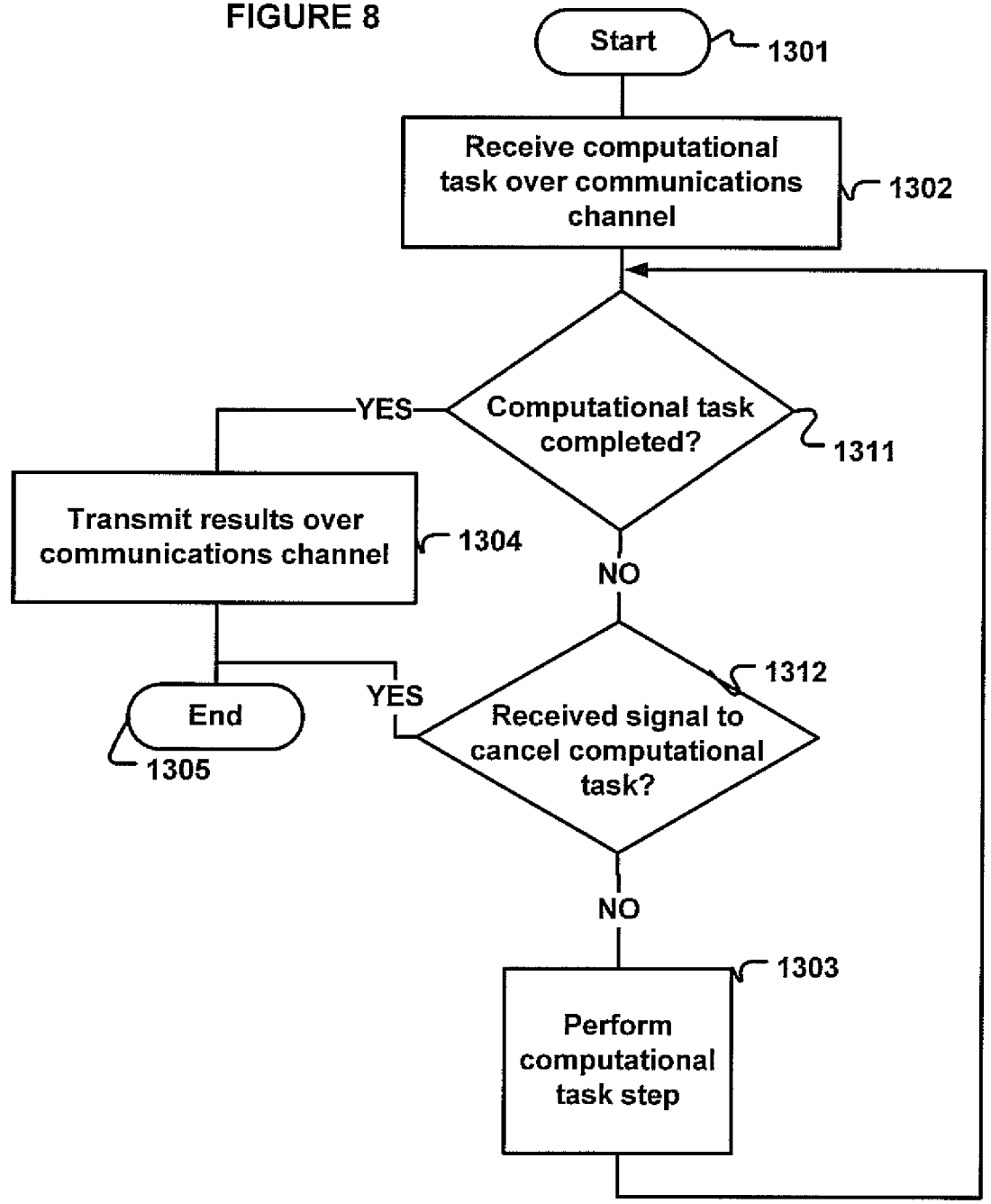
FIG. 8 provides a flowchart diagram for managing the execution of computational tasks on distributed computing devices in accordance with an embodiment of the present invention.

As an example, FIG. 8 shows a method for a computer to receive a computational task, perform the computational task, and return the result to the client device according to a particular embodiment. In the first step, the computer receives a computational task over a communications channel 1302. Then, it is determined whether the computational task is completed 1311. If not, it is then determined whether the computer has received a signal to cancel the current computational task 1312. If not, the computer performs a step of the computational task 1303. The step of the computational task 1303 might either be a single instruction, a set of instructions, or a set of instruction that can be performed in a certain time period. After the computational task step has been completed 1303, the next step is to once again determine whether the computational task has been completed 1311. If not, the process repeats again 1312, 1303. Otherwise, the next step is to transmit the results of the computational task back to a primary device over a communications channel 1304. If it is ever determined that the computer has received a signal to cancel the current computational task 1312, no further computational task steps are calculated and no result data is transmitted back to the user device. In some implementations, it may be beneficial to send a signal back to a primary device 1401 informing the primary device 1401 that the signal to halt calculation of the computational task has been received. After results have been transmitted over a communications channel 1304, or after a signal to cancel a computational task has been received 1312, the computer completes activity for this computational task. In some implementations the step of receiving a computational task over a communications channel 1302 can be one or more times before the computer has finished calculating prior computational tasks. Under such circumstances, the computer may perform the method shown in FIG. 8 for multiple computational tasks using methods that may include, but are not limited to: placing incoming computational tasks into a queue then performing the steps serially to completion of transmission 1304 or cancellation 1312; performing steps for each computational task in parallel. Non-limiting examples of methods for placing computational tasks into a queue may include: using a FIFO (first-in first-out), using a queue ordered by shortest estimated time to completion, using a queue ordered by a weighting of shortest estimated time to completion and time since arrival in the queue.

Figure 12:
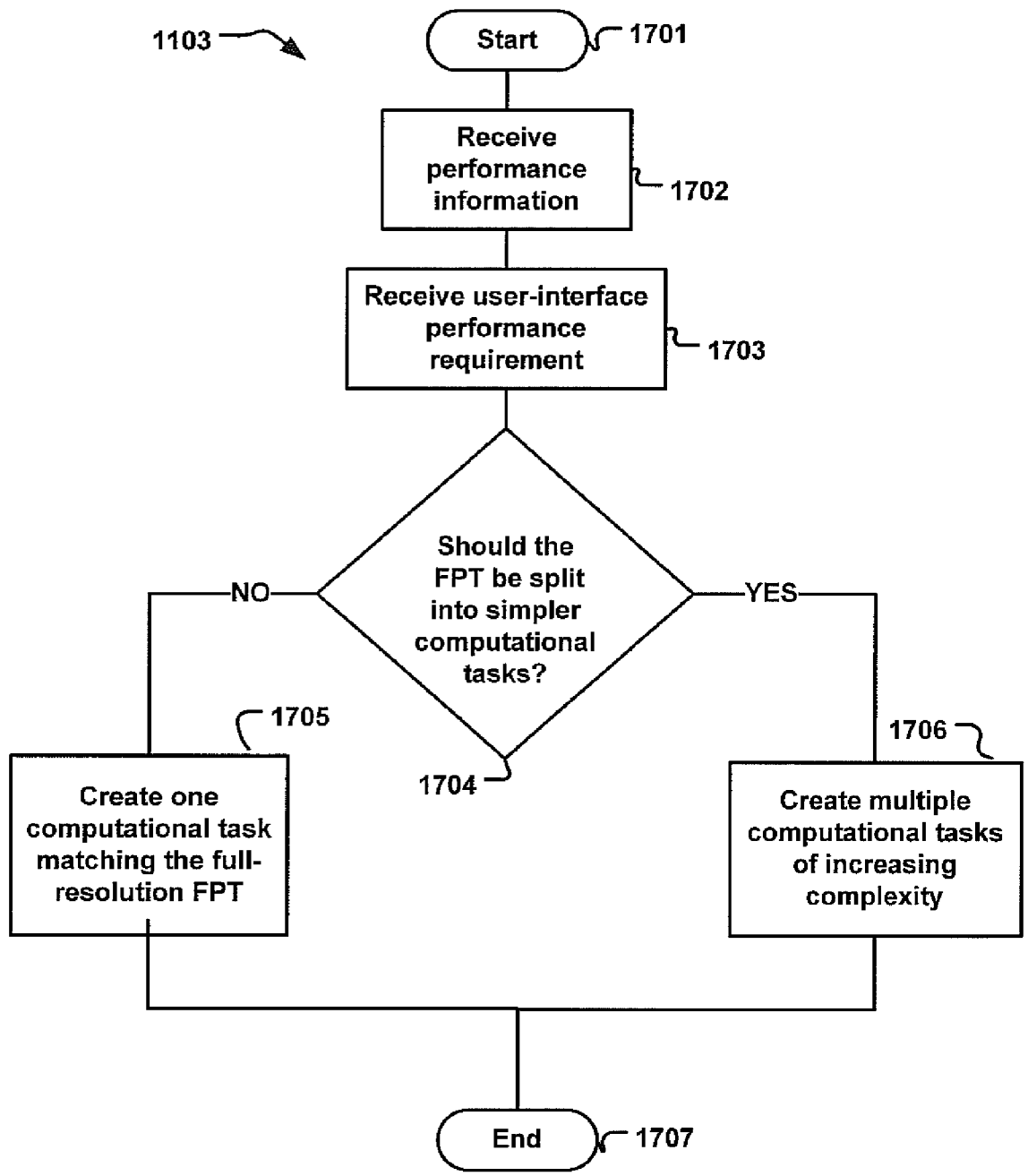
FIG. 12 provides a flowchart diagram for a process for using user-provided input to optimize the distribution of a fatigue-risk calculation request among several computing devices in accordance with an embodiment of the present invention.

FIG. 12 shows one embodiment of a method for creating computational tasks from an FPT based on an end-user performance requirement. The first step is to receive resource capability information 1702. The resource capability information may include, but is not limited-to, data about the processing speed of the user device, the battery usage of the user device, the transmission speed between the primary device and available computers, the processing speed of available computers and/or the like. The next step is to receive an end-user performance requirement 1703. The end-user performance requirement may comprise one or more objectives or constraints related to factors that may include, but are not limited to, desired maximum calculation time thresholds, desired amount of information shown, primary device power usage, desired precision of result, some combination thereof, and/or the like. The end-user performance requirement may be selected to provide desired user-interface qualities such as responsivity to user inputs, precision of data, time resolution of data points, time horizon of prediction, or maximum primary device battery life. After this information has been received, the next step is to determine whether the FPT should be made into more than one computational task 1704. One way step 1704 may be performed is by calculating whether a computational task corresponding to the greatest detail FTP could be calculated on the primary device while satisfying the most restrictive performance requirement. If the end-user performance requirement can be met with a single computational task, then the next step is to create a single computational task that matches the scope of the full-resolution FPT 1705. Otherwise, the next step is to create multiple computational tasks with different configuration parameters 1706 that can meet the end-user performance requirement. The logic of this partitioning process is described more fully in connection with another embodiment depicted in FIGS. 17A and 17B, below.

Selecting the configuration parameters for multiple computational tasks in step 1706 may be performed using variety of methods. By way of example, one way of determining a set of parameters to define the relationship between a full-resolution computational task and a simpler computational task could be to have a table describing the time-factor impact that a change in a computational task variable has on the calculation time. The time-factor impact could be determined either empirically, by averaging the historical impact that changing computational task parameters had on the overall computation time, or theoretically, by considering additional computation complexity added by varying a computational task variable. For instance, assume that the fastest computational time for the full-resolution FPT was determined to be ten seconds. Prior experience may have demonstrated that performing a calculation half as often (e.g., diminishing the time-resolution of a prediction task by a factor of 2) cuts the calculation time in half as well. It may also have been determined that reducing the forecasting time from one week to one day reduces the calculation time by a factor of ten. The order of reduction of computational tasks parameters could either be set programmatically or chosen at run-time by the end-user. Additionally, there may be a lower limit set for each computational task parameter. In the current example, a computational task might be created that satisfies the most restrictive threshold by reducing the time-horizon to a single day and not changing the time resolution at all. Or, if time-resolution was programmed to be less important, a computational task could be created with a specified minimum time-resolution and the maximum time horizon that would allow the computational task to execute in less than three-hundred milliseconds. Non-limiting examples of computational task parameters are the frequency of data points, the time horizon of predictions or optimizations, the use of a probability distribution instead of an expected value, the use of a specific mathematical model of a given accuracy, and/or the like.

As an example of the method shown in FIG. 12, the resource capability information may be received 1702 from measurements of communication transmission speeds and computer speed specification, or from estimates based on the historical data from the communication network and computers. For illustrative purposes we could assume a case in which the end-user performance requirement received 1703 comprises multiple time-response thresholds defined as follows: after a user input triggers a request for the FPT then a first update to the user interface should occurs no longer than three-hundred milliseconds, a second update should occur after 1 second, a third update after 5 seconds, and the final update with all remaining data from the FPT may arrive after any amount of time has passed. Another example of a performance requirement might be that a first update should occur no more than one hundred milliseconds after the user interaction that triggered the request for the FPT and that the calculation should use less than a certain amount of power (either in on-board calculation or in data transmission) on the user device, and a final update should occur with all remaining FPT data after any amount of time with a preference for minimum power consumption. Continuing the example of the end-user performance requirement comprising four thresholds described above, determining whether the FPT should be made into more than one computational task 1704 may be performed as follows. Calculate how long it would take to receive results from the full-resolution FPT on each of the available computer resources based on the received resource capability information 1703. If the full-resolution FPT can be carried out in less than three-hundred milliseconds, then the performance requirement can be met with a single computational task, so the next step is to create a single computational task that matches the scope of the full-resolution FPT 1705. Otherwise, the next step is to create multiple computational tasks of increasing complexity 1706. One way of creating multiple computational tasks is by creating a series of computational tasks that provide the most detail while meeting the each of the thresholds defined in the performance requirement. Assuming that the total FPT would take more than 5 seconds to perform on the fastest device, four computational tasks might be generated. The first task could have an estimated calculation time of under three-hundred milliseconds, the second could have an estimated calculation time under one second, the third could have an estimated calculation time of less than five seconds, and the fourth could be the computational task corresponding to the full-resolution FPT (see FIGS. 17A-B).

In one embodiment of this invention, the primary device may be a computer onboard a space-flight vehicle, the communication network may comprise a long-range wireless transceiver, that connects the primary device to earth-based computers. The onboard computer may be constrained by battery power or available computational resources and crew onboard the space-flight vehicle may wish to use a tool such as an astronaut scheduling assistant ("Astronaut Scheduling Assistant Predicting Neurobehavioral Impairment under Altered Sleep/Wake Conditions", Van Dongen, H., Dinges, D., ASMA 77, 15 May 2006). The transmission delay may be significant due to the long distance between earth and the space-flight vehicle, however in a case where low-battery usage was highly preferred, the disclosed systems and methods may be used to optimally distribute computational tasks between the onboard computer and earth-based devices.

II. A Particular Mathematical Model or Fatigue-Risk Calculation

Aspects of the invention provide systems and methods for predicting probability distributions of the current and/or future alertness of a human subject. In particular embodiments, the alertness predictions are recursively updated to match a subject's individual traits and individual states. Alertness predictions may involve the use of a state-space model or other mathematical model. The systems and methods of particular embodiments receive inputs that affect a subject's circadian process and/or homeostatic process. Non-limiting examples of such inputs include: light exposure histories (which may affect the circadian process) and sleep time histories (which may affect the homeostatic process. The systems and methods of particular embodiments may also receive inputs which are modeled independently from the circadian and/or homeostatic process. Such inputs may include the intake history of caffeine and/or other biologically active agents (e.g. stimulants, depressants or the like). The systems and methods of particular embodiments incorporate statistical estimation methods to adjust the model variables based on measurements of alertness performed on the subject. A non-limiting example of such a method is recursive Bayesian estimation.

The methods and systems of particular embodiments generate expected values and/or confidence intervals for current and/or future alertness of the subject even where there are uncertainties in the system inputs. In addition to current and/or future alertness, some embodiments of the invention track current values and/or provide estimates of current and/or future expected values of time-varying state variables (e.g. circadian phase) even where there are uncertainties in the system inputs.

The term alertness is used throughout this description. In the field, alertness and performance are often used interchangeably. The concept of alertness as used herein should be understood to include performance and vice versa. The following discussion is taken from published PCT Patent Application WO 2009/052,633, by C. Mott, et al., entitled "Systems and Methods for Individualized Alertness Predictions," published Apr. 30, 2009. The entirety of the '633 Application is hereby incorporated herein.

FIG. 1 is a schematic illustration of an individualized alertness prediction system 100 according to a particular embodiment of the invent on. System 100 is capable of predicting current alertness distributions 131 and/or future alertness distributions 102 for an individual subject 106. Current alertness distributions 131 and/or future alertness distributions 102 may include the expected value (e.g. the mode of the distribution) for the alertness of subject 106 and may also include the standard error and/or confidence intervals for the alertness of subject 106. In some embodiments, as explained in more detail below, system 100 is capable of calculating current parameter distributions 130 and/or future parameter distributions 104 of other parameters. Such other parameters may comprise the variables of a state-space model, for example.

In the illustrated embodiment, system 100 comprises an initializor 120, a predictor 124, a measurement updator 128, an alertness estimator 133 and a future predictor 132. Initializor 120, predictor 124, measurement updater 128, alertness estimator 133 and/or future predictor 132 may be implemented by suitably programmed software components being run on processor 134. Processor 134 may be part of a suitably configured computer system (not shown) or may be part of an embedded system. Processor 134 may have access to individual state input means 112 and/or alertness measurement means 114, as discussed in more detail below. Processor 134 shown schematically in FIG. 1 may comprise more than one individual data processor which may be centrally located and/or distributed. Various components of system 100 may be implemented multiple times to make individualized alertness predictions for a group of individuals.

In the illustrated embodiment, system 100 also comprises an individual state input means 112 for providing individual state inputs 110 to processor 134. Individual state inputs 110 comprise information about subject 106 that may be time-varying. Such information about subject 106 may be referred to herein as "individual states". Individual state input means 112 may comprise measurement systems for measuring certain data indicative of individual states. By way of non-limiting example, such measurement systems may include light-sensing devices which may be carried by subject 106 (e.g. in the form of a wristband). Such light-sensing devices may be indicative of the circadian state of subject 106. As another non-limiting example, such measurement systems may include movement sensors or the like which may measure the movement of subject 106. Such movement sensors may be indicative of the homeostatic state of subject 106. Circadian states and homeostatic states are discussed in more detail below.

As yet another non-limiting example, such measurement systems may include measurement systems for measuring a stimulant dose provided to subject 106. In addition to or as an alternative to measurement systems, individual state input means 110 may comprise an input device for subject 106 or an operator of system 100 (not explicitly shown) to explicitly input data indicative of individual states into processor 134. Such input device may generally comprise any suitable input device or any combination thereof, such as, by way of non-limiting example, a keyboard, a graphical user interface with suitable pointing device and/or any other similar device(s). Such an input device may be used to input data indicative of the circadian state of subject 106 (e.g. a work schedule history of subject 106), data indicative of the homeostatic state of subject 106 (e.g. a sleep history of subject 106) and/or data indicative of the stimulant intake history of subject 106.

In the illustrated embodiment, system 100 also comprises an alertness measurement means 114 for detecting an alertness measurement 108 of individual 106 and for providing measured alertness 108 to processor 134. Alertness measurement means 114 may comprise, but are not limited to, techniques for measuring: (i) objective reaction-time tasks and cognitive tasks such as the Psychomotor Vigilance Task (PVT) or variations thereof (Dinges, D. F. and Powell, J. W. "Microcomputer analyses of performance on a portable, simple visual RT task during sustained operations." Behavior Research Methods, Instruments, & Computers 17(6): 652-655, 1985) and/or a Digit Symbol Substitution Test; (ii) subjective alertness, sleepiness, or fatigue measures based on questionnaires or scales such as the Stanford Sleepiness Scale, the Epworth Sleepiness Scale (Jons, M. W., "A new method for measuring daytime sleepiness—the Epworth sleepiness scale." Sleep 14 (6): 54-545, 1991), and the Karolinska Sleepiness Scale (Åkerstedt, T. and Gillberg, M. "Subjective and objective sleepness in the active individual." International Journal of Neuroscience 52: 29-37, 1990), (iii) EEG measures and sleep-onset-tests including the Karolinska drowsiness test (Åkerstedt, T. and Gillberg, M. "Subjective and objective sleepiness in the active individual." International Journal of Neuroscience 52: 29-37, 1990), Multiple Sleep Latency Test (MSLT) (Carskadon, M. W. et al., "Guidelines for the multiple sleep latency test—A standard measure of sleepiness." Sleep 9 (4): 519-524, 1986) and the Maintenance of Wakefulness Test (MWT) (Mitler, M. M., Gujavarty, K. S. and Browman, C. P., "Maintenance of Wakefulness Test: A polysomnographic technique for evaluating treatment efficacy in patients with excessive somnolence." Electroencephalography and Clinical Neurophysiology 53:658-661, 1982); (iv) physiological measures such as tests based on blood pressure and heart rate changes, and tests relying on pupillography and electrodermal activity (Canisius, S. and Penzel, T., "Vigilance monitoring—review and practical aspects." Biomedizinische Technik 52(1): 77-82., 2007); (v) embedded performance measures such as devices that are used to measure a driver's performance in tracking the lane marker on the road (U.S. Pat. No. 6,894,606 (Forbes et al.)); and (vi) simulators that provide a virtual environment to measure specific task proficiency such as commercial airline flight simulators (Neri, D. F., Oyung, R. L., et al., "Controlled breaks as a fatigue countermeasure on the flight deck." Aviation Space and Environmental Medicine 73(7): 654-664., 2002). System 100 may use any of the alertness measurement techniques described in the aforementioned references or various combinations thereof in the implementation of alertness measurement means 114. All of the publications referred to in this paragraph are hereby incorporated by reference herein.

Figure 2A:
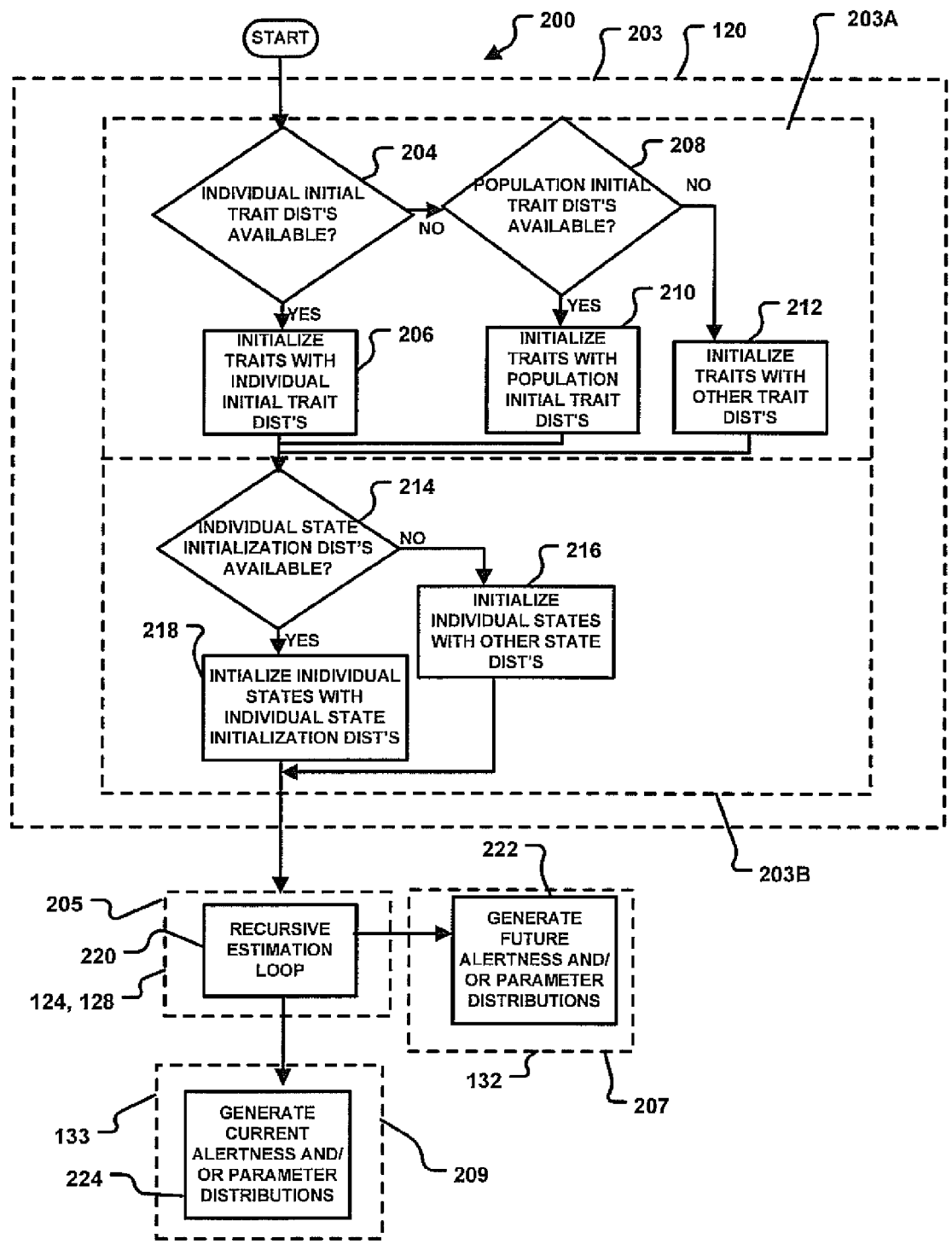
FIG. 2A is a schematic illustration of a prior-art method for individualized alertness prediction.

FIG. 2A schematically depicts a method 200 for individualized alertness prediction according to a particular embodiment of the invention. As explained in more detail below, method 200 may be performed by system 100.

Method 200 makes use of a mathematical model of human alertness. While it is explicitly recognized that the systems and methods of the invention may make use of a variety of suitable models, in one particular embodiment, method 201 makes use of the so called "two-process model" of sleep regulation developed by Borbély et al 1999. This model posits the existence of two primary regulatory mechanisms: (i) a sleep/wake-related mechanism that builds up exponentially during the time that subject 106 is awake and declines exponentially during the time that subject 106 is asleep, called the "homesstatic process" or "process S"; and (ii) an oscillatory mechanism with a period of (nearly) 24 hours, called the "circadian process" or "process C". Without wishing to be bound by theory, the circadian process has been demonstrated to be orchestrated by the suprachiasmatic nuclei of the hypothalamus. The neurobiology of the homeostatic process is only partially known and may involve multiple neuroanatomical structures.

In accordance with the two-process model, the circadian process C may be represented by:

$$C(t) = \gamma \sum_{l=1}^{5} a_l \sin(2l\pi(t - \phi)/\tau) \qquad (1)$$

where t denotes clock time (in hours, e.g. relative to midnight), $\phi$ represents the circadian phase offset (i.e. the timing of the circadian process C relative to clock time), $\gamma$ represents the circadian amplitude, and $\tau$ represents the circadian period which may be fixed at a value of approximately or exactly 24 hours. The summation over the index l serves to allow for harmonics in the sinusoidal shape of the circadian process. For one particular application of the two-process model for alertness prediction, l has been taken to vary from 1 to 5, with the constants $a_1$ being fixed as $a_1=0.97$, $a_2=0.22$, $a_3=0.07$, $a_4=0.03$, and $a_5=0.101$.

The homeostatic process S may be represented by:

$$S(t) = \begin{cases} e^{-\rho_w \Delta t} S_{t-\Delta t} + (1 - e^{-\rho_w \Delta t}) & \text{if during wakefulness} \quad (2a) \\ e^{-\rho_s \Delta t} S_{t-\Delta t} & \text{if during sleep} \quad (2b) \end{cases}$$

(S>0), where t denotes (cumulative) clock time, $\Delta t$ represents the duration of time step from a previously calculated value of S, $\rho_w$ represent the time constant for the build-up of the homeostatic process during wakefulness, and $\rho_s$ represents the time constant for the recovery of the homeostatic process during sleep.

Given equations (1), (2a) and (2b), the total alertness according to the two-process model may be expressed as a sum of: the circadian process C, the homeostatic process S multiplied by a scaling factor κ, and an added noise component ε(t):

$$y(t) = \kappa S(t) + C(t) + \epsilon(t) \quad (3)$$

Figure 3:
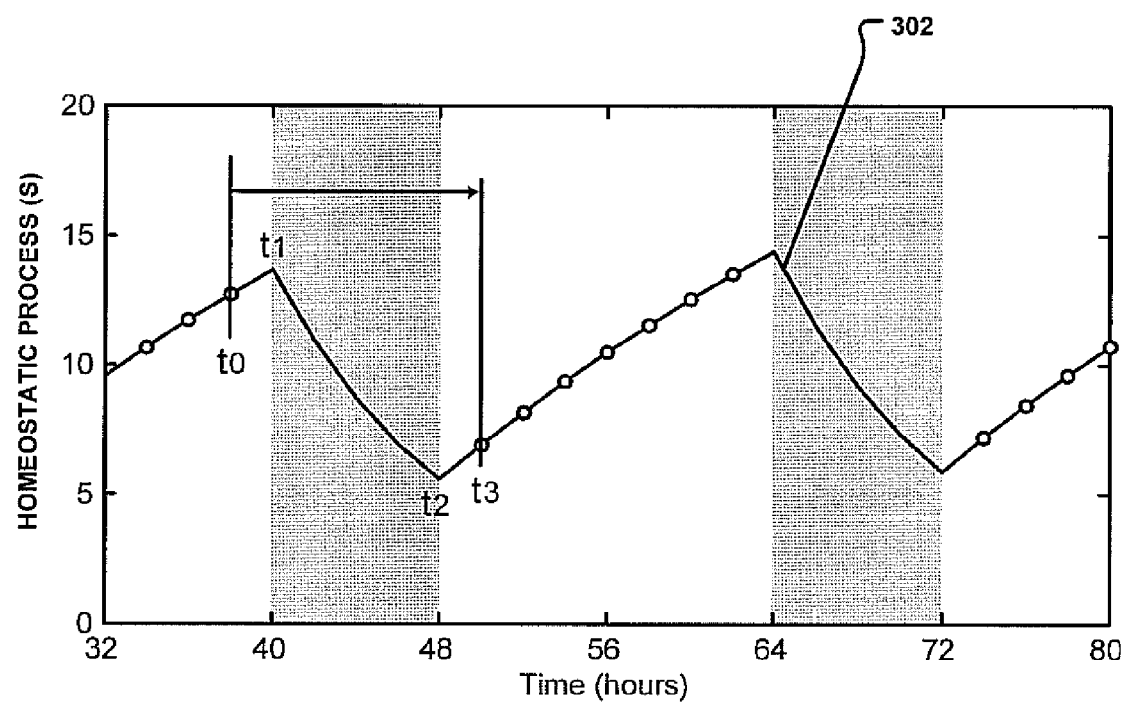
FIG. 3 is a plot showing the variation of the homeostatic process of a typical subject over the transitions between being asleep and awake.
Figure 4:
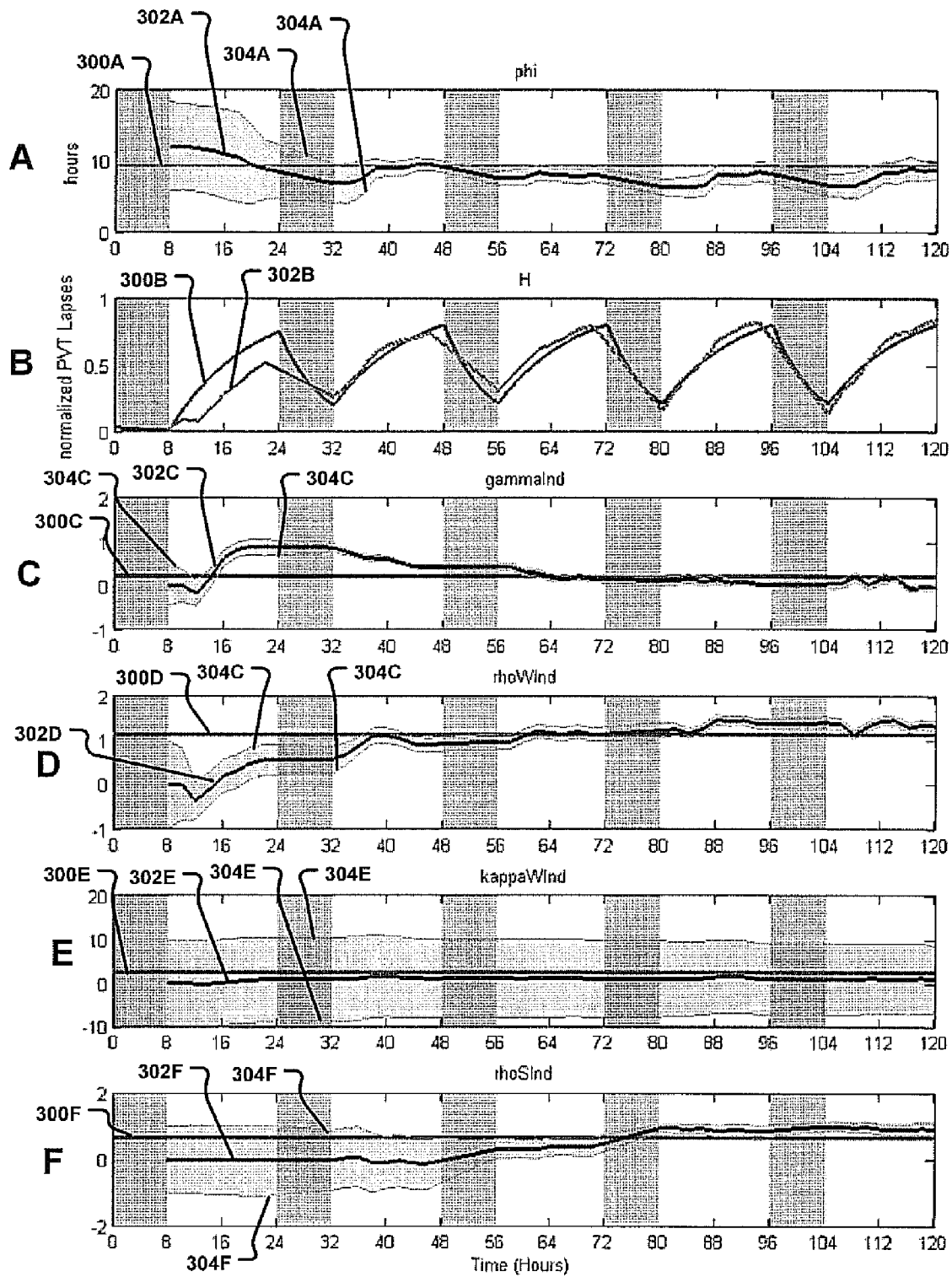
FIGS. 4A-4F represent schematic plots of various model variables and of performance outcomes predicted by the prior-art FIG. 2 method applied to a particular exemplary subject.

Equations (2a), (2b) represent difference equations which give the homeostat S(t) at some time t relative to $S_{t-\Delta t}$, the value of S at some previus time t−Δt. Equations (2a), (2b) separately describe the homeostatic process for the circumstance where subject 106 is awake (2a) or asleep (2b). During wakefulness the homeostat increases towards an upper asymptote and during sleep the homeostat switches to a recovery mode and decreases towards a lower asymptote. FIG. 3 is a plot showing a line 302 which represents the variation of a typical homeostatic process S over time. In the FIG. 3 plot, the subject is awake between hours 32-40, 48-64 and 72-80 (i.e. the white regions of the illustrated plot) and the homeostat S is shown to rise. The subject is sleeping between hours 40-48 and 64-72 (i.e the shaded regions of the illustrated plot) and the homeostat is shown to decay.

For the purposes of the invention, it is useful to be able to describe the homeostat 1 process S for subject 106 after one or more transitions between being asleep and being awake. As described in more particular detail below, the systems and methods of the invention may make use of measured alertness data which is typically only available when the subject is awake. Consequently, it is desirable to describe the homeostatic process between successive periods that subject 106 is awake. As the circadian process C is independent from the homeostatic process S, we may consider an illustrative case using only the homeostatic process S of equations (2a), (2b). Consider the period between $t_0$ and $t_3$ shown in FIG. 3. During this period, the subject undergoes a transition from awake to asleep at time $t_1$ and a transition from asleep to awake at time $t_2$. Applying the homeostatic equations (2a), (2b) to the individual segments of the period between $t_0$ and $t_3$ yields:

$$S(t_1) = S(t_0) e^{-\rho_w T_1} + (1 - e^{-\rho_w T_1}) \quad (4a)$$

$$S(t_2) = S(t_1) e^{-\rho_s T_2} \quad (4b)$$

$$S(t_3) = S(t_2) e^{-\rho_w T_3} + (1 - e^{-\rho_w T_3}) \quad (4c)$$

Where $$T_1 = t_1 - t_0 \quad (5a)$$

$$T_2 = t_2 - t_1 \quad (5b)$$

$$T_3 = t_3 - t_2 \quad (5c)$$

Substituting equation (5a) into (5b) and then (5b) into (5c) yields an equation for the homeostat at a time $t_3$ as a function of an initial known homeostat condition $S(t_0)$, the time constants of the homeostatic equations ($\rho_w, \rho_s$) and the transition durations ($T_1, T_2, T_3$):

$$S(t_3) = f_s(S(t_0), \rho_w, \rho_s, T_1, T_2, T_3) = [S(t_0) e^{-\rho_w T_1} + (1 - e^{-\rho_w T_1})] e^{-\rho_s T_2 - \rho_w T_3} + (1 - e^{-\rho_w T_3}) \quad (6)$$

Equation (6) applies to the circumstance where $t_0$ occurs during a period when the subject is awake, there is a single transition between awake a asleep at $t_1$ (where $t_0 < t_1 < t_3$), there is a single transition between asleep and awake at $t_2$ (where $t_1 < t_2 < t_3$), and then $t_3$ occurs after the subject is awake again. As will be discussed further below, this circumstance is useful from a practical perspective, because it is typically only possible to measure the alertness of a subject when the subject is awake. Consequently, it is desirable to be able to model the homeostatic process S for the period of time between the last alertness measurement on a particular day and the first alertness measurement on a subsequent day.

It will be appreciated that the process of deriving equation (6) from equations (2a), (2b) could be expanded to derive a corresponding equation that includes one or more additional transitions. Furthermore equation (3) could also be applied, without loss of generality, to the circumstance where there are no transitions by setting $T_2 = T_3 = 0$ and setting $T_1 = t_3 - t_0$.

Returning to FIG. 2A, individualized alertness prediction method 200 is now explained in more detail. For the purpose of simplifying explanation only, method 200 is divided into a number of distinct sections: initialization section 20, recursive estimation section 205, future prediction section 207 and current prediction section 209. Initialization section 203 may be further subdivided into individual trait initialization section 203A and individual state initialization section 203B.

Individual trait initialization section 203A may be implemented, at least in part, by initializor 120 (FIG. 1). A function of individual trait initialization section 203A is to determine the initial distributions for a number of variables (or parameters representative of such variables) related to individual traits of subject 106—referred to herein as "initial trait distributions". The initial trait distributions determined by trait initialization section 203A may be used subsequently in recursive estimation section 205, future prediction section 207 and current prediction section 209. In this description, the words "trait" and/or "individual trait" are used to refer to model variables that are particular to subject 106 and that have enduring (i.e. relatively non-time-varying) values for a particular subject 106. Traits may be contrasted with "individual states". As used in this application the phrase "individual state" is used to describe a model variable that is particular to subject 106, but which varies with circumstances or external conditions (e.g. sleep history, light exposure, etc.).

Non-limiting examples of individual traits include: whether subject 106 is alert on a minimum amount of sleep; whether individual 106 is a "night owl" (i.e. relatively more alert late at night) or a "morning person" (i.e. relatively mare alert in the early morning); the rate of change of alertness for subject 106 during extended wakefulness; the recovery rate of alertness for subject 106 during sleep; the extent to which time of day (circadian rhythm) influences alertness for subject 106; aptitude for specific performance tasks for subject 106; other traits for subject 106 described in Van Dongen et al., 2005 (an Dongen et al., "Individual difference in adult human sleep and wakefullness: Leitmotif for research agenda." Sleep 28 (4): 479-496. 2005). The references referred to in this paragraph are hereby incorporated herein by reference.

Non-limiting examples of individual states include: the amount of sleep that subject 106 had in the immediately preceding day(s); the level of homeostatic process of subject 106 at the present time; the circadian phase of subject 106 (Czeisler, C., Dijk, D, Duffy, J., "Entrained phase of the circadian pacemaker serves to stabilize alertness and performance throughout the habitual waking day," Sleep Onset: Normal and Abnormal Processes, pp 89-110, 1994 ("Czeisler, C. et al.")); the circadian amplitude of subject 106 (Czeisler, C. et al.); the current value of light response sensitivity in the circadian process (Czeisler, C., Dijk, D, Duffy, J., "Entrained phase of the circadian pacemaker serves to stabilize alertness and performance throughout the habitual waking day," pp. 89-110, 1994); the levels of hormones for subject 106 such as cortisol, or melatonin, etc. (Vgontzas, A. N., Zoumakis, E., et al., "Adverse effects of modest sleep restriction on sleepiness, performance, and inflammatory cytokines." Journal of Clinical Endocrinology and Metabolism 89(5): 2119-2126., 2004); the levels of pharmological agent(s) for subject 106 known to affect alertness su h as caffeine, or Modafinil (Kamimori, G. H., Johnson, D., et al., "Multiple caffeine doses maintain vigilance during early morning operations." Aviation Space and Environmental Medicine 76(11): 1046-1050, 2005). The references referred to in this paragraph are hereby incorporated herein by reference.

In individualized alertness prediction method 200, the individual traits of subject 106 are represented as random variables. In some embodiments, the individual traits of subject 106 are assumed to have probability distributions of known types which may be characterized by particular probability density function (PDF)-specifying parameters. For example, in one particular embodiment, the traits of subject 106 are assumed to have Gaussian probability distributions, where each Gaussian probability distribution may be specified by the PDF-specifying parameters of expected value (mean) and variance. Those skilled in the art will appreciate that there are other known types of probability distributions which may be specified completely by their corresponding PDF-specifying parameters. Thus, determination of the initial trait distributions for a number of traits of subject 106 (i.e. trait initialization section 203A) may be accomplished by determining the initial values for the PDF-specifying parameters for those individual traits.

Method 200 begins in block 204 which involves an inquiry into whether system 100 has access to individual initial trait distributions that are particular to subject 106 (i.e. the particular individual whose alertness is being assessed by system 100). Such individual initial trait distributions may have been experimentally determined prior to the commencement of method 200. By way of non-limiting example, such individual initial trait distributions may have been determined by a previous application of method 200 or a similar method for estimating individual traits or by a study conducted specifically to assess the individual traits. Individual initial trait distributions may be input to system 100 by any suitable input means as part of initialization data 116 (FIG. 1).

If individual initial trait distributions are available to system 100 (block 204 YES output), then method 200 proceeds to block 206 where the individual initial trait distributions are used to initialize the system model. Block 206 is explained in more detail below. In the general case, system 100 will not have access to individual initial trait distributions (block 204 NO output). In such circumstances, method 200 proceeds to block 208. Block 208 involves an inquiry into the availability of population alertness data. Population alertness data may comprise alertness data that is measured for a randomly selected group of n subjects over a number of data points for each subject and may be input to system 100 as part of initialization data 116 (FIG. 1). Preferably, the population alertness data is measured using a metric corresponding to the alertness model being employed by system 100. For example the population alertness data preferably comprises a series of alertness measurements y that correspond to the metric of equation (3). In some embodiments, the population data may be scaled, offset or otherwise manipulated to conform to the metric of the system model being employed by system 100.

If population alertness data is available (block 208 YES output), then method 200 proceeds to block 210 which involves determining initial trait distributions from the population alertness data and using these initial trait distributions to initialize the system model. In accordance with one particular embodiment, where the above-described two-process model is used by system 100 and method 200, the block 210 process of extracting initial trait distributions from population alertness data may be accomplished as follows. Population average parameter values and inter-individual variance can be estimated using the following mixed-effects regression equation:

$$y_{ij}(t_{ij}) = \kappa_i S_i(t_{ij}) + C_i(t_{ij}) + \epsilon_{ij} = P_i(t_{ij}) + \epsilon_{ij} \qquad (7)$$

where: $y_{ij}$ represents an alertness data element for a particular individual i (from among a population of i=1, ..., n individuals) at a time $t_{ij}$ (where j indexes the time points); $P_i(t_{ij}) = \kappa_i S_i(t_{ij}) + C(t_{ij})$ represents a subject-specific modeled value for alertness (see equation (3)); and $\epsilon_{ij}$ represents a residual error component of the model prediction $P_i(t_{ij})$ relative to the data $y_{ij}$. In this particular embodiment, it is assumed that $\epsilon_{ij}$ is an independent, Gaussian distributed random variable with mean zero and va ante $\sigma^2$. However, the residual error $\epsilon_{ij}$ may have other formats.

Assuming that the population alertness data s obtained from each subject during a single episode of wakefulness, then using equations (1), (2a) and (7), we may write:

$$P_i(t_{ij}, \rho_{w,i}, \gamma_i, \kappa_i, S_{i0}, \phi_{i0}) = \kappa_i S_{i0} \exp(-\rho_{w,i}(t_{ij} - t_{i0})) + \kappa_i(1 - \exp(-\rho_{w,i}(t_{ij} - t_{i0})) + \gamma_i \sum_l a_l \sin\left(\frac{2l\pi(t_{ij} - \phi_{i0})}{\tau}\right) \qquad (8)$$

where $\rho_{w,i}, \kappa_i, \gamma_i$ are subject-specific model parameters and $t_{i0}$ is a subject-specific modeling start time which may be chosen arbitrarily or to coincide with a useful operational time reference point.

We assume that there is inter-individual variance in the subjects which gave rise to the population alertness data. This inter-individual variance may be accounted for by assuming that the subject-specific model parameters $\rho_{w,i}, \kappa_i, \gamma_i$ are random variables. The variables $\rho_{w,i}$ (the homeostatic decay rate), $\kappa_i$ (the homeostat asymptote level) and $\gamma_i$ (the circadian amplitude) correspond to individual traits. In the particular embodiment described herein, it is assumed that $\rho_{w,i}$ and $\gamma_i$ are lognormally distributed over subjects round $\rho_0$ and $\gamma_0$, respectively, and that $\kappa_i$ is normally distributed over subjects around $\kappa_0$. It may also be assumed that the distributions of $\rho_i, \kappa_i, \gamma_i$ are independent across the population, although other assumptions are possible as well. It is generally not critical for the shape of the assumed distributions to describe the data very precisely, as the effect of the shape of the distributions on the results of the individualized prediction technique is limited.

In equation (8), the variable $S_{i0}$ (the homeostatic state for the $i^{th}$ individual in the sample population at time $t_{i0}$) and $\phi_{i0}$ (the circadian phase angle for the $i^{th}$ individual in the sample population at time $t_{i0}$) represent individual state parameters as they depend on the conditions under which the available data were collected. As such, the individual state parameters predicted by analysis of population data are generally not useful for the individualized prediction techniques of method 200 described in more detail below. The individual state parameters predicted by the analysis of the population data may be used if the subject 106 experienced similar circumstances (e.g. sleep history and/or light levels) as in the sample population. In currently preferred embodiments, individual state in is 110 (FIG. 1) are used to initialize the individual initial state distributions or the individual initial state distributions are initialized using general distributions (e.g. uniform and/or normal distributions), as explained in more detail below (see description of individual state initialization section 203B).

Taken together, these assumptions on the random variables of equation (8) for the sample population can be expressed as follows:

$$\rho_{w,i} = \rho_0 \exp(\nu_i) \quad (9a)$$

$$\gamma_i = \gamma_0 \exp(\eta_i) \quad (9b)$$

$$\kappa_i = \kappa_0 + \lambda_i \quad (9c)$$

$$S_{i0} = S_0 \quad (9d)$$

$$\phi_{i0} = \phi_0 \quad (9e)$$

where $\nu_i$, $\eta_i$ and $\lambda_i$ are independently normally distributed random variables over the individuals $i=1, \ldots, n$ in the population with means of zero and variances $\psi^2$, $\omega^2$ and $\chi^2$ respectively. Characterization of the trait inter-individual variability in the population in the framework of the two-process model (equation (3)) may therefore involve obtaining the mean values $\rho_0$, $\gamma_0$, $\kappa_0$ and assessing the normal distribution for $\nu_i$, $\eta_i$, and $\lambda_i$ by estimating the variance parameters $\psi^2$, $\omega^2$ and $\chi^2$.

Substituting equations (8) and (9a)-(9e) into equation (7) yields the following formulation of the mixed-effects regression equation:

$$\begin{aligned} y_{ij} &= P_i(t_{ij}, \rho_{w,0}, S_0, \gamma_0, \kappa_0, \phi_0, \nu_i, \eta_i, \lambda_i) + \varepsilon_{ij} \quad (10) \\ &= (\kappa_0 + \lambda_i) S_0 \exp(-\rho_{w,0} \exp(\nu_{w,i})(t_{ij} - t_{i0})) + \\ &\quad (\kappa_0 + \lambda_i)(1 - \exp(-\rho_{w,0} \exp(\nu_{w,i})(t_{ij} - t_{i0})) + \\ &\quad \gamma_0 \exp(\eta_i) \sum_l a_l \sin\left(\frac{2l\pi(t_{ij} - \phi_0)}{\tau}\right) + \varepsilon_{ij} \end{aligned}$$

The free parameters of mixed-effects regression equation (10) include: the population mean values $\rho_{w,0}$, $\gamma_0$, $\kappa_0$ of the individual trait parameters; the zero-mean, normally distributed variables $\nu_i, \eta_i, \lambda_i$ of the individual trait parameters (with their respective variances $\psi^2$, $\omega^2$ and $\chi^2$); the values $S_0, \phi_0$, of the individual state parameters; and the variance $\sigma^2$ of the residual error $\varepsilon_{ij}$. These parameters can be estimated by means of maximum likelihood estimation or another statistical estimation technique (e.g. least squares analysis). To illustrate the parameter estimation by means of maximum likelihood estimation, we let the probability density function (PDF) of a normal distribution with mean m and variance $s^2$ for a random variable x be denoted as $p[x; m, s^2]$. The likelihood of observing the data $y_{ij}$ for a given subject i can be expressed as a function of the regression equation parameters, as follows:

$$l_i(\rho_{w,0}, S_0, \gamma_0, \kappa_0, \phi_0, \nu_i, \eta_i, \lambda_i, \sigma^2) \propto \quad (11)$$

$$\prod_j p[y_{ij}; P_i(t_{ij}, \rho_{w,0}, S_0, \gamma_0, \kappa_0, \phi_0, \nu_i, \eta_i, \lambda_i), \sigma^2]$$

Using equation (11), the marginal likelihood $L_i$ of observing the data $y_{ij}$ for a given subject i is obtained by integrating over the assume distributions for $\nu_i, \eta_i, \lambda_i$ to account for all possible values of these parameters:

$$L_i(\rho_{w,0}, S_0, \gamma_0, \kappa_0, \phi_0, \Psi^2, \omega^2, \chi^2, \sigma^2) \quad (12a)$$

$$\propto \int_{\nu_i} \int_{\eta_i} \int_{\lambda_i} l_i(\rho_{w,0}, S_0, \gamma_0, \kappa_0, \phi_0, \nu_i, \eta_i, \lambda_i, \sigma^2)$$

$$p[\nu_i; 0, \Psi^2] p[\eta_i; 0, \omega^2] p[\lambda_i; 0, \chi^2] d\nu_i d\eta_i d\lambda_i$$

where the integrals each run from $-\infty$ to $\infty$. The likelihood L of observing the entire data set, for all subjects collectively, can then be expressed as a function of the regression parameters, as follows:

$$L(\rho_{w,0}, S_0, \gamma_0, \kappa_0, \phi_0, \Psi^2, \omega^2, \chi^2, \sigma^2) = \quad (12b)$$

$$\prod_i L_i(\rho_{w,0}, S_0, \gamma_0, \kappa_0, \phi_0, \Psi^2, \omega^2, \chi^2, \sigma^2)$$

In maximum likelihood estimation, we now want to estimate the parameter values ($\rho_0, \gamma_0, \kappa_0, S_0, \phi_0, \psi^2, \omega^2, \chi^2, \sigma^2$) that would make it maximally likely to observe the population alertness data $y_{ij}$ as they were observed. This maximum likelihood estimation may be accomplished by maximizing L (equation (12b)), but is typically done by minimizing $-2 \log L$, as minimizing $-2 \log L$ is equivalent but generally easier to perform numerically than maximizing L. The ensuing values of the parameters ($\rho_0, \gamma_0, \kappa_0, S_0, \phi_0, \psi^2, \omega^2, \chi^2, \sigma^2$) obtained by maximizing L (minimizing $-2 \log L$) and the system equation (regression equation (10)) establish what is referred to herein as the "population model". The population model describes: the time varying prediction of performance according to the two-process model (e.g. equation (3)); the systematic inter-subject variance in the parameters of the two-process model (e.g variation of individual traits between different subjects); individual state parameters of individuals at the start time $t_o$; and the error variance for each subject in the sample representing the population.

Returning to FIG. 2A, the parameter value (e.g. $\rho_0, \gamma_0, \kappa_0, S_0, \phi_0, \psi^2, \omega^2, \chi^2, \sigma^2$) of the population model may be used in block 210 to initialize the equation (3) model with population-based initial trait distributions. In some embodiments, the initial trait distributions initialized in block 210 include the individual trait parameters (e.g. $\rho, \gamma, \kappa$) of the population model and the residual error s, but do not include the individual state parameters (e.g. S, $\phi$). The individual state-related parameters (e.g. S, $\phi$) may be initialized subsequently. It will be appreciated from the above explanation and assumptions that the probability distributions of the individual trait parameters $\rho, \gamma, \kappa$ may be characterized by the value $\rho_0, \gamma_0, \kappa_0$ and the variances $\psi^2, \omega^2, \chi^2$ of the assumed zero-mean, normal distributions $\psi^2, \omega^2, \chi^2$ and the residual error $\varepsilon$ may be a zero-mean random variable characterized by its variance $\sigma^2$.

For data sets collected in situations with multiple sleep-wake transitions, the switching homeostat model of equation (6) would be substitued for the waking homeostat equation (2a) when deriving equation (8) from equation (7). Those skilled in the art will appreciate that a technique similar to that described above may then be applied to derive the population model for the circumstance of multiple sleep-wake transitions. For the interest of conciseness, this calculation is not performed here.

As discussed above, in some circumstances individual initial trait probability information will be available (block 204 YES output), in which case method 200 proceeds to block 206 and the individual initial trait probability information is used to initialize the trait parameters. It will be appreciated that the individual initial trait distributions used in the model initialization of block 206 may comprise individual-based values for the same individual trait parameters (e.g. $\rho, \gamma, \kappa$) as the block 210 initialization based on the population model derived above. In some embodiments, the block 206 initial individual trait distributions may be characterized by similar parametric functions. By way of non-limiting example, the block 206 individual trait distributions for the individual trait parameters $\rho, \gamma, \kappa$ may be characterized by their mean values $\rho_0, \gamma_0, \kappa_0$ and their variances $\psi^2, \psi^2, \chi^2$.

If there are no individual initial trait distributions available (block 204 NO output) and there are no population alertness data available (block 208 NO output), then method 200 proceeds to block 212, where other data are used to initialize the individual trait parameters (e.g. $\rho, \gamma, \kappa$). In some embodiments, block 212 may involve assigning predetermined values to the individual trait parameters. In some embodiments, block 212 may involve assigning uniform probabilities to one or more of the individual trait parameters (e.g. $\rho, \gamma, \kappa$ or $\nu, \eta, \lambda$). In some embodiments, block 212 may involve assigning normally distributed probabilities to one or more of the individual trait parameters (e.g. $\rho, \gamma, \kappa$ or $\nu, \eta, \lambda$).

In the illustrated embodiment, trait initialization section 203A concludes with initialization of the trait parameters in one of blocks 206, 210, 212. Although not explicitly shown in FIG. 2A, some embodiments may involve initializing the trait parameters using a combination of individual initial trait distributions, population-based trait distributions and/or other trait data. In any event, at the conclusion of trait initialization section 203A, the system 100 model is initialized with initial probability estimates for parameters representing the individual traits of subject 106. Method 200 then proceeds to individual state initialization section 203B.

Individual state initialization section 203B comprises initializing the model with initial values or distributions for the individual state parameters (i.e. those parameters that may vary with circumstances or external conditions). As mentioned above, the homeostatic state S and the circadian phase angle $\phi$ are examples of individual state parameters which may change for any given individual based on his or her circumstances (e.g. due to recent sleep loss and/or circadian phase shifting from a bout of shift work). Method 200 enters individual state initialization section 203B at block 214. Block 214 involves an inquiry into whether there is state initialization data available for subject 106. State initialization dta for subject 106 may comprise individual state inputs 110 from individual state input means 112 (FIG. 1). If there is state initialization data available for subject 106 (block 214 YES output), then method 200 proceeds to block 218.

Block 218 may be performed by initializor 120 (FIG. 1). In particular embodiments, block 218 involves initializing the individual state parameters based on the individual state initialization data 110 (FIG. 1) available for subject 106. In one particular embodiment based on the two-process model described above, such state initialization data 110 may comprise initial estimates for the individual state parameters S, $\phi$ and/or data which may be used to generate initial estimates for the individual state parameters S, $\phi$ (e.g. measurements of melatonin to estimate circadian phase $\phi$). Such state initialization data 110 may also comprise information relating to the history of administration of pharmacological agents (e.g. stimulant, depressant or the like) to subject 106. State variables corresponding to pharmacological agents may introduce additional parameters (which may comprise individual state parameters and/or individual trait parameters) to the above-discussed two-process model.

Non-limiting examples of the block 218 state initialization process include: estimating a probability distribution of the initial homeostatic state S for subject 106 (e.g. an expected initial value $S_0$ and a corresponding variance in the case of a normal distribution or upper and lower bounds in the case of a uniform distribution) based on the history of sleep and wake periods for subject 106; estimating a probability distribution of the initial homeostatic state S for subject 106 based on the history of time in bed for subject 106; estimating a probability distribution of the initial circadian phase $\phi$ for subject 106 (e.g. an expected initial value $\phi_0$ and a corresponding variance in the case of a normal distribution or upper and lower bounds in the case of a uniform distribution) based on a history of light exposure for subject 106; estimating a probability distribution of the initial circadian phase $\phi$ based on the time of spontaneous waking for subject 106; estimating a probability distribution of the initial circadian phase $\phi$ based on measurements of physiological parameters of subject 106 (e.g. melatonin levels, core body temperature or other physiological parameters of subject 106 that correlate to circadian phase); estimating a probability distribution of an initial level of pharmacological agent (e.g. stimulant, depressant or the like) based on the timing and dosage history of the pharmacological agent received by subject 106.

As one example of state initialization process for circadian phase $\phi$ based on measurements of physiological parameters, a 24 hour history of core body temperature measurements may be analyzed with a least squares fit of a $2^{nd}$ order fourier function (see Klerman, E. et al., "Comparisons of the Variability of Three Markers of the Human Circadian Pacemaker." Journal of Biological Rhythms. 17(2): 181-193, 2002) to find the time of core body temperature minimum with a standard error (e.g. 4:30 a.m.+/−20 minutes), and then the circadian phase may be estimated using a linear offset from the minimum time (e.g. $\phi$ mean of 4.5 h+0.8 h=5.3 h (see Jewett, M. E., Forger, D., Kronauer, R., "Revised Limit Cycle Oscillator Model of Human Circadian Pacemaker." Journal of Biological Rhythms. 14(6): 492-499, 1999) with a standard deviation of 0.33 h).

Estimating a probability distribution of the initial circadian phase $\phi$ based on the light exposure history of subject 106 may comprise measurement of other factors which may be correlated to light exposure. By way of non-limiting example, such factors may include time in bed and/or sleep times or models predicting light level based on latitude and time of day as resulting from the Earth's orbital mechanics. Estimating a probability distribution of the initial circadian phase $\phi$ based on the light exposure history of subject 106 may comprise estimating and/or measuring environmental light levels in addition to or as an alternative to direct light exposure estimates/measurements.

If there is no state initialization data available for subject 106 (block 214 NO output), then method 200 proceeds to block 216 which involves initializing the individual state parameters of the system 100 model (e.g. S, $\phi$) using general probability distributions. In some embodiments, block 216 may involve assigning predetermined distributions or distributions determined based on other factors to the initial individual state parameters. In some embodiments, block 216 may involve assigning uniform probabilities to one or more of the individual state parameters (e.g. S, $\phi$). In some embodiments, block 216 may involve assigning normally distributed probabilities to one or more of the individual state parameters (e.g. S, $\phi$).

In the illustrated embodiment, individual state initialization section 203B concludes with initialization of the individual state parameters in on of blocks 216, 218. Although not explicitly shown in FIG. 2A, some embodiments may involve initializing the individual state parameters using a combination of individual state initialization data (e.g. individual state inputs 110) and/or general individual state data. In any event, at the conclusion of individual state initialization section 203B, the system 100 model is initialized with initial probability estimates for parameters corresponding to both the individual traits and the individual states of subject 106.

Method 200 then proceeds to recursive estimation section 205 and more particularly to recursive estimation loop 220.

In the illustrated embodiment, recursive estimation loop 220 is performed by predictor 124 and by measurement updator 128 (FIG. 1). Recursive estimation loop 220 may be performed using a Bayesian recursive process which, in the illustrated embodiment, involves recasting the system 100 model described above as a dynamic state-space model. A dynamic model is a mathematical description of a system defined by a set of time-varying state variables, and functions that describe the evolution of the state variables from one time to the next. A state-space model formulation typically consists of a pair of equations referred to as the state transition equation and the measurement equation. Bayesian recursive estimation may involve introducing noise inputs to both the state transition equation and the measurement equation, as is typical in a Kalman filter. A discrete-time state-space model consists of a vector of state parameters x that is evaluated at discrete times $t_k$ for k=1 . . . n. A general state transition function describing the value of the state x at time k as a function of the value of the state x at time k−1, an input vector u and a linear additive process noise ν is given by:

$$x_k = f_k(x_{k-1}, y_{k-1}) + c_{k-1} \tag{13}$$

A general measurement equation describing the value of the output by at time k for the case of linear additive measurement noise ε is given by:

$$y_k = h_k(x_k, u_k) + \epsilon_k \tag{14}$$

The process noise term ν in state transition equation (13) provides a distinction between the dynamic model of equations (13), (14) and conventional static (non-dynamic) models, as the process noise ν represents a mechanism to model own or uncertain inputs to the system. Such process noise inputs could not be characterize or implemented in a static model. While a dynamic model is used in the illustrated embodiment, the present invention may additionally or alternatively be applied to static models. To develop a prediction algorithm for alertness, the above-described two-process model (equation (3)) may be cast as a discrete-time dynamic model. The homeostat equations (i.e. equations (2a), (2b) or (4a), (4b), (4c)) are already set out in a difference equation format, which is helpful for creating state space model representations. The circadian equation (1) may be converted from function of absolute time into a difference equation format.

The conversion of the circadian equation (1) into a difference equation format may be performed using a wide variety of techniques. In particular embodiments, it is desirable to reformat the circadian equation (1) into a difference equation form that retains a distinct phase variable to allow for efficient parameter estimation. One technique which retains a distinct phase variable is presented here, it being understood that other alertness models and other methods of presenting such models in difference equation format may be used in accordance with the invention.

Circadian equation (1) includes a sum of sinusoids with corresponding phase angles specified by time t, phase offset φ and period τ. For fixed phase offset φ and a period τ of, say, twenty-four hours, the phase angle (i.e. the argument of the sinusoidal functions in equation (1)) will increase by 2π (i.e. one cycle) for every twenty four-hour increase in time t. To generate a discrete-time difference equation, the time t and phase offset φ terms can be replaced with a phase angle variable θ such that:

$$C(t) = \gamma e^\eta \sum_{l=1}^{5} a_l \sin(2l\pi\theta/\tau) \tag{15}$$

where:

$$\theta = t - \varphi \tag{16}$$

For a given phase offset φ, the phase angle variable θ(t) can now be described in a difference equation format (i.e. a function of a time increment Δt from a previous value θ(t−Δt)):

$$\theta(t) = \theta(t-\Delta t) + \Delta t \tag{17}$$

Using equation (17), the above-described two-process model can be described as a dynamic state-space model. We first define a state vector x as follows:

$$x = \begin{bmatrix} S \\ \theta \end{bmatrix} \tag{18}$$

The discrete-time transition equations may be written using equations (4a), (4b), (4c) for the homeostatic component and equation (17) for the circadian phase angle:

$$x_k = F(x_{k-1}, u_{k-1}, v_{k-1}) \tag{19}$$

$$\begin{bmatrix} S_k \\ \theta_k \end{bmatrix} = \begin{bmatrix} f_s(S_{k-1}, \rho_w \exp(-v_{w,k-1}), \rho_s \exp(-v_{s,k-1}), T_1, T_2, T_3) \\ \theta_{k-1} + T_1 + T_2 + T \end{bmatrix} + \begin{bmatrix} v_{1,k-1} \\ v_{2,k-1} \end{bmatrix}$$

The measurement equation may be defined on the basis of equations (3), (14) and (16) as:

$$y_k = H(x_k, \epsilon_k) = \left[ (\kappa + \lambda_k) S_k + \gamma \exp(\eta_k) \sum_{l=1}^{5} \alpha_l \sin\left(\frac{2l\pi\theta_k}{\tau}\right) \right] + [\epsilon_k] \tag{20}$$

Now, to expose the trait probability parameters the state vector may be augmented to include the parameters indicative of the traits of subject 106. The transition equation (19) includes homeostatic rate parameters $v_w$ and $v_s$ and the measurement equation (20) includes homeostatic asymptote λ, and circadian amplitude parameter η, which are added to the state vector of equation (18) to give the augmented state vector:

$$x = \begin{bmatrix} S \\ \theta \\ v_w \\ v_s \\ \eta \\ \lambda \end{bmatrix} \tag{21}$$

In this augmented state vector S and θ represent individual state parameters and $v_w$, $v_s$, η, λ represent individual trait parameters. The inclusion of the trait parameters ($v_w$, $v_s$, η, λ) allows the values of these trait parameters to be estimated and updated in subsequent iterations of the recursive estimation loop 220.

Adopting the augmented state vector of equation (21), the state transition equation of (19) may be rewritten:

$$x_k = F(x_{k-1}, u_{k-1}, v_{k-1}) \quad (22)$$

$$\begin{bmatrix} S_k \\ \theta_k \\ v_{w,k} \\ v_{s,k} \\ \eta_k \\ \lambda_k \end{bmatrix} = \begin{bmatrix} f_S(S_{k-1}, \rho_w \exp(-v_{w,k-1}), \rho_s \exp(-v_{s,k-1}), T_1, T_2, T_3) \\ \theta_{k-1} + T_1 + T_2 + T_3 \\ v_{w,k-1} \\ v_{s,k-1} \\ \eta_{k-1} \\ \lambda_{k-1} \end{bmatrix} + \begin{bmatrix} v_{1,k-1} \\ v_{2,k-1} \\ v_{3,k-1} \\ v_{4,k-1} \\ v_{5,k-1} \\ v_{6,k-1} \end{bmatrix}$$

The measurement equation retains the form of equation (20).

In some embodiments, the block 220 recursive estimation loop is based on a Bayesian estimation technique which provides a method for incorporating advantageous features of probability distributions of stochastically related variables (rather than just maximum likelihood) into parameter estimation and prediction problems. To apply Bayesian statistical techniques to the state-space model discussed above, the variables of both the state transition equation (22) and the measurement equation (20) are assumed to be random variables having probability distributions. Bayesian estimation loop 220 may then construct posterior probability density functions for the state variables based on all available information, including the initial (prior) probability distributions (e.g. the initial distributions for the individual trait parameters from trait initialization section 203A and the individual state parameters from state initialization section 203B) and sequences of received inputs and/or measurements.

Figure 2B:
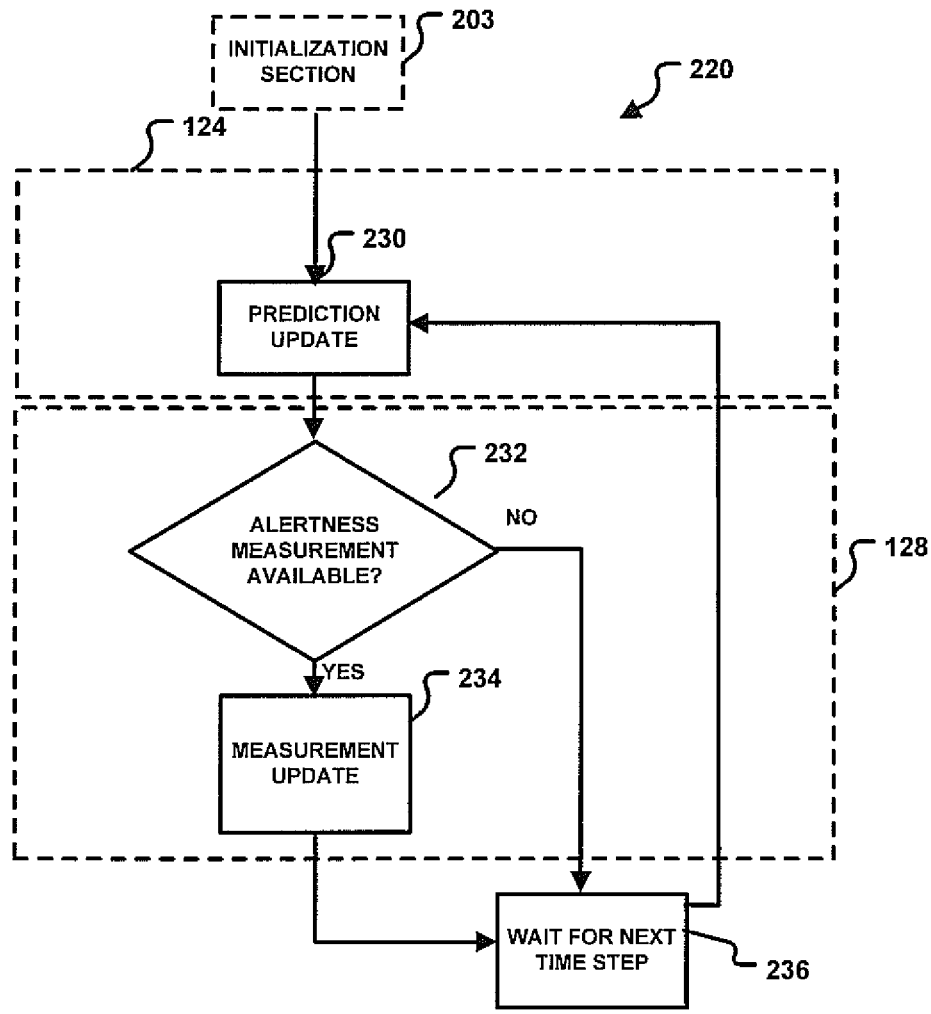
FIG. 2B is a schematic illustration of a prior-art method for performing the recursive estimation loop of the FIG. 2A method.

A particular embodiment of Bayesian estimation loop 220 is illustrated in FIG. 2B. Generally speaking, Bayesian estimation loop 220 comprises, using the state transition equation of the system 100 model (e.g. equation (22)) in prediction update block 230 to adjust the probability distributions of the state variables at each time step, and using the measurement equation of the system 100 model (e.g. equation (20)) in measurement update block 234 to adjust the probability distributions of the state variables as each measurement becomes available.

After initialization section 203, method 200 enters recursive estimation loop 220 and proceeds to prediction update block 230. Prediction update block 230 may be performed by predictor 124 (FIG. 1) and may generally involve predicting probability distributions of the state variables x from a previous time $t_{k-1}$ to a current time $t_k$ $$\left( \text{where } t_k = t_0 + \sum_{j=0}^{k-1} \Delta t_j \right).$$

The state-space variable distributions determined in prediction update block 230 may be referred to herein as the "predicted state-space variable distributions". The predicted state-space variable distributions may be mathematically denoted $p(x_k|U_k,Y_{k-1},x_0)$ and are referred to in FIG. 1 using reference numeral 126. The predicted state-space variable distributions 126 determined in block 230 represent the state-space variable distributions $p(x_k|U_k,Y_{k-1},x_0)$ at a time $t_k$ given: all inputs $U_k$ up to the time $t_k$ (where the capital "U" notation is meant to indicate $U_k=\{u_j, j=0, 1 \ldots, k\}$ and $u_j$ represents the input between the times $t_j$ and $t_{j-1}$); all prior measurements $Y_{k-1}$ up to the time $t_{k-1}$ (where the capital "Y" notation is mea t to indicate $Y_{k-1}=\{y_j, j=0 \ldots k-1\}$ and $y_j$ represents the alertness measurement at time $t_j$); and the initial state-space variable distributions $x_0$.

In some embodiments the block 230 prediction update operation may be based on: (i) a prior probability distribution of the state-space variables; and (ii) a transitional probability distribution. The block 230 determination of the predicted state-space variable distributions 126 at time $t_k$ may involve using the Chapman-Kolmogorov equation:

$$p(x_k \mid U_k, Y_{k-1}, x_0) = \quad (23)$$

$$\int_{-\infty}^{\infty} p(x_k \mid x_{k-1}, u_k) p(x_{k-1} \mid U_{k-1}, Y_{k-1}, x_0) dx_{k-1}$$

The Chapman-Kolmogorov equation (23) may also be referred to as the "prediction update" equation (23). The prediction update equation (23) describes the probability $p(x_k)$ of observing a particular state-space vector x (at time $t_k$. Prediction update equation (23) allows the probability distribution of the state vector x to evolve in time.

The term $p(x_{k-1}|U_{k-1},Y_{k-1},x_0)$ of equation (23) is referred to as the "prior probability distribution" and describes the probability distribution of the state variables $x_{k-1}$ at time $t_{k-1}$, given: all prior inputs $U_{k-1}$; all prior alertness measurements $Y_{k-1}$; and the initial state variable probability distributions $x_0$. At time $t_k$, the prior probability distribution is an estimated quantity based either on the initialization distributions or on the previous iteration of loop 220.

The term $p(x_k|x_{k-1},u_k)$ of equation (23) is referred to as the "transitional probability distribution" and describes the probability distribution of the state variables at time $t_k$, given: the inputs $u_k$ between $t_k$ and $t_{k-1}$; and the state variables $x_{k-1}$ at the previous time $t_{k-1}$. The transitional probability distribution may be calculated in prediction update block 230 based on the model's state transition equation (e.g. equation (22)).

In particular embodiments, the input data $u_k$ for the prediction update equation (23) implemented in each iteration of prediction update block 230 may comprise individual state inputs 110 provided by individual state input means 112. As discussed above, one non-limiting example of input data $u_k$ includes times of transitions between sleep and wake that may impact the prediction of the homeostatic state-space variable S. The transitions may be described by parameters $T_1, T_2, T_3$ as defined in equations (5a), (5b), (5c), for example. Other non-limiting examples of individual state inputs 110 that may be incorporated into input data $u_k$ include light exposure history for subject 106 (which will affect the circadian state space variable 8) and/or stimulant intake timing and quantity.

In general, for a given subject 106, the predicted probability distributions 126 for the state-space variables corresponding to individual traits (e.g. $v_w, v_s, \eta, \lambda$) will remain unchanged over each iteration of prediction update block 230, but the predicted probability distributions 126 of the state-space variables corresponding to individual states (e.g. S, $\theta$) may change. The state-space variables corresponding to individual traits may be changed by the measurement updator 128

(subsequently described), but they do not generally change value in prediction update block 230 since they are predicted to be stable over time.

The state transition equation of the model used in system 100 (e.g. equation (22)) is used in block 230 to determine the transitional probability distribution. It is noted that the model state transition equation (e.g. equation (22)) incorporates process noise terms $v_{k-1}$. System 100 may set these process noise terms $v_{k-1}$ on the basis of a number of factors. By way of non-limiting example, the process noise terms $v_{k-1}$ may be determined on the basis of experimental tuning to determine optimal performance or may be based on known sources of uncertainty. In the case of the two-process model, one non-limiting example of a source of uncertainty for the homeostatic state-space variable (S) is the uncertainty surrounding the exact time of transition from wake to sleep or vice versa. One non-limiting example of a source of uncertainty for the circadian state-space variable ($\theta$) is the level of light exposure or other zeitgebers that would cause shifts in the circadian phase ($\phi$). The incorporation of process noise $v_{k-1}$ may allow the block 230 prediction update to reflect various sources of uncertainty and, as discussed further below, may allow time-varying changes to be tracked by the block 234 measurement update, even when individual state inputs 110, $u_k$ are not accurately known. It is possible to set some or all of the process noise elements of vector $v_{k-1}$ to zero.

The settings of the process noise terms $v_{k-1}$ may determine additional uncertainty which is introduced to the predicted state-space variable distributions in prediction update block 230. If, within process noise vector $v_{k-1}$, the process noise settings for a particular state-space variable are relatively small, then the block 230 prediction update will tend to add a correspondingly small increase in the uncertainty in the resultant predicted probability distribution 126 for that state-space variable. If, within process noise vector $v_{k-1}$, the noise settings for a particular state-space variable are relatively large, then the block 230 prediction update will tend to add a correspondingly large increase in the uncertainty in the resultant predicted probability distribution 126 for that state-space variable.

The prediction update equation (23) used in prediction update block 230 typically has analytical solutions when the state transition equation and the measurement equation of the system 100 model include only linear components and the noise terms $v_{k-1}$ are additive with random Gaussian distributions. In the case of the two-process model considered above with state transition equation (22) and measurement equation (20), a non-linearity exists in the measurement equation. Analytical solutions for the prediction update equation (23) are therefore not generally possible. Approximation techniques may be used to generate the predicted state-space variable distributions 126 determined by predictor 124. Non-limiting examples of such approximation techniques include numerical computation techniques, linearizing assumptions, other suitable assumptions and the like. In accordance with one particular embodiment, the block 230 Bayesian prediction update estimation may be approximated using the prediction update steps from an Unscented Kalman Filter (UKF). See Wan, E. A. et al., "The unscented Kalman filter for nonlinear estimation." Adaptive Systems for Signal Processing, Communications, and Control Symposium 2000, The IEEE, 1-4 Oct. 2000 Page(s):153-158 ("Wan, E. A. et al."), which is hereby incorporated herein by reference.

A UKF prediction update assumes that the state-space variable prior probability distributions $p(x_{k-1})$ at time $t_{k-1}$ have Gaussian distributions, characterized by means $\hat{x}$ and covariances $P_x$. In the first iteration of prediction update block 230, predictor 124 (FIG. 1) may receive initial state-space variable distributions 122, $p(x_0)$ (characterized by characterized by means $\hat{x}$ and covariances $P_x$) from initializor 120 (FIG. 1) as prior probabilities. At subsequent time steps, predictor 124 may receive, as prior probabilities, either: (i) updated state-space variable distributions 130 (characterized by means $\hat{x}$ and covariances $P_x$) from measurement updator 128 (FIG. 1), in the case where there is an alertness measurement 108, $y_k$ (FIG. 1) at the current time $t_k$; or (ii) predicted state-space variable distributions 126 (characterized by means $\hat{x}$ and covariances $P_x$) from predictor 124 (FIG. 1), in the case where there is no alertness measurement 108, $y_k$ at the current time $t_k$. It should be noted here that when predictor 124 receives initial state-space variable distributions 122 from initializor 120, updated state-space variable distributions 130 from measurement updator 128 or predicted state-space variable distributions from predictor 124, these initial/update predicted state-space variable distributions become the "prior probability distribution" $p(x_{k-1}|U_{k-1},Y_{k-1},x_0)$ for the purposes of prediction update equation (23).

In accordance with the UKF, predictor 124 then uses the characterization (means $\hat{x}$ and covariances $P_x$) of this prior probability distribution to determine predicted state-space variable probability distributions 126 at the time $t_k$ according to prediction update equation (23) using a deterministic sampling approach. In accordance with this approach, the sample points may comprise a minimal set of precisely chosen points, calculated by a sigma point sampling method, for example.

After receiving the prior probability distribution, predictor 124 may create an augmented state vector by adding random variables for the system noise $n_{k-1}$ and the process noise $v_{k-1}$ to the original state variables $x_{k-1}$, resulting in an augmented state-space vector $x_{k-1}^a$ for the time $t_{k-1}$:

$$x_{k-1}^a = [x_{k-1} v_{k-1} n_{k-1}] \quad (24)$$

Given the original state covariance $P_x$, process noise covariance $P_v$ and measurement noise covariance $P_n$, predictor 124 may then create an augmented covariance matrix $P_x^a$:

$$P_x^a = \begin{bmatrix} P_x & 0 & 0 \\ 0 & P_v & 0 \\ 0 & 0 & P_n \end{bmatrix} \quad (25)$$

The sigma points representing the distribution of points in a given state vector $x_{k-1}$ may then be created according to:

$$\chi_{k-1}^a = [x_{k-1}^a \; x_{k-1}^a \pm \sqrt{(L+\Lambda)P_{k-1}^a}] \quad (26)$$

where L is the dimension of the given state-space vector and $\Lambda$ is a scaling parameter as described in Wan, E. A. et al. The sigma point vector $\chi_{k-1}^a$ is considered to consist of three parts:

$$\chi_{k-1}^a = [(\chi_{k-1}^x)^T (\chi_{k-1}^v)^T (\chi_{k-1}^n)^T]^T \quad (27)$$

After creating the set of sigma points $\chi_{k-1}^a$ that represent the prior probability distribution, a corresponding set of weights $W_{k-1}^a$ may be generated using steps described in Wan, E. A. et al. The sigma points $\chi_{k-1}^a$ and weights $W_{k-1}^a$ represent the prior probability distribution $p(x_{k-1}|U_{k-1},Y_{k-1},x_0)$ of prediction update equation (23). The block 230 process of determining the predicted state-space variable distributions 126 from time $t_{k-1}$ to $t_k$ may then be implemented by passing the sigma points through the model's state transition function (e.g. equation (22)) according to:

$$\chi_{k|k-1}^x = F(\chi_{k-1}^x, u_k, \chi_{k-1}^v) \quad (28)$$

The equation (28) expression $\chi_{k|k-1}{}^x$ together with the weights $W_{k-1}{}^a$ represent the UKF analog of the left-hand side of equation (23)—i.e. the predicted state-space variable distributions.

The resultant distribution of predicted sigma points $\chi_{k|k-1}{}^x$ together with the weights $W_{k-1}{}^a$ (which represent the predicted state-space variable distributions 126), may then be reduced to best fit a Gaussian distribution by calculating the mean and variance of the predicted sigma points $\chi_{k|k-1}{}^x$. The mean of the predicted state-space variable distributions 126 may be given by:

$$\hat{x}_{k|k-1} = \sum_{i=0}^{2L} W_i^{(m)} (\chi_{i,k|k-1}^x) \tag{29}$$

where the $W_i^{(m)}$ terms represent weights for the predicted means as explained, for example, in Wan, E. A. et al. The covariance of the predicted state-space variable distributions 126 may be given by:

$$P_{k|k-1} = \sum_{i=0}^{2L} W_i^{(c)} [(\chi_{i,k|k-1}^x - \hat{x}_{k|k-1})][(\chi_{i,k|k-1}^x - \hat{x}_{k|k-1})]^T \tag{30a}$$

where the $W_i^{(c)}$ terms represent weights for the predicted covariances as explained, for example, in Wan et al.

Predicted alertness distributions 131 at the time $t_k$ may also be determined by passing the predicted sigma points $\chi_{k|k-1}{}^x$ through the measurement equation of the system 100 model (e.g. equation (20)) according to:

$$Y_{k|k-1} = H(\chi_{k|k-1}^x, \chi_{k-1}^n, 0) \tag{30b}$$

Since the UKF approximation assumes that the predicted alertness distributions 131 are Gaussian random variables, the means $\hat{y}_{k|k-1}$ of the predicted alertness distributions 131 may be given by:

$$\hat{y}_{k|k-1} = \sum_{i=0}^{2L} W_i^{(m)} (Y_{i,k|k-1}^x) \tag{30c}$$

In some embodiments, determination of the predicted alertness distributions 131 according to equation (36) may be implemented by alertness estimator 133 as discussed in more particular detail below. In some embodiments, determination of the predicted alertness distributions 131 may also comprise predicting the covariance $P_{\hat{y}^k,\hat{y}_k}$ of the alertness distributions 131 according to equation (33) describe in more detail below.

After performing the block 230 prediction update, recursive estimation loop 220 proceeds to block 232. Block 232 may be performed by measurement updator 128 (FIG. 1). Block 232 involves an inquiry into whether an alertness measurement 108, $y_k$ is available in the current time $t_k$. Alertness measurements 108, $y_k$ may be acquired y alertness measurement means 114 (FIG. 1) and then provided to measurement updator 128. Alertness measurement means 114 is described above. The alertness measurement 108, $y_k$ may comprise a probability distribution for the measured alertness and a corresponding time ins ant at which the measurement is made. The probability distribution for the measured alertness 108, $y_k$ may be represented by appropriate metrics (e.g. mean and variance).

Assuming, that alertness measurement means 114 generates an alertness measurement 108, $y_j$ for a time $t_j$, the block 232 inquiry may comprise comparing the time $t_j$ to the current time $t_k$ of prediction update block 230 to determine whether the alertness measurement 108, $y_j$ is considered to be currently available. In one implementation, block 232 may require an exact match between $t_j$ and $t_k$ for measurement $y_j$ to be considered currently available. In another implementations, block 232 may consider measure ent $y_j$ to be currently available if time $t_j$ is within a threshold window of time around $t_k$ (e.g. $t_k-q<t_j<t_k+r$, where q, r are variables indicative of the width of the threshold window). Measurement updator 128 may receive alertness measurement 108, $y_k$ from alertness measurement means 114 by any suitable technique including, by way of non-limiting example: as an electronic signal received from an alertness measurement means 114 or as a data value relayed from alertness measurement means 114 over a communications network.

If there is no alertness measurement 108, $y_k$ available for the current time $t_k$ (block 232 NO output), then recursive estimation loop 220 proceeds to block 236, where it waits for the next time step, before looping back to prediction update block 230. Block 236 may be configured to wait in different ways. By way of non-limiting example, block 236 may involve: waiting for predetermined temporal intervals (e.g. proceed at every 10 minute time step); wait for a specific temporal interval specified by an operator of system 100; wait until the time of the next alertness measurement 108, $y_k$. It will be understood by those killed in the art that "waiting" in block 236 does not imply that system 100 and/or processor 134 are necessarily idle. System 100 and/or processor may perform other tasks while "waiting" in block 236. At any point during recursive estimation loop 220, including during block 236, the state-space variable distributions corresponding to a given time step may be passed to future predictor 132 (FIG. 1), where future predictor 132 may predict future alertness and/or parameter distributions (i.e. block 222 of FIG. 2A). Future predictor 132 and the block 222 prediction of future alertness and/or parameter distributions are described in more detail below. It should also be noted that there is no requirement for time steps to be equidistant.

If, on the other hand, an alertness measurement 108, $y_k$ is available for the current time step (block 232 YES output), then recursive estimation loop 220 proceeds to measurement update block 234. Measurement update block 234 may be performed by measurement updator 128 and may generally comprise further updating the predicted state-space variable distributions 126 to take into account the alertness measurement 108, $y_k$. The state-space variable probability distributions determined by measurement update block 234 may be referred to herein as the "updated state-space variable" distributions. The updated state-space variable distributions may be mathematically denoted $p(x_k|U_k,Y_k,x_0)$ and are referred to in FIG. 1 using reference number 130. The updated state-space variable distributions 130 determined in block 234 represent the state-space variable distributions $p(x_k|U_k,Y_k,x_0)$ at time $t_k$ given all inputs $U_k$ up to time $t_k$, all measurements $Y_k$ up to time $t_k$ and the initial condition $x_0$.

The block 234 measurement update operation may be based on: (i) the predicted state-space variable distributions 126 (i.e. $p(x_k|U_k,Y_{k-1},x_0)$) as determined in prediction update block 230); and (ii) a measurement likelihood distribution $p(y_k|x_k)$. The measurement likelihood distribution $p(y_k|x_k)$ is explained in more detail below. The block 234 measurement update operation may involve using Bayes theorem:

$$p(x_k \mid U_k, Y_k, x_0) = \frac{p(y_k \mid x_k) p(x_k \mid U_k, Y_{k-1}, x_0)}{p(y_k \mid Y_{k-1})} \quad (31)$$

The denominator term $p(y_k|Y_{k-1})$ of equation (26) is a normalization constant, which may be replaced by the constant C, such that equation (26) may be expressed as:

$$p(x_k|U_k,Y_k,X_0) = Cp(y_k|x_k)p(x_k|U_k,Y_{k-1},x_0) \quad (32)$$

The Bayes theorem equation (32) may be referred to herein as the "measurement update" equation (32). The measurement update equation (32) allows the probability distribution of state vector x to incorporate information available from a new alertness measurement 108, $y_k$.

At the time $t_k$, the term $p(x_k|U_{k-1},Y_{k-1},x_0)$ of equation (32) represents an estimated quantity provided by the output of prediction update block 230 (i.e. predicted state-space variable distributions 126 (FIG. 1)). The predicted state-space variable distribution 126, $p(x_k|U_k,Y_{k-1},x_0)$ describes the probability distribution of the state variables $x_k$, at time $t_k$, given: all prior inputs $U_k$ up to time $t_k$; all prior alertness measurements $Y_{k-1}$ up to time $t_{k-1}$; and the initial state variable probability distribution $x_0$.

The term $p(y_k=x_k)$ of equation (32) is referred to as the "measurement likelihood distribution" and describes the probability distribution of observing measurements $y_k$ at time $t_k$, given state variables $x_k$ at time $t_k$. The measurement likelihood distribution $p(y_k|x_k)$ may be calculated in measurement update block 234 based on the measurement equation of the model used by system 100 (e.g. equation (20)). The measurement equation may incorporate one or more parameters (e.g. residual error variance $\sigma^2$) that describe a probability distribution characterizing the noisiness or uncertainty of measured alertness values $y_k$. The probability distribution associated with the measured alertness values $y_k$ c n be fixed or can vary for each alertness measurement $y_k$. In one non-limiting example, the noise $\epsilon_k$ associated with alertness measurement $y_k$ may be considered to have a Gaussian random distribution and the measurement $y_k$ may therefore be characterized by a mean value $\hat{y}_k$ and variance $\sigma^2$. The width of the probability distribution that is assumed for the noise (e.g. variance of $\epsilon_k$) associated with alertness measurements $y_k$ may determine the degree of accuracy, and thus the amount of new information that is gained from the alertness measurement $y_k$.

The updated state-space variable distributions 130 (i.e. the term $p(x_k|U_k,U_k,x_0)$ of equation (32)) determined by measurement updator 128 in measurement update block 234 generally represent a more accurate estimate for the individual state and individual trait variables of state-space vector $x_k$ than the predicted state-space variable distributions 126 determined by predictor 124 in prediction update block 230. This more accurate estimate results in a correspondingly reduced uncertainty or probability distribution width for the updated state-space variable distributions 130 as compared to the predicted state-space variable distributions 126.

In particular embodiments, the alertness measurements $y_k$ used in measurement update equation (32) of measurement update block 234 may comprise alertness measurements 108 provided by alertness measurement means 114. As discussed above, one non-limiting example of an alertness measurement $y_k$ measured by alertness measurement means 114 comprises the results from a psychomotor vigilance test. The measurement may be described by the number of lapses (i.e. responses longer than 500 ms) during the test. Other examples of alertness measurements 108 that may be incorporated into input data $y_k$ include results from other tests which are correlated to predictions from the alertness model used by system 100. The characteristics of the probability distribution (or noise terms $\epsilon_k$) assigned to the alertness measurement $y_k$ may be determined using a number of techniques. Non-limiting examples of such techniques include: (i) by alertness measurement means 114 for each alertness measurement $y_k$ and transmitted as part of the alertness measurement 108; (ii) by measurement updator 128 for each measurement; (iii) by measurement updator 128 by assigning a value based on known features of system 100 such as the type of alertness measurement means 114 that is being used; or (iv) by measurement updator 128 after receiving the previous analysis of a population data set performed by initializor 120 as described previously.

As discussed above, in particular embodiments, the predicted state-space variable distributions $p(x_k|U_k,Y_{k-1},x_0)$ used by measurement updator 128 in measurement update block 234 to implement measurement update equation (32) may be provided by predictor 124. The predicted state-space variable distributions 126, $p(x_k|U_kY_{k-1},x_0)$ generated by predictor 124 in prediction update block 230 are passed to the measurement updator 128. At each time $t_k$, measurement updator 128 outputs updated state-space variable distributions 130. The updated state-space variable distributions 130 output by measurement updator 128 are set to one of two values: (a) if a measurement $y_k$ is available, the updated state-space variable distributions 130 are set to $p(x_k|U_k,Y_k,x_0)$ using the measurement update equation (32); or (b) if no measurement $y_k$ is available, the updated state-space variable distributions 130 remain unchanged from the predicted state-space variable distributions 126.

As with the prediction update process of block 230, the measurement update process of block 234 may typically only be implemented analytically using measurement update equation (32) when the state transition equation and the measurement equation of the system 100 model include only linear components and the noise to $\epsilon_k$ is additive with a random Gaussian distributions. This linearity condition is not met for the above-discussed two-process model having state transition equations (22) and measurement equation (20). Analytical solutions for the measurement update equation (32) are therefore not generally possible. Approximation techniques may be used to generate the updated state-space variable distributions 130 determined by measurement updator 128. Measurement updator 128 may make use of the same or similar types of approximation techniques as discussed above for predictor 124. In accordance with one particular embodiment, the block 234 measurement update estimation may be approximated using the measurement update steps from a UKF.

Performing measurement update block 234 in accordance with a UKF approximation technique may make use of: the current measurement $y_k$ at the time $t_k$; the predicted state-space variable distribution 128 generated by predictor 124; and the measurement equation of the system 100 model (e.g. equation (20)). In embodiments where prediction update block 230 utilizes a UKF approximation, measurement update block 234 may be performed according to a complementary UKF measurement update operation. In such embodiments, measurement update block 234 receives a current measurement 108, $y_k$ from alertness measurement means 114 and representations of the predicted state-space variable distributions 128 in the form of a set of predicted sigma points $\chi_{k|k-1}^x$ together with the corresponding weights $W_{k-1}^a$ from predictor 124. Measurement updator 234 may then determine the predicted alertness covariance matrix $P_{\tilde{y}k,\hat{y}_k}$ $$P_{\hat{y}_k,\hat{y}_k} = \sum_{i=0}^{2L} W_i^{(c)}[Y_{i,k|k-1}^x - \hat{y}_{k|k-1}][Y_{i,k|k-1}^x - \hat{y}_{k|k-1}]^T \quad (33)$$

and the covariance matrix $P_{\hat{x}_k,\hat{y}_k}$ between the predicted states and the measured states:

$$P_{\hat{x}_k,\hat{y}_k} = \sum_{i=0}^{2L} W_i^{(c)}[\chi_{i,k|k-1} - \hat{x}_{k|k-1}][Y_{i,k|k-1}^x - \hat{y}_{k|k-1}]^T \quad (34)$$

Measurement updator 128 may then update the probability distributions of state variables $x_k$ at time $t_k$ with the new information in the current alertness measurement 108, $y_k$ (i.e. determine updated state-space variable distributions) in accordance with the measurement update equation (32) as follows:

$$\hat{x}_{k|k} = \hat{x}_{k|k-1} + K_k(y_k - \hat{y}_k) \quad (35)$$

$$\hat{y} = H(x_{k|k}, 0) \quad (36)$$

where the update gain $K_k$ is given by:

$$K_k = P_{x_k,y_k} P_{\hat{y}_k,\hat{y}_k}^{-T} \quad (37)$$

In accordance with one particular UKF approximation, measurement update block 234 assumes Gaussian probability distributions. As such, equation (35) provides the mean $\hat{x}_{k|k}$ of the updated state-space variable distributions 130 and equation (36) provides the mean $\hat{y}_{k|k}$ of the predicted alertness probability distributions 131. In some embodiments, determination of the predicted alertness distributions 131 according to equation (36) may be implemented by alertness estimator 133 as discussed in more particular detail below. Finally, the covariance $P_{k|k}$ of the updated state-space variable distributions 130 is calculated according to:

$$P_{k|k} = P_{k|k-1} - KP_{\hat{y}_k,\hat{y}_k}K^T \quad (38)$$

The mean $\hat{x}_{k|k}$ and the covariance $P_{k|k}$ of the updated state-space variable distributions 130 characterize Gaussian distributions of the updated state-space variable distributions 130. The variance of the predicted alertness distributions 131 may be determined by equation (33).

At the conclusion of measurement update block 234, recursive estimation loop 220 proceeds to block 236, which involves waiting for the next time step, before looping back to prediction update block 230.

Returning to FIG. 2A, method 200 also incorporates a current prediction section 209. Method 200 may proceed to current prediction section 209 at any time during the performance of the block 220 recursive estimation loop. Current prediction section 209 may be implemented (in whole or in part) by alertness estimator 133 (FIG. 1). Current prediction section 209 comprises block 224 which involves generating current predictions (i.e. up to the time $t_k$) for the alertness distributions for subject 106 and, optionally, current predictions (i.e. up to the time $t_k$) for any of the distributions of any state variables x or for any other parameter(s) which may be calculated on the basis of the state variables x. The current predictions for the alertness distributions of subject 106 are referred to in FIG. 1 using reference numeral 131 and the current predictions for the distributions of the state variables x are referred to in FIG. 1 using reference numeral 130.

The current predictions for the distributions of the state variables 130 may comprise the output of measurement updator 128. As discussed above, the output of measurement updator 128 may comprise the predicted state-space variable distributions 126 (for the case where there is no alertness measurement 108, $y_k$ in the current time $t_k$) or the updated state-space variable distributions 130 (for the case where there is an alertness measurement 108, $y_k$ in the current time $t_k$). The current predictions for the alertness distributions 131 may be calculated from the current predictions for the distributions of the state variables using the measurement equation of the system 100 model (e.g. equation (20)).

Method 200 also incorporates a future prediction section 207. Method 200 may proceed to future prediction section 207 at any time during the performance of the block 220 recursive estimation loop. Future prediction section 207 may be performed (in whole or in part) by future predictor 132 (FIG. 1). In the illustrated embodiment, future prediction section 207 includes future prediction block 222. At any time $t_k$, future prediction block 222 may involve making predictions about the future (i.e. at times after time $t_k$). In particular embodiments, block 222 may involve estimating the future alertness distributions 102 of subject 106, the future distributions of any of the state-space variables x and/or the future distributions of any other parameter(s) which may be calculated on the basis of the state variables x.

In particular embodiments, the future predictions of block 222 may be made in a manner similar to that of recursive estimation loop 220. However, alertness measurements 108, $y_k$ and individual state inputs 110, $u_k$ are not available for the block 222 future predictions. Accordingly, the future predictions of block 222 may be performed using recursive iterations of a prediction process similar to that of prediction update block 230 described above (i.e. without a procedure corresponding to measurement update block 234). One additional difference between the steps of recursive estimation loop 220 and those of future prediction block 222 is that future prediction block 222 does not involve waiting for a next time step (i.e. block 236), but rather provides estimates for an arbitrary length of time forward.

The future predictions of block 222 may comprise using future inputs 118. Future inputs 118 may comprise information similar to individual state inputs 110 but may be determined in a different manner. Future inputs 118 may be based on assumptions, such as assumptions about sleep times, for example. Future inputs 118 may be generated by a variety of sources. Non-limiting examples of such sources of future inputs include manual input from subject 106 or an operator of system 100, or automated calculation based on typical values and automated values based on past behavior of subject 106. The block 222 future predictions may generally range from any future time point, including the present time, up to any defined time horizon. If future predictions are desired at a given point in time $t_k$, then the most recently updated parameter distributions 130 are passed to the future predictor 132. The updated parameter distributions 130 serve as the state variables initialization data $p(x_k)$ for the block 222 future predictions (i.e. analogous to state variable initialization data 122, p(x0) (FIG. 1)). Additionally or alternatively, future inputs 118 may have the same format as the alertness measurements 108. One application of the present invention is to predict and compare the effects of different future inputs 118 on future alertness over time, as such inputs may be chosen based on possible future scenarios.

Probability distributions of predicted future alertness may be derived from the probability distributions of the predicted future state-space variables using the measurement equation of the system 100 model (e.g. equation (20)).

When predicting future probability distributions of state variables and alertness in future prediction block 222, an expected behavior of system 100 is that the mean values of the state-space variables corresponding to individual traits (e.g. $\rho$, $\kappa$, $\gamma$ or $v_w$, $v_s$, $\eta$, $\lambda$) will remain relatively unchanged for a particular subject 106 and the mean values of the state-space variables corresponding to individual states (e.g. S, $\theta$) may evolve over time. The uncertainty (i.e. probability width) of the state-space variables may vary depending on the process noise settings of the process noise vector v.

Continuing the specific embodiment which makes use of the two-process model and the UKF approximation, the above discussed UKF prediction process may be performed recursively by future predictor 132 for a set of n future time points $t_j$ for j=k+q . . . k+n (where q≥0, and n≥q). The outputs of future predictor 132 may include future alertness distributions 102, which in the case of the UKF approximation, comprise a set of mean alertness values $\hat{y}_j$ for j=k . . . k+n, and alertness covariances $P_{y_j|y_j}$ for j=k . . . k+n. The outputs of future predictor 132 may also include predictions for future state variable distributions 104, which in the case of the UKF implementation, comprise a set of mean alertness outputs $\hat{x}_j$ for j=k . . . k+n and alertness covariances $P_{x_j|x_j}$ for j=k . . . k+n.

Although the UKF approximation described above represents one particular approximation technique, other suitable approximation techniques may be used to implement the block 220 recursive estimation and/or the block 222 future prediction. By way of non-limiting example, such other approximation techniques may include an Extended Kalman Filter, a Bayesian grid search, and/or a Particle Filter (Markov Chain Monte Carlo).

An example is now provided to illustrate some of the concepts of a particular embodiment of the invention. We take the case of a subject 106 who will perform measurement tests (i.e. to obtain alertness measurements 108, $y_k$) at two-hour intervals over a multi-day period of known sleep and wake transitions. We will assume that no individual trait initialization information 116 is known about subject 106, but that subject 106 is representative of a real or hypothetical population with trait parameter distributions of the two-process model that have been previously characterized, with the population mean values shown in Table 1.

TABLE 1

| Trait Parameter | Mean |
|---|---|
| $\rho_w$ | 0.028 |
| $\rho_s$ | 0.84 |
| $\gamma$ | 4.35 |
| $\kappa$ | 30.3 | and inter-individual variations shown in Table 2.

TABLE 2

| Parameter | Mean | Standard Deviation |
|---|---|---|
| $v_w$ | 0 | 0.5 |
| $v_s$ | 0 | 0.5 |
| $\eta$ | 0 | 0.5 |
| $\lambda$ | 0 | 5 |

Initializor 120 uses the information from Tables 1 and 2 to initialize the state-space variables corresponding to the individual traits of subject 106 in block 210 (i.e. the state variables $v_w$, $v_s$, $\eta$ and $\lambda$ of equation (21)).

Next, for the purposes of this example, we assume that the state-space variables corresponding to individual states in the two-process model (i.e. circadian phase $\theta$ and homeostat S) are unknown. This assumption corresponds to a situation where the prior sleep history and circadian phase entrainment of subject 106 are unknown. Given such an assumption, the probability distributions of the state-space variables corresponding to individual states ($\theta$, S) may be initialized to have uniform probabilities over a possible range of values. For example, the initialization values of these state-space variables may be provided by the distributions of Table 3.

TABLE 3

| Parameter | Uniform distribution range |
|---|---|
| S | (0, 1) |
| $\theta$ | (0, 24) |

In the UKF approximation technique, however, the distributions of the state space variables must be represented as Gaussian distributions. Consequently, in this embodiment, the Table 3 distributions may be approximated using Gaussian distributions having the characteristics of Table 4.

TABLE 4

| Parameter | Mean | Standard Deviation |
|---|---|---|
| S | .5 | 0.28 |
| $\theta$ | 6 | 6.7 |

Other approximation techniques, such as the Particle Filter, may more precisely represent an initial uniform distribution, but the bias introduced by approximating the uniform distributions of the state-space variables corresponding to individual states by Gaussian distributions is relatively small when compared to the corrections made by subsequent alertness measurements 108, $y_k$.

Using a five-day, simulated scenario with 8 alertness measurements 108, $y_k$ per day (at 2 hour intervals during the 16 hours that subject 106 is awake each day) and random measurement noise (see equation (3) above) with standard deviation $\sigma$ of 1.7, the probability estimates of the state-space variables x are updated at each successive measurement iteration using a recursive estimation loop 220 comprising a prediction update block 230 and a measurement update block 234.

FIGS. 4A-4F respectively depict the evolution of the method 200 estimates 302A-302F for the state-space variables $\phi$, S, $\eta$, $v_w$, $\lambda$, $v_s$ together with the actual values 300A-300F for these parameters (which are known from the simulation data). FIGS. 4A-4F also show the 95% confidence interval 304A-304F for their respective state-space variables as predicted by method 200. It can be seen from FIGS. 4A-4F that once subject 106 is awake (at t=8 hours) and an alertness measurement 108, $y_k$ is obtained, method 200 more accurately predicts the state-space variables $\phi$, S, $\eta$, $v_w$, $\lambda$, $v_s$ and that these predictions improve rapidly as more alertness measurements 108, $y_k$ are added. It can be seen from FIGS. 4A-4F that the confidence intervals 304A-304F shrink relatively rapidly during the time that subject 106 is awake (i.e. the non-shaded regions of FIGS. 4A-4F) and alertness measurements 108, $y_k$ are available to update the predictions. It should also be noted that the predicted values 302A-302F generally converge to the actual values 300A-300F.

FIGS. 5A-5D represent schematic plots of alertness measurements from time $t_0$ to $t_k$ 306A-306D and corresponding future alertness predictions from time 4 to $t_k+_n$ (including the predicted future mean alertness 312A-312D and the 95% confidence interval for the predicted future alertness 314A-314D). At a given present time $t_k$, the alertness measurements up to and including $t_k$ are used to generate predictions into the future where alertness is not known. To allow an assessment of the prediction accuracy, also shown in FIGS. 5A-5D are the actual alertness 310A-310D and the future alertness measurements 308A-308D. Periods of time during which the individual was sleeping 316 are shown as vertical bars.

FIG. 5A shows the future alertness predictions 312A where there have been no alertness measurements 108, $y_k$ incorporated into the plot; FIG. 5B shows the future alertness predictions 312B where there have been 8 alertness measurements 306B, 108, $y_k$; FIG. 5C shows the future alertness predictions 312C where there have been 24 alertness measurements 306C, 108, $y_k$; and FIG. 5D shows the future alertness predictions 312D where there have been 40 alertness measurements 306D, 108, $y_k$. It can be seen from comparing the future alertness predictions 312A-312D, to the actual future alertness 310A-310D, that the future alertness predictions 312A-312D improve in accuracy with an increasing number of alertness measurements 306A-306D, and even a few measurements make a difference. It can also be seen from FIGS. 5A-5D that the 95% confidence intervals 314A-314D of the future alertness predictions tends to decrease with an increasing number of alertness measurements 306A-306D. It should be noted here that for prior art prediction methods which are based only on group average models and do not incorporate individual model adjustment, prediction accuracy does not improve over time as it does when individual model adjustment is incorporated as is the case in FIGS. 5A-5D.

Another illustrative example of the disclosed systems and methods is provided in Van Dongen et al. (Van Dongen, H. P., Mott, C., Huang, J. K., Mollicone, D., McKenzie, F., Dinges, D. "Optimization of Biomathematical Model Predictions for Cognitive Performance in Individuals: Accounting for Unknown Traits and Uncertain States in Homeostatic and Circadian Processes." Sleep. 30(9): 1129-1143, 2007), in w ich individual performance predictions are made for individuals during a period of total sleep deprivation. For each subject the individualized predictions demonstrate a significant improvement over the population average model predictions which do not incorporate individual model adjustment.

The systems and methods disclosed herein have useful applications in a variety of settings. Non-limiting examples of areas of application include: (1) resource allocation and the development of optimal work/rest schedules; (2) real-time monitoring of individual workers and groups to facilitate timely application of fatigue countermeasures (e.g. caffeine) and/or schedule modifications; (3) resource allocation and deploy ent of personnel in spaceflight or military applications; (4) analysis of historical data to identify past performance or investigate potentially fatigue related accidents and errors; (5) identification of individual performance-related traits for training and/or screening purposes; and (6) management of jet lag due to travel across time zones.

With regard to work/rest scheduling, many industrial operations and the like involve expensive equipment and essential human operators. These operations may be continuous global 24-hour operations requiring personnel to work effectively during extended shifts and night operations. Human-fatigue related accidents are potentially costly and can cause injury and loss of life. Work/rest schedules that are optimized to each individual's unique neurobiology serve to increase productivity, and reduce the risk of human fatigue-related accidents. Individual traits, as identified by the described systems and methods may be used to develop such optimized work/rest schedules. Assessing predicted alertness during various work/rest scenarios for a given individual or group of individuals may be used to select schedules which maximize alertness during desire periods of time.

With regard to monitoring individual workers and/or groups, incorporating feedback about sleep/wake history and or alertness by direct measurement or by suitable surrogate marker(s) (e.g. performance of a psychomotor vigilance task) may permit accurate predictions to be made about future performance in accordance with the method of the invention. Based on these predictions about future performance, appropriate fatigue countermeasures (e.g. caffeine, modifinal, napping, and the like) can be prescribed or schedule adjustments can be made in advance or in real-time to help optimize worker performance and safety.

In various operational settings (such as, by way of non-limiting example, military applications), human performance is a function of an array of cognitive abilities that are significantly impaired by sleep loss. As such, sleep and alertness are important resources that need to be monitored and managed to help ascertain operational success. The systems and methods disclosed herein may be applied to generate optimal deployment schedules, by evaluating future alertness predictions scenarios to select a set of inputs (e.g. sleep scheduled, caffeine intake) that maximizes alertness, and then be used to monitor personnel and predict future alertness/performance of personnel, thereby anticipating and/or mitigating adverse consequences for performance based on sleep loss and/or circadian misalignment. By incorporating individual estimates of the present and future performance capabilities and sleep need for each individual, an operations scheduler or other decision maker may be equipped with information to make effective decisions to best achieve mission directives and protect against human failure due to fatigue.

In the analysis of historical data to optimize operations or determine the cause of a system failure or industrial accident potentially due to human fatigue, it is desirable to account for individual differences for the individuals implicated. The systems and methods disclosed herein can be applied to estimate underlying neurobiological factors that influence alertness and performance and can further assign probabilities to time periods, events, and/or specific intervals and establish comparative summaries. For example, given a past accident which occurred due to human failure, the prior sleep/wake history of individuals involved, and alertness-related traits of the individuals (either learned from past measurements, or inferred from assuming population distributions), may be used to retrospectively predict the probability of the individuals being in a low alertness state during the period of time in which the accident occurred. An assessment of the likely influence of fatigue on the human failure may then be determined.

During training or screening for operations that require sustained alertness or reliably high levels of performance, it may be advantageous to be able to quantify individual biological traits that have predictive capacity for operational alertness levels and performance. The systems and methods described above can be used to estimate individual performance-related traits, and identify individuals that most closely fit the operation requirements may be selected on this basis. Further, individuals may benefit from receiving biological information about how each best person can manage his or her own work/rest time to optimize productivity, safety and health given the individual's relevant traits. Increasing an individual's awareness about the factors that contribute to alertness and performance may also be beneficial as is teaching about the warning signs that often precede lapses in alertness and human factor related accidents Travel across time zones leads to temporal misalignment between internal neurobiology, including circadian rhythms, and external clock time and often is accompanied by reduced opportunities for sleep. The consequences of this type of travel include a reduced ability to maintain high levels of alertness at desired wake times. For example, driving an automobile after a transoceanic flight may induce increased risk of an accident due to fatigue-related factors at certain times throughout the day. The systems and methods disclosed herein can be applied to select individualized schedules to achieve the most optimal sleep schedule yielding maximum alertness at critical times given operational constraints. Given a set of possible sleep schedule scenarios, predictions of future alertness for a given individual can be generated by the disclosed systems and methods to indicate preferred options.

III. Particular Embodiments of Distributed Systems and Methods

Figure 14A:
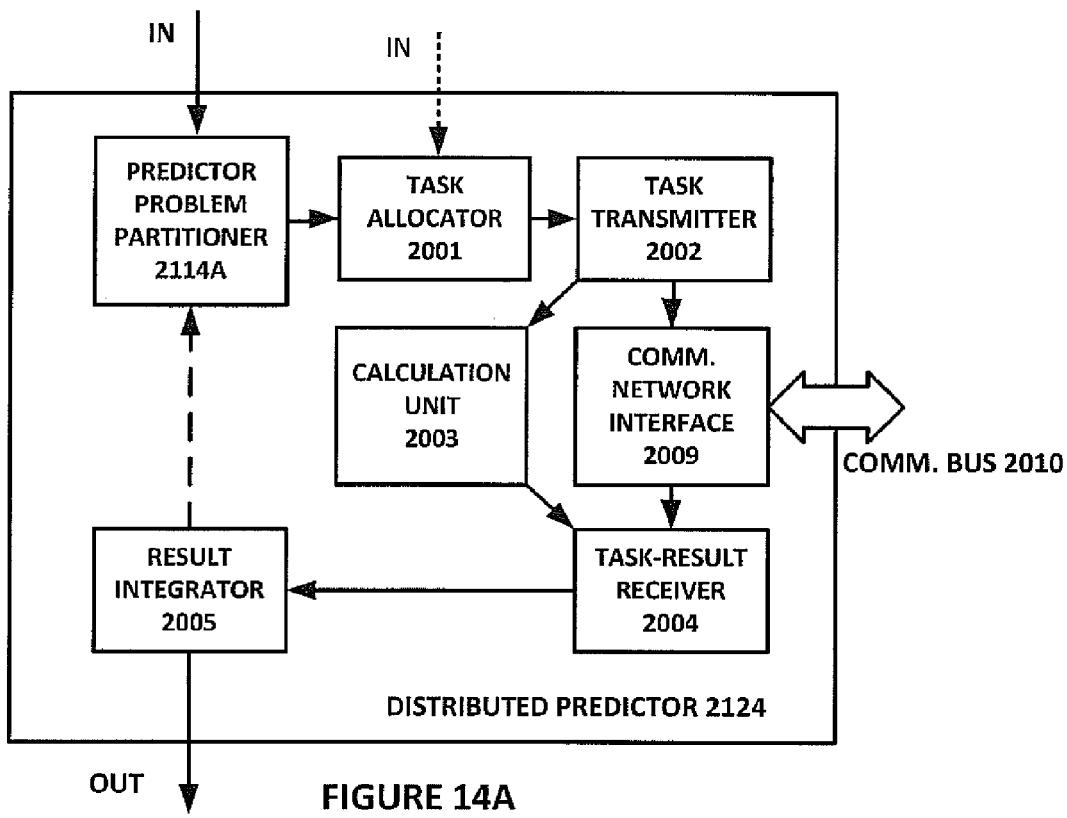
FIGS. 14A-D provide sub-component level diagrams for several system components used in the execution of fatigue-related risk calculation request, such that each sub-component is capable of distributing said request among a multitude of computing devices in accordance with an embodiment of the present invention.
Figure 14B:
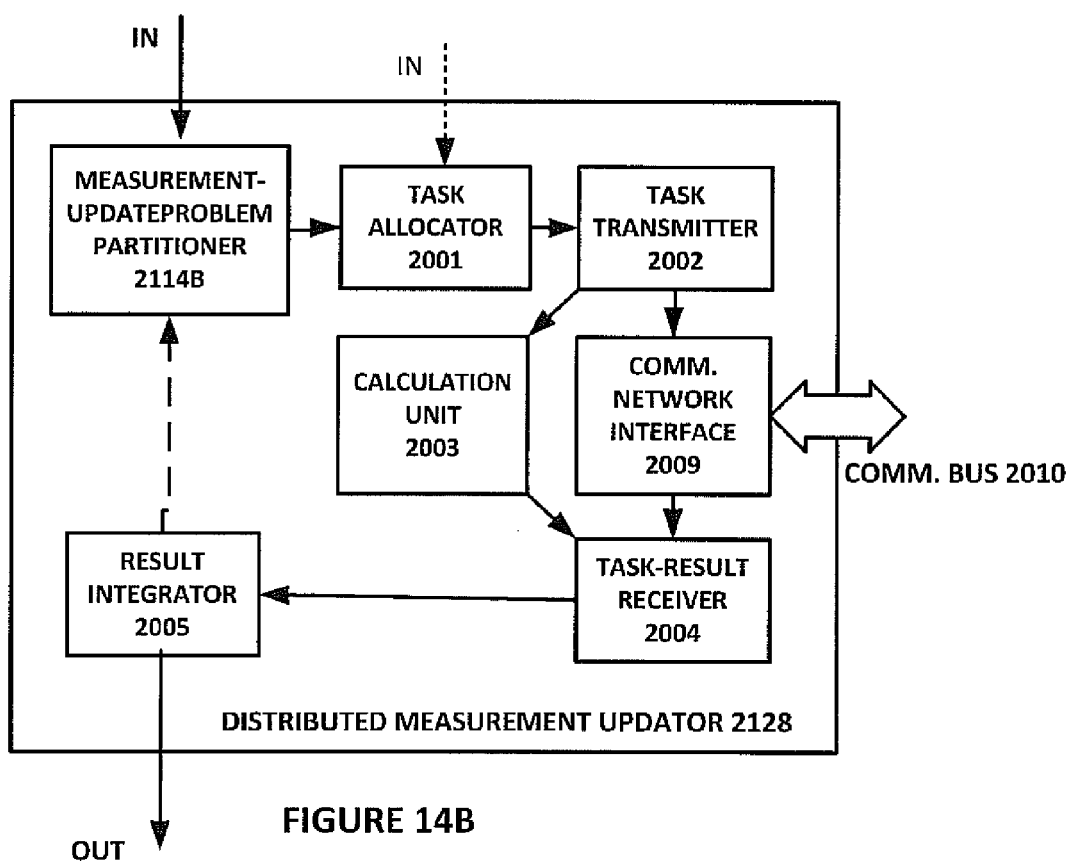
Figure 14C:
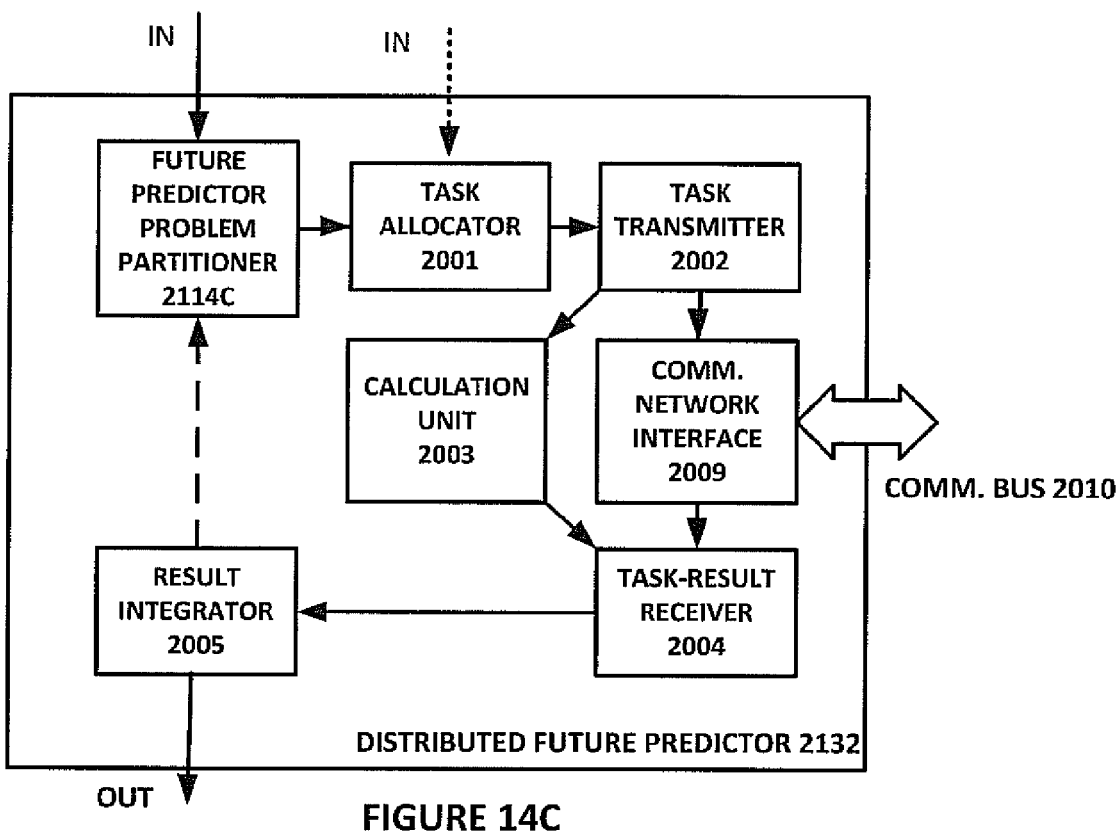
Figure 14D:
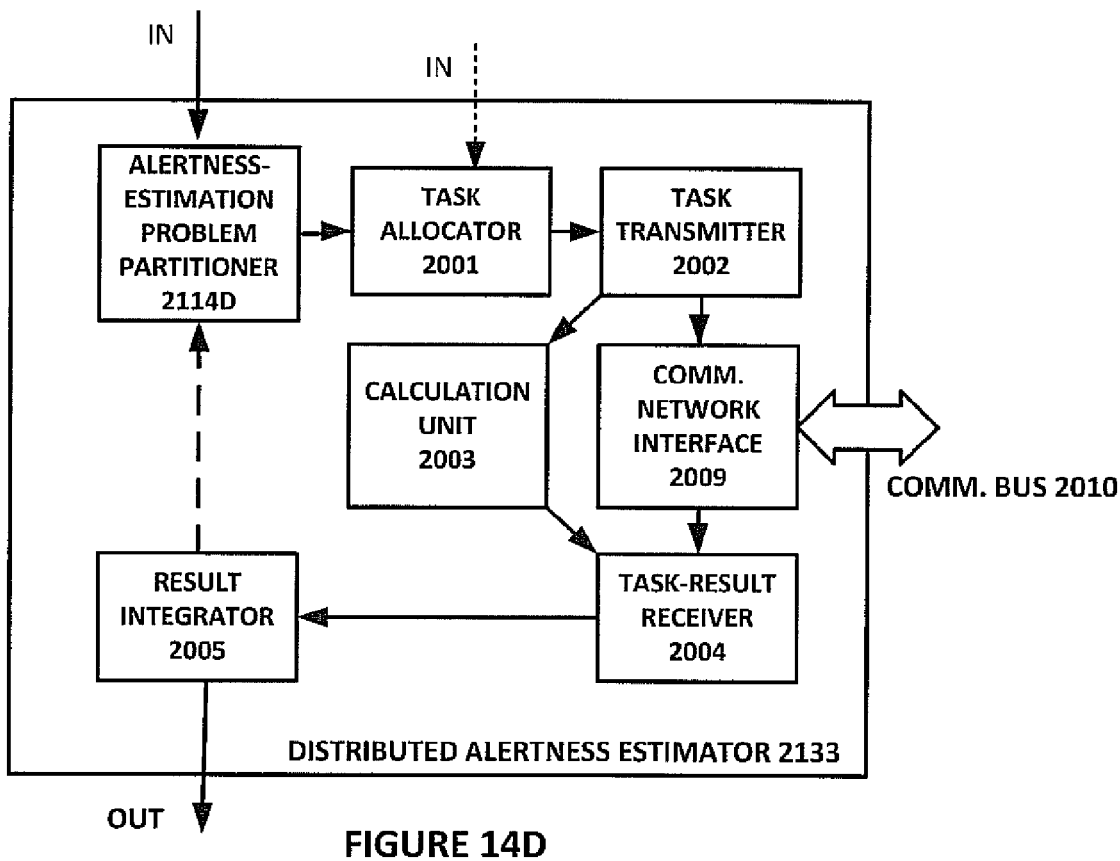
Figure 15:
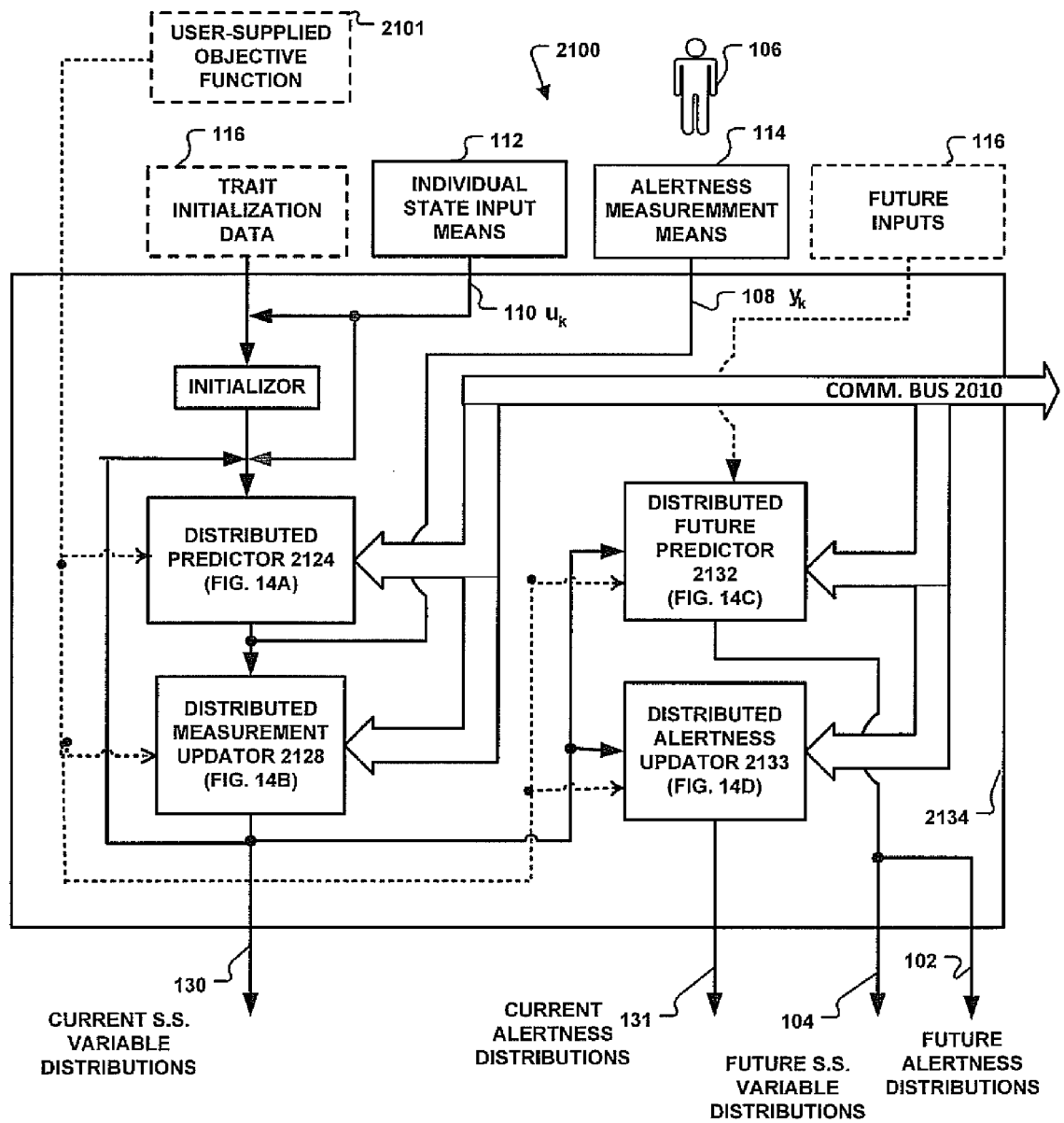
FIG. 15 provides a system-level diagram of a distributed computing system for conducing fatigue-related risk calculation requests in accordance with an embodiment of the present invention.

FIG. 15 provides a component-level diagram for a particular system 2100 that may be used in the distributed calculation of fatigue-risk tasks according to a particular embodiment. Building upon the basic system model of FIG. 1, the system of FIG. 15 replaces key computational components with distributed computing components, specifically: predictor 124 is replaced with distributed predictor 2124, measurement updator 128 is replaced with distributed measurement updator 2128, future predictor 132 is replaced with distributed predictor 2132, and alertness updator 133 is replaced with distribute alertness updator 2133. The distributed versions of each of these components are capable of partitioning the fatigue-risk calculation requests it receives and distributing the resulting computational tasks to other computing devices in accordance with the methods and techniques of the foregoing discussion. Specific sub-components of these distributed system elements 2124, 2128, 2132, and 2133 discussed in connection with FIGS. 14A-14D, enable such distribution of computational tasks.

Also illustrated within FIG. 15 is user-input means 2101 for providing an objective function or other set of parameters by which to optimize or otherwise determine the quality and extent of the distribution methodology. As describe above, different distribution attributes may be preferable to different users at different times under different circumstances. Where speed may be a premium under one state of affairs, accuracy may be under others. User input means 2101 allows a user 106 or a system operator (not shown) to specify which distribution parameters are important for a specific FPT.

FIGS. 14A through 14D provide sub-component-level details of how each of the FIG. 15 distributed computational units operate, in accordance with a particular embodiment. All four follow the same pattern. A subcomponent is provided for receiving a given fatigue-related risk calculation problems and partitioning it into distinct computational tasks. A sub-component is provided for allocating each of the partitioned tasks o a computing device, whether the device is the local, primary device, or whether the device is a secondary device located remotely via a communications network. Another subcompo ent is responsible for transmitting the computational tasks once they have been allocated. (A network interface unit and a communications bus may be provided to facilitate this process.) Another subcomponent is provided so that calculated results from each of the allocated and distributed computational tasks can be collected and then integrated together in yet another subcomponent specifically provided for this purpose.

In FIG. 14A, which illustrates distributed predictor 2124, predictor problem partitioner 2114A is responsible for receiving the FPT or other calculation request and then partitioning it into distinct computational tasks. (This is done in accordance with the FPT-partitioning methods of the foregoing discussion, e.g., block 1103 of FIG. 6A, and in accordance with the method illustrated below in connection with FIGS. 17A-B.) Task allocator 2001 then calculates execution costs functions for each of the computational tasks with respect to available secondary computing devices, taking into account the aforementioned computing device performance parameters and communication-channel parameters. A specific allocation of tasks to computing devices is then made either in accordance with default optimization parameters or in accordance with optional user-supplied parameters, commonly although not exclusively provided in the form of a user-supplied objective function, Task transmitter 2002 then transmits the computational tasks either to one or more secondary computers (not shown) via communication network interface 2009 and communication bus 2010 or to the calculation unit 2003 of distributed predictor 2124. Task-result receiver 2004 collects results of the computational tasks once they begin to arrive back at distributed predictor 2124 (via interface 2009 and/or bus 2010, which are two-way communication components). As discussed in connection with block 1155 of FIG. 6B and the examples of FIGS. 10A and 10B, the results of specific computational tasks are integrated into a final result-either one at a time or, optionally, after all results arrive-by result integrator 2005.

Distributed measurement updator 2128 of FIG. 14 B comprises nearly identical components, except for measurement-update problem petitioner 2114B is provided, which is specialized for the partitioning of measurement update problems. Similarly for future predictor problem partitioner 2114C of FIG. 14C and alertness estimation problem partitioner 2114D of FIG. 14D.

For each of the distributed computational units of FIGS. 14A through 14D, there is also provided an optional communication path by which integrated final results may be passed back from the result integrator 2005 back into the respective problem partitioner 2114A, 2114B, 2114C, or 2114D, to the extent additional partitioning of the problem is desired.

In another embodiment (not illustrated), instead of each computational unit of the system of FIG. 15 separately partitioning and distributing calculation tasks assigned to each unit, a master distributing unit takes the original FTP and partitions it before it enters the system and has access to the distributed computational units of FIG. 15. In way, the primary computing device as a whole is responsible for partitioning the FTP into computational tasks and then distributing them to one or more secondary computing devices. This is distinct from engaging the system of FIG. 1 to begin processing an FTP but then having specified computational tasks within the FTP itself be partitioned and distributed. The presently disclosed system can operate under either scenario in accordance with its many embodiments.

Figure 16:
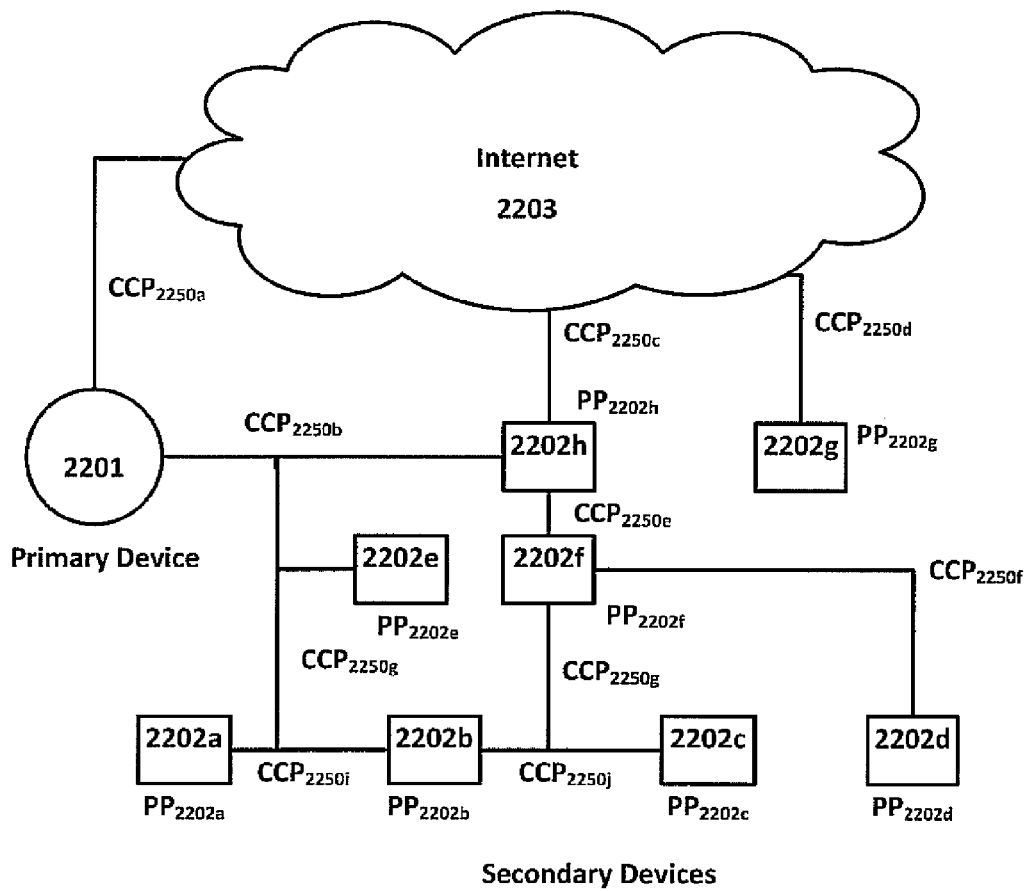
FIG. 16 provides a network diagram illustrating some of the multiple ways in which computing device performance parameters and communication-channel parameters can be configured across a network in accordance with an embodiment of the present invention.

FIG. 16 provides a network diagram view of a primary computing device 2201 connected to a plurality of secondary computing devices 2202a through 2202g via one or more communication channels, including, optionally, the Internet. Each computing device 2201, 2202a-2202g shown has its own set of performance parameters, as outlined in the foregoing discussion, and each communication pathway has its own communication-channel parameters, also as discussed previously. FIG. 16 specifically illustrates that there may be more than one communication pathway between the primary computing device 2001 and a particular secondary computing device, 2202. In some embodiments of the presently disclosed invention, the execution cost function is calculated not only for each secondary computing device 2202a-g but also for each data pathway to each secondary commuting device 2202a-g. Other embodiments are more selective and do not consider all pathways, since simple empirical inspection would likely reveal that some pathways are inherently less useful.

Figure 17A:
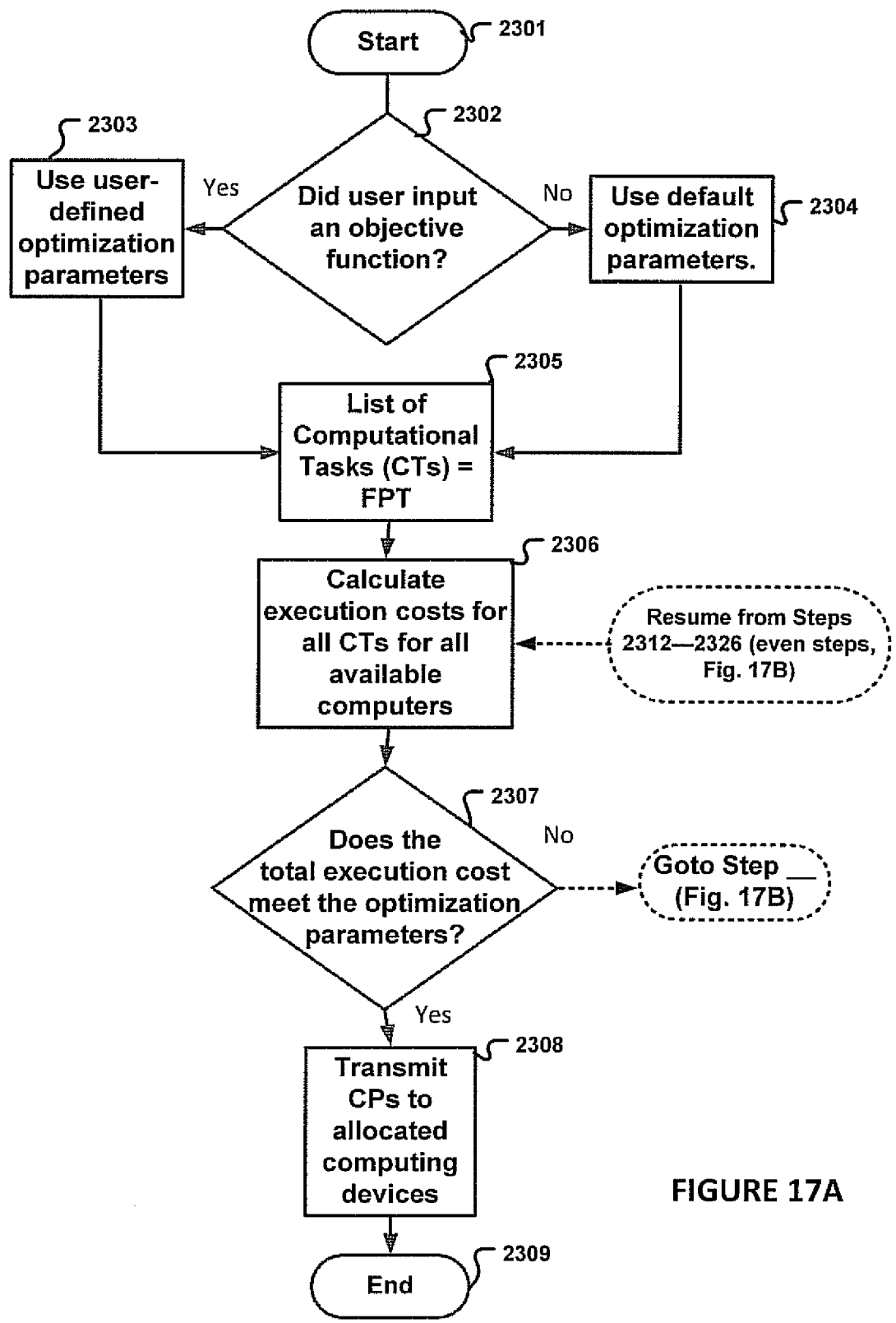
FIGS. 17A and 17B provide flowchart diagrams for a process used to partition fatigue-related risk calculation requests into one or more distinct computational tasks in accordance with an embodiment of the present invention.
Figure 17B:
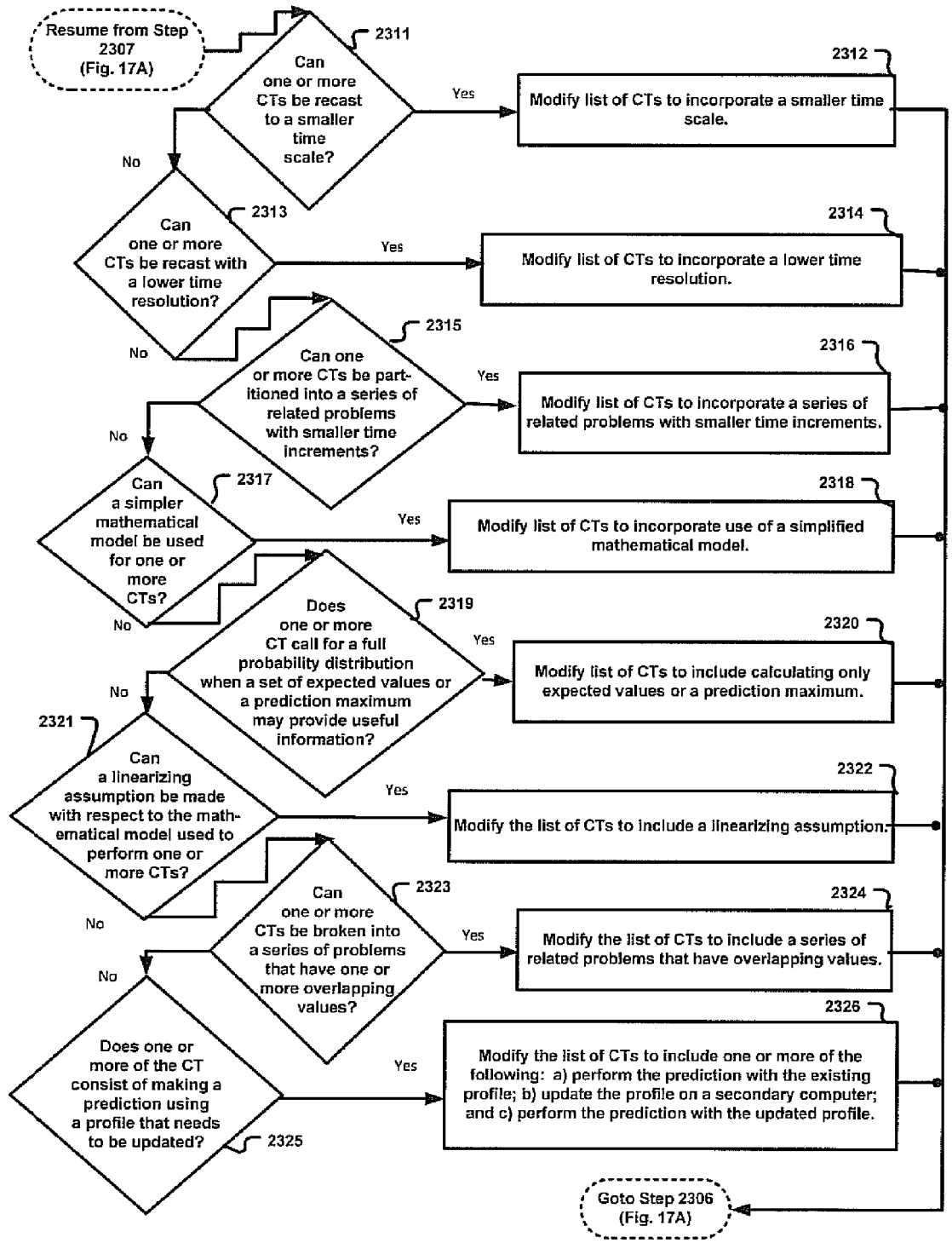

FIGS. 17A and 17B provide a flowchart diagram for a process used to partition an FPT into one or more distinct computational tasks according to a particular embodiment. The process 2300 consists of analyzing the FPT for one of several possible bases upon which to create distinct computational tasks. It will be clear to one of ordinary skill in the art that the interrogative steps of this process are presented here for illustrative purposes only and that additional bases upon which to partition an FPT into to one or more distinct computational tasks can be formulated.

The steps of FIG. 17A set up the analytical process and make large-scale process flow decisions, whereas the steps of FIG. 17B conduct the actual analysis. To commence the process, it is queried 2302 whether the user has input any partition or distribution optimization parameters, such as an objective function described elsewhere herein. If user-supplied optimization parameters are available, the process will be guided by them in accordance with step 2303. If not, default parameters must be used, step 2304. The distribution process makes use of a list of computational tasks, and to initialize the process, step 2305 sets the subject FPT as the only computational task on the list. Later steps of the process will add or modify this list. Step 2306 proceeds by calculating the execution cost functions for every computational task ("CT") on the list in accordance with the performance parameters of computing devices that are available to perform the task. As discussed throughout, execution-cost functions also take into account the fact the secondary computing device is located remotely from the primary computing device that receives the FPT, and hence communication-channel parameters are also included. Furthermore, some embodiments calculate the execution-cost functions for every permutation of available secondary device and data path connecting the secondary device to the primary device, whereas other embodiments use only a preferred subset of the full permutation set so as to keep down the calculation time for the execution-cost functions when a large number of computing devices are available, each with multiple data paths.

A query is made in step 2307 to ascertain whether the optimization parameters are met with the current values of the execution-cost functions. This could happen in some cases without the FPT ever being partitioned—e.g., if the FPT is relatively simple and the optimization parameters are quite lenient. If the parameters are not satisfied, flow continues on to the steps of FIG. 17B, starting with step 2311, discussed below, where various attempts are made to partition the FPT or existing list of computational tasks into smaller tasks. Once the optimization parameters are satisfied, however, step 2308 assures that each task is transmitted to the computing device to which it was allocated during evaluation of the execution-cost functions.

FIG. 17B incorporates a series of interrogative steps, wherein a query is made to determine if either the FTP or one or more existing computational tasks on the list from FIG. 17A can be partitioned in a particular way. If the que results in an affirmative answer, then the process proceeds by making the proposed partition and the returning process flow back to step 2306 of FIG. 17A where the execution-cost functions are reassessed to determine whether the optimization parameters are now satisfied. It should be noted, however, that the sequence of the partitioning interrogatives are not a fixed or immutable feature of the disclosed invention, and that they generally may be executed in any suitable order, with only a single preferred order being presented here. Furthermore, it should also be noted that each interrogative is to be applied to each item on the list of computational tasks, and that it is not a fixed or immutable feature of the presently disclosed invention to assess each computational task with a given interrogative before moving on to the next interrogative or to assess each computational task with all interrogatives before moving on to the next computational task. Either approach, or a hybrid of the two, is contemplated by the presently disclosed invention. It should also be noted that a bookkeeping function should be implemented to keep track of when particular tasks have been partitioned in a given way. In some circumstances, the modification to the task list brought about through a given partition strategy merely adds one or more new computational tasks to the list while leaving the original task intact. Without bookkeeping means, every time the steps of FIG. 17B are applied, multiple copies of the same additional tasks could continue to accrue onto the list in an infinite loop. Other similar problems arise in the absence of appropriate measures, but such measures are well known to those of ordinary skill in the arts of computer programming.

Regarding substance of the partitioning logic, step 2311 asks whether one or more of the computational tasks ("CTs") can be recast to a smaller time scale. Instead of calculating fatigue-level predictions out for the next three weeks, it might be possible to make a prediction for only the next 24 hours. If this is possible, step 2312 make one or more modifications to the CT list to incorporate smaller time scales. Similarly, step 2313 asks whether it is possible to use a lower time resolution for a given calculation—e.g., predicting fatigue levels every 3 hours instead of every 15 minutes. Step 2314 makes the appropriate modifications when a lower time resolution is available. Similarly, step 2315 asks whether the one or more computational tasks can be broken into a series of related problems with smaller time increments—e.g., if a problem asks for a detailed fatigue prediction going out for three weeks, it might be possible to make a prediction for the next hour, another prediction for the next 24 ours, another for the next 72 hours, another for the next week, another for the next two weeks, and, finally, another for the next three weeks. As discussed previously, the results from the shorter time-increment problems will likely be computed more quickly, with the longer time-increment problem results trickling in slowly thereafter. Step 2316 makes the appropriate modification to the CT list if such an option is available.

Changing focus from the temporal aspects of the prediction problem to the underlying mathematical model, steps 2317 and 2321 ask whether a simpler mathematical model can be used to develop a set of interim results and whether a simplifying (often a linearizing) assumption can be made regarding the existing mathematical model that will shorten computation time, respectively. As discussed previously, these techniques often produce interim approximate results of at least some utility while the full computation is taking place. Steps 2318 and 2322 respectively make the appropriate modification to the task list.

For problems requiring full probability distrbutions as the requested output, another technique that can be used is to calculate only a set of statistical metrics associated with the probability distributions before calculating the entire distribution itself. Step 2319 asks whether it is possible to calculate only the expected value of a probability distribution (or, equivalently, any other statistical metric associated with probability distributions generally) or a prediction maximum, minimum, or other extrema, instead of calculating the full distribution. If so, a provisional answer consisting of the substitute values can be calculated quickly, and step 2320 assures that the task list is modified to accommodate for this type of problem partition.

Similarly, step 2323 asks whether one or more of the existing computational tasks can be broken into a set of smaller problems whose results consist of overlapping values—i.e., one result can either be replaced by another result or can be used as the input to another problem that replaces the existing result. This technique is often used in connection with linear mathematical problems, and hence can be used on the resulting modified computational-task list from step 2321, wherein a linearizing assumption is made regarding the existing (typically non-linear) mathematical model. If this technique is availble, then step 2324 makes the necessary modifications to the task list.

Step 2325 asks whether an individual fatigue profile needs to be updated with new measurement data before another fatigue-related calculation is to be performed using the updated profile. If so, it is possible to return approximate results using the existing, non-updated profile, while a secondary computing device updates the profile with the new measurement data. Then, once the profile is updated, the calculation can be re-run and the former results replaced with the new results. If this is the case, step 2326 modifies the task list accordingly. Certain implementations of the invention comprise computer processors which execute software instructions which cause the processors to perform a method of the invention. For example, one or more processors in a dual modulation display system may implement data processing steps in the methods described herein by executing software instructions retrieved from a program memory accessible to the processors. The invention may also be provided in the form of a program product. The program product may comprise any medium which carries a set of computer-readable instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs and DVDs, electronic data storage media including ROMs, flash RAM, or the like. The instructions may be present on the program product in encrypted and/or compressed formats.

Certain implementations of the invention may comprise transmission of information across networks, and distributed computational elements which perform one or more methods of the inventions. For example, alertness measurements or state inputs may be delivered over a network, such as a local-area-network, wide-area-network, or the interne, to a computational device that performs individual alertness predictions. Future inputs may also be received over a network with corresponding future alertness distributions sent to one or more recipients over a network. Such a system may enable a distributed team of operational planners and monitored individuals to utilize the information provided by the invention. A networked system may also allow individuals to utilize a graphical interface, printer, or other display device to receive personal alertness predictions and/or recommended future inputs through a remote computational device. Such a system would advantageously minimize the need for local computational devices.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- The term alertness is used throughout this description. In the field, alertness and performance are often used interchangeably. The concept of alertness as used herein should be understood to include performance and vice versa.
- The system may be extended to include of other measures of human performance such as gross-motor strength, dexterity, endurance, or other physical measures.
- The term "state-space variables" is used in this application to describe variables of a model, and it should be understood, that variables from models types other than "state-space" models could also be utilized and are hereby included as alternate embodiments of the invention
- The terms sleepiness and fatigue are also herein understood to be interchangeable.
  However, in certain contexts the terms could be conceptually distinguished (e.g. as relating to cognitive and physical tiredness, respectively). Embodiments thus construed are included in the invention.
- Many mathematical, statistical, and numerical implementations may be used to solve the estimation equations and generate predictions.
- Purely analytical examples or algebraic solutions should be understood to be included.
- The system may be applied to other aspects to human neurobiology which exhibit state and trait parameters such as cardiovascular and endocrinology systems.
- Other models or estimation procedures may be included to deal with biologically active agents, external factors, or other identified or as yet unknown factors affecting alertness.

What it claimed is:

1. A distributed computing method for fulfilling a fatigue-risk calculation task request ("FPT"), the method comprising the steps of:
   receiving an FPT at a primary computing device,
   partitioning the FPT into one or more computational tasks;
   calculating, for each of the one or more computational tasks, a set of values for a corresponding set of execution-cost functions, the set of execution-cost functions comprising: a primary cost function associated with use of the primary computing device to perform the computational task and based at least in part on one or more performance parameters associated with the primary computing device; and one or more secondary cost functions, each secondary cost function associated with use of a corresponding secondary computing device to perform the computational task and based at least in part on one or more performance parameters associated with the secondary computing device and one or more communication-channel parameters associated with one or more data paths between the secondary computing device and the primary computing device;
   allocating, for each of the one or more computational tasks, the computational task in accordance with the set of values for the execution-cost functions associated with the computational task either to: the primary computing device; or to an allocated one of the secondary computing devices via an allocated one of the data paths between the allocated secondary computing device and the primary computing device;

transmitting to each of the allocated secondary computing devices the computational tasks allocated thereto respectively via each of the allocated data paths;

calculating a result for each of the one or more computational tasks, wherein for each of the one or more computational tasks, determining the result is performed by the primary computing device if the task has been allocated to the primary computing device and determining the result is otherwise performed by the allocated secondary computing device;

receiving at the primary computing device via the allocated data paths the results of the computational tasks determined by allocated secondary computing devices; and integrating each of the results of the computational tasks into interim results of increasing completeness until a final solution for the FPT is achieved.

2. The method of claim 1:
wherein the FPT comprises at least in part calculating a fatigue prediction based at least in part on a mathematical fatigue model, and
wherein the step of partitioning the FPT into one or more computational tasks comprises:
creating a computational task to calculate only a prediction maximum likelihood, and
creating a computational task to calculate a full probability distribution prediction.

3. The method of claim 2:
wherein the mathematical model is a state-space model containing at least a prediction function,
wherein the FPT contains at least initial conditions with probability distributions for parameters of the mathematical model,
wherein the prediction maximum likelihood task is calculated using propagation of a maximum likelihood of the initial conditions through the mathematical model's prediction function, and
wherein the full probability distribution prediction task is calculated using a Bayesian statistical prediction method.

4. The method of claim 3, wherein the Bayesian statistical prediction method consists essentially of one or more of the following: a particle filter, an unscented Kalman filter, or a Kalman filter.

5. The method of claim 1:
wherein the FPT consists at least in part of a calculation based at least in part on a mathematical fatigue model, and
wherein the step of partitioning the FPT into one or more computational tasks comprises:
creating a first computational task using a simplified representation of the mathematical fatigue model and creating a second computational task using the mathematical fatigue model, and
wherein the step of integrating all the results consists of replacing results from the first computational task with results from the second computational task.

6. The method of claim 1:
wherein the FPT comprises a fatigue prediction based at least in part on a mathematical fatigue model that accepts one or more individual profile parameters as input,
wherein the FPT further comprises a task to update the individual profile parameters based on one or more fatigue-related data inputs,
wherein the FPT further comprises current values of the individual profile parameters,
wherein the step of partitioning the FPT into one or more computational tasks consists of:
creating a first computational task to calculate the fatigue prediction using the current values of the individual profile parameters,
creating a second computational task to calculate updated values of the individual profile parameters based on the one or more fatigue-related data inputs, and
creating a third computational task to calculate the fatigue prediction using the updated values of the individual profile parameters, and
wherein the step of integrating all the results consists of replacing results from the first computational task with results from the third computational task.

7. The method of claim 6, wherein the task to update the individual profile parameters consists essentially of using a statistical Bayesian measurement update method.

8. A method of claim 1, wherein the step of partitioning the FPT into one or more computational tasks further comprises:
creating a plurality of computational tasks that produce results having one or more overlapping values, and
assigning a priority value to each computational task within the plurality, and
wherein the step of integrating all the results consists of replacing values of lower priority with overlapping values from results of higher priority.

9. The method of claim 1, wherein the FPT consists of one or more of the following: a fatigue-level calculation, a fatigue-level calculation over time, a countermeasure recommendation, a countermeasure optimization, a sleep-schedule recommendation, a sleep-schedule optimization, a work-schedule recommendation, or a work-schedule optimization.

10. The method of claim 1, wherein the FPT is related to more than one individual for whom fatigue-related calculations are needed.

11. The method of claim 1, wherein the step of partitioning of the FPT into the one or more computational tasks consists of one or more of the following: modifying a time resolution associated with the final results of the calculation, modifying the precision or accuracy of the final results, modifying the amount of statistical data included as input to the FPT calculation, using a smaller time window for the FPT calculation, dividing the FPT calculation into multiple time horizons, changing the mathematical model used for fatigue calculations, making a linearizing assumption about the mathematical model selected, calculating only expected values or prediction extremas for future fatigue levels instead of full probability distributions, or conducting the FPT calculation on only a subset of individuals to which the FPT calculation pertains.

12. The method of claim 1, wherein the performance parameters either of the primary computing device or of the one or more secondary computing devices consist essentially of one or more of the following: processor speed, effective calculation speed, processor power consumption, remaining reserve power available, signal-transmission speed, signal-reception speed, signal-transmission power-consumption rate, or signal-reception power-consumption rate.

13. The method of claim 1, wherein the communication-channel parameters consist essentially of one or more of the following: data-path send rate, data-path send error rate, effective send rate, send signal power loss, data-path receive rate, data-path receive error rate, effective receive rate, or receive signal power loss.

14. The method of claim 1, wherein the execution cost function can be expressed using one or more of the following terms: computation time, computation time plus total transfer time, power consumption during calculation, power consumption during transfer, normalized power consumption multiplied by normalized transmission speed, normalized power consumption as limited by maximum time, or a mathematical value reflecting the overall information-security rating of the computing device to which a computational task has been allocated.

15. The method of claim 1, wherein the step of partitioning the FPT into one or more computational tasks and the step of calculating values of execution-cost functions for each of the computational tasks are repeated so as to achieve an optimal partition of the FPT into one or more computational tasks in light of the execution-cost function values.

16. The method of claim 15, wherein the optimal partition of the FPT is determined with respect to user input as to which performance parameters and communication-channel parameters are to be optimized.

17. The method of claim 1, wherein the primary computing device is a mobile device, handheld device, an embedded device, a device containing a central processing unit specifically designed for digital-signal processing, a laptop computer, a notebook computer, a tablet computer, a personal digital assistant, a desktop computer, or any equivalent device.

18. The method of claim 1, further comprising the step of displaying the final solution to the FPT to a user.

19. The method of claim 18, further comprising the step of updating the displaying to a user an interim solution to the FPT upon receipt of each the result of each the computational task until the final solution to the FPT is achieved.

20. The method of claim 1 further comprising the step of updating the performance parameters of the primary computing device or the one or more secondary computing devices regularly or intermittently during operation of the method either through measurement or estimation techniques.

21. The method of claim 1 further comprising the step of transmitting the FPT to a secondary computing device, and wherein the step of partitioning the FPT occurs on the secondary computing device.

22. A distributed computing system for performing a fatigue-risk optimization task ("FPT"), the system comprising:
at least two computing devices connected to each other by one or more communications networks, wherein one computing device is designated as a primary computing device and the one or more remaining computing devices are designated as secondary computing devices;
an initializor unit for initializing a plurality of human-fatigue model variables of a dynamic mathematical model that outputs alertness of a human subject based upon said plurality of model variables, said plurality of model variables specifying or estimating probability distributions,
a predictor unit configured to:
estimate current values of said model variables based at least in part on past values of said model variables; and
receive new values for one or more of said model variables when input information is available, said model including a process noise component comprising a probability distribution representing an uncertainty associated with new values for said plurality of model variables;
an alertness estimator unit for using said dynamic mathematical model to estimate alertness values of said human subject based at least in part on said current values of the plurality of model variables;
wherein said predictor unit comprises:
a predictor partitioner subunit to partition one or more of functions of the predictor unit into one or more predictor computational tasks,
a predictor task allocator subunit for allocating each of said one or more predictor computational tasks to a corresponding one of said computing devices,
a predictor task transmission subunit for transmitting one or more of said one or more predictor computational tasks to corresponding ones of said secondary computing devices as allocated by the predictor task allocator via said communications network,
a predictor task-result receiving subunit for receiving results of said predictor computational tasks performed by said computing devices, and
a predictor result integrator subunit for properly combining said results of said predictor computational tasks received at said predictor task-result receiving subunit; and
wherein said alertness estimator unit comprises:
an alertness estimator partitioner subunit to partition one or more of functions of the alertness estimator unit into one or more alertness estimator computational tasks,
an alertness estimator task allocator subunit for allocating each of said one or more alertness estimator computational tasks to a corresponding one of said computing devices,
an alertness estimator task transmission subunit for transmitting one or more of said one or more alertness estimator computational tasks to corresponding ones of said secondary computing devices as allocated by the alertness estimator task allocator via said communications network,
an alertness estimator task-result receiving subunit for receiving results of said alertness estimator computational tasks performed by said computing devices, and
an alertness estimator result integrator subunit for properly combining said results of said alertness estimator computational tasks received at said alertness estimator task-result receiving subunit.

23. A distributed computing system for performing a fatigue-risk optimization task ("FPT"), the system comprising:
a plurality of computing devices connected to each other by one or more communications networks, the plurality of computing devices comprising one primary computing device and one or more secondary computing devices;
wherein each of the plurality of computing devices comprises one or more processors configured to provide:
an initializor unit for initializing a plurality of human-fatigue model variables of a dynamic mathematical model that outputs alertness data of a human subject based upon the plurality of model variables, the plurality of model variables specifying or estimating probability distributions,
a predictor unit configured to:
estimate current values of the model variables based at least in part on past values of said model variables;
receive new values for one or more of the model variables when input information is available, the model including a process noise component comprising a probability distribution representing an uncertainty associated with new values for the plurality of model variables; and an alertness estimator unit for using the dynamic mathematical model to estimate alertness values of the human subject based at least in part on the current values of the plurality of model variables;

wherein the primary computing device further comprises one or more processors configured to provide:

a global FPT process distributor, the global FPT process distributor comprising:

a partitioner subunit for partitioning the FPT into one or more computational tasks, a task allocator subunit for allocating each of the one or more computational tasks to a corresponding one of the primary or secondary computing devices, a task transmitter subunit for transmitting one or more of the one or more computational tasks to corresponding ones of the secondary computing devices as allocated by the task allocator subunit via the communications network, a task result receiver subunit for receiving results of the computational tasks performed by the primary and secondary computing devices, and a result integrator subunit for properly combining the results of the computational tasks received at the task-result receiver subunit.

24. A computer readable medium carrying instructions that when executed by a suitably configured processor cause the processor to perform the method comprising the steps of:

receiving an FPT at a primary computing device, partitioning the FPT into one or more computational tasks;

calculating, for each of the one or more computational tasks, a set of values for a corresponding set of execution-cost functions, the set of execution-cost functions comprising: a primary cost function associated with use of the primary computing device to perform the computational task and based at least in part on one or more performance parameters associated with the primary computing device; and one or more secondary cost functions, each secondary cost function associated with use of a corresponding secondary computing device to perform the computational task and based at least in part on one or more performance parameters associated with the secondary computing device and one or more communication-channel parameters associated with one or more data paths between the secondary computing device and the primary computing device;

allocating, for each of the one or more computational tasks, the computational task in accordance with the set of values for the execution-cost functions associated with the computational task either to: the primary computing device; or to an allocated one of the secondary computing devices via an allocated one of the data paths between the allocated secondary computing device and the primary computing device;

transmitting to each of the allocated secondary computing devices the computational tasks allocated thereto respectively via each of the allocated data paths;

calculating a result for each of the one or more computational tasks, wherein for each of the one or more computational tasks, determining the result is performed by the primary computing device if the task has been allocated to the primary computing device and determining the result is otherwise performed by the allocated secondary computing device;

receiving at the primary computing device via the allocated data paths the results of the computational tasks determined by allocated secondary computing devices; and integrating each of the results of the computational tasks into interim results of increasing completeness until a final solution for the FPT is achieved.

* * * * *